United States Patent
Oba et al.

(10) Patent No.: US 8,326,225 B2
(45) Date of Patent: Dec. 4, 2012

(54) COMMUNICATION SYSTEM AND METHOD

(75) Inventors: Haruo Oba, Kanagawa (JP); Taku Sugawara, Tokyo (JP); Takeo Inagaki, Tokyo (JP); Junichi Rekimoto, Tokyo (JP); Nobuyuki Matsushita, Kanagawa (JP); Yuji Ayatsuka, Tokyo (JP); Toru Suzuki, Saitama (JP)

(73) Assignee: Sony Corporation, Tokyo (JP)

( * ) Notice: Subject to any disclaimer, the term of this patent is extended or adjusted under 35 U.S.C. 154(b) by 410 days.

(21) Appl. No.: 10/484,050

(22) PCT Filed: Jul. 16, 2002

(86) PCT No.: PCT/JP02/07198
§ 371 (c)(1),
(2), (4) Date: Jan. 16, 2004

(87) PCT Pub. No.: WO03/009535
PCT Pub. Date: Jan. 30, 2003

(65) Prior Publication Data
US 2004/0259499 A1    Dec. 23, 2004

(30) Foreign Application Priority Data
Jul. 18, 2001    (JP) .............................. P2001-218521

(51) Int. Cl.
*H04B 7/00*    (2006.01)

(52) U.S. Cl. ...................................... 455/41.2; 455/502

(58) Field of Classification Search .................. 455/41.2, 455/411, 569, 90
See application file for complete search history.

(56) References Cited

U.S. PATENT DOCUMENTS

| | | | |
|---|---|---|---|
| 5,943,628 A * | 8/1999 | Barrett et al. ................. | 455/574 |
| 6,078,791 A * | 6/2000 | Tuttle et al. .................. | 455/90.1 |
| 6,525,648 B1 * | 2/2003 | Kubler et al. .............. | 340/10.33 |
| 6,532,374 B1 * | 3/2003 | Chennakeshu et al. .... | 455/569.1 |
| 6,574,266 B1 | 6/2003 | Haartsen | |

(Continued)

FOREIGN PATENT DOCUMENTS
DE    100 46 300 A1    6/2001
(Continued)

OTHER PUBLICATIONS

Akira Nihei, "Keitai Denwa wa Benri na Saifu ni Pocket ni Keitai dakega Arebaii Seikatsu ga Kuru", Jul. 1, 2001, ASCII, vol. 25, No. 7, pp. 278 to 279.

(Continued)

*Primary Examiner* — Zhiyu Lu
(74) *Attorney, Agent, or Firm* — Finnegan, Henderson, Farabow, Garrett & Dunner, L.L.P.

(57) ABSTRACT

The present invention relates to communication systems and methods which allow the partner of communication to be easily specified. A portable telephone 52 is provided with a non-contact IC card which communicates with a reader/writer of a personal computer 51 by electromagnetic waves. When the non-contact IC card receives electromagnetic waves emitted by the reader/writer, the portable telephone 52 reports the card ID assigned to the non-contact IC card to the personal computer 51. The card ID includes the Bluetooth address of the portable telephone 52. When the personal computer 51 obtains the Bluetooth addresses of the portable telephone 52 and a PDA 53 at an inquiry, the personal computer 51 specifies the portable telephone 52 as a Bluetooth device with which synchronization is established, according to the Bluetooth address reported in advance. The present invention can be applied to information processing apparatuses such as personal computers and portable telephones.

15 Claims, 30 Drawing Sheets

U.S. PATENT DOCUMENTS

| | | | |
|---|---|---|---|
| 6,725,061 B1 | 4/2004 | Hutchison, IV et al. | |
| 6,879,570 B1 | 4/2005 | Choi | |
| 7,039,445 B1* | 5/2006 | Yoshizawa | 455/575.7 |
| 2001/0003191 A1 | 6/2001 | Kovacs et al. | |
| 2001/0007815 A1* | 7/2001 | Philipsson | 455/41 |
| 2002/0004374 A1* | 1/2002 | Kantola et al. | 455/90 |
| 2002/0123325 A1* | 9/2002 | Cooper | 455/411 |
| 2002/0154607 A1* | 10/2002 | Forstadius et al. | 370/311 |
| 2002/0174025 A1* | 11/2002 | Hind et al. | 705/26 |

FOREIGN PATENT DOCUMENTS

| | | |
|---|---|---|
| EP | 1 093 272 A | 4/2001 |
| EP | 1 107 512 A | 6/2001 |
| GB | 2 358 329 A | 7/2001 |
| JP | 2001-144781 | 5/2001 |
| JP | 2001-156704 | 6/2001 |
| JP | 2004-015179 | 1/2004 |
| WO | WO 99/25140 A | 5/1999 |
| WO | WO 00/42797 A | 7/2000 |
| WO | WO 01/01717 A | 1/2001 |
| WO | WO 01/45319 A | 6/2001 |

OTHER PUBLICATIONS

European Search Report mailed Oct. 17, 2007, for European application No. EP 02 74 6081.

* cited by examiner

FIG. 18

| ITEMS IN SPECIFICATIONS | | | |
|---|---|---|---|
| COMMUNICATION RATE | | | 211.875 kbps |
| ELECTRIC-POWER TRANSFER | | CENTER FREQUENCY | 13.56 MHz |
| | | OUTPUT | 350 mW |
| DATA TRANSFER | R/W → CARD | CENTER FREQUENCY | 13.56 MHz |
| | | MODULATION METHOD | ASK |
| | CARD → R/W | CENTER FREQUENCY | 13.56 MHz |
| | | MODULATION METHOD | LOAD SWITCHING |

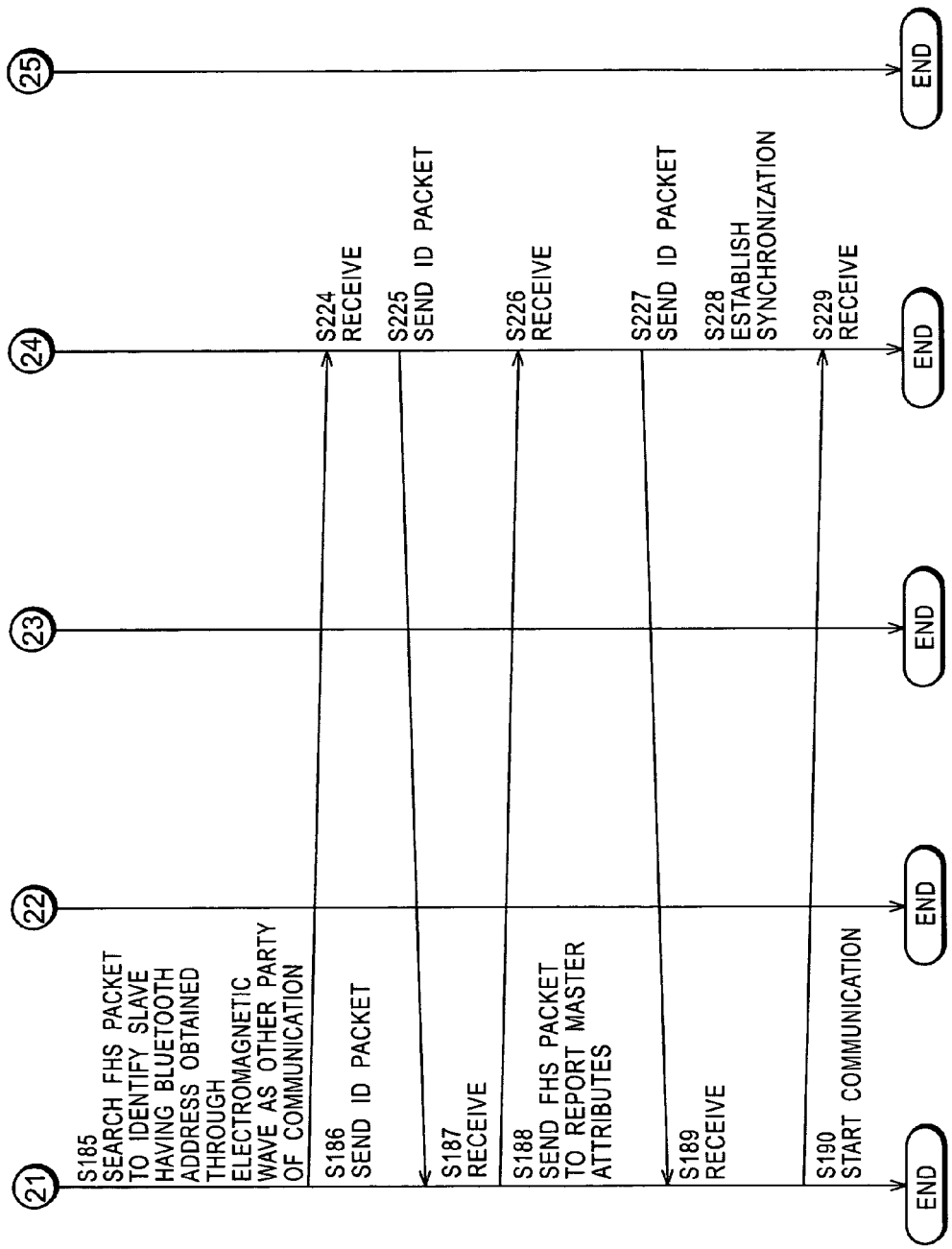

COMMUNICATION SYSTEM AND METHOD

TECHNICAL FIELD

The present invention relates to communication systems and methods capable of specifying a terminal serving as the partner of communication, and of starting communication more easily and quickly, especially when Bluetooth® is used for communication.

BACKGROUND ART

Bluetooth has attracted attentions recently as wireless communication means for short distances, and various devices conforming thereto have been developed and marketed.

Bluetooth is a wireless communication standard standardized by a Bluetooth SIG (special interest group), and uses the 2.4 GHz band (IMS (industrial science medical) band) for communication with other devices having Bluetooth modules.

Networks employing Bluetooth are called Piconets or Scatternets according to their forms. A Scatternet is formed by connecting a plurality of Piconets mutually. In each network, there are Bluetooth devices which play roles called a master and a slave. Hereinafter, if necessary, a Bluetooth device which plays the role of a master is called a master, and a Bluetooth device which plays the role of a slave is called a slave.

FIG. 1 is a view showing the concept of Piconets and a Scatternet.

As shown in FIG. 1, in each Piconet, there is one master, and a slave or a plurality of slaves perform communication under the control of the master. In this example case, Piconet 1 is formed of a master 1, a slave 1-1, and a slave 1-2, and Piconet 2 is formed of a master 2 and a slave 2-1.

A Scatternet is formed when Piconet 1 and Piconet 2 are mutually connected. In FIG. 1, a communication link between Piconet 1 and Piconet 2 is disabled.

To form such Piconets to transmit and receive various pieces of information, it is necessary for all Bluetooth devices in the Piconets to establish synchronization in the frequency domain and the time domain.

Synchronization in the frequency and time domains will be described.

In Bluetooth, a master, for example, sends a signal to a slave at a frequency width of 79 MHz. The master does not occupy the entire frequency width of 79 MHz at the same time to send information, but sends information by changing (hopping) the transmission frequency of the information at random at an frequency-width interval of 1 MHz.

The receiving slave establishes synchronization with the transmission frequency of the master, hopped at random, to change the receiving frequency, if necessary, to receive the information sent from the master.

The patterns of the frequencies changed by the master and the slave are called frequency-hopping patterns. When the master and the slave share a frequency-hopping pattern, synchronization in the frequency domain is established.

In Bluetooth, time-division multiplexing is applied to a communication path (channel) between the master and each slave at a time interval of 625 µs in order to allow communication between the master and a plurality of slaves. This time interval of 625 µs is called a time slot. When the time slot is shared, synchronization in the time domain is established.

As described later in detail, each of all slaves calculates a frequency-hopping pattern for establishing synchronization in the frequency domain, according to the Bluetooth address of the master, and adds an offset to the Bluetooth clock managed by the slave, according to the Bluetooth clock of the master to obtain the timing of the time-slot for establishing synchronization in the time domain.

Each Bluetooth device has a unique 48-bit Bluetooth address, and a frequency-hopping pattern is uniquely calculated according to the address. Each of all Bluetooth devices manages its own Bluetooth clock.

Therefore, before a Piconet is formed, various pieces of information, including the Bluetooth address and the Bluetooth clock used for establishing synchronization in the frequency domain and the time domain, are transmitted and received between the master and slaves.

Conventional processing of a Bluetooth device for establishing synchronization in the frequency domain and the time domain and for forming a Piconet will be described next by referring to flowcharts shown in FIG. 2 and FIG. 3.

A description will be made for processing for establishing synchronization among the master 1, the slave 1-1, and the slave 1-2 shown in FIG. 1, and for forming Piconet 1. Packets to be transmitted and received will be described later in detail. The entire flow will be described here.

In step S1, the master 1 broadcasts an IQ (inquiry) packet to detect a slave(s) existing therearound.

As shown in FIG. 1, for example, when there exist the slave 1-1 and the slave 1-2 in a vicinity of the master 1, the slave 1-1 receives in step S31 the IQ packet sent from the master 1, the processing proceeds to step S32, and the slave 1-1 sends a packet (FHS packet) indicating its own attribute information to the master.

In the same way, when the slave 1-2 receives the IQ packet in step S51, the processing proceeds to step S52, and the slave 1-2 sends an FHS packet to the master.

FHS packets sent from slaves to the master include the Bluetooth address and the Bluetooth clock of each slave, as slave attribute information.

The master 1 receives in step S2 the FHS packet sent from the slave 1-1, and receives in step S3 the FHS packet sent from the slave 1-2.

A series of processes from broadcasting an IQ packet to receiving an FHS packet sent in response to the IQ packet, performed by the master, and a series of processes from receiving a sent IQ packet to sending an FHS packet in response to the IQ packet, performed by slaves, are called an "inquiry".

In step S4, the master 1 sends an ID packet generated according to the FHS packet received in step S2, to the slave 1-1.

When the slave 1-1 receives the ID packet in step S33, the processing proceeds to step S34, and the slave 1-1 sends the same ID packet as that received, to the master 1 to report that packet transmission and receiving are possible.

When the master 1 receives in step S5 the ID packet sent from the slave 1-1, the processing proceeds to step S6, and the master 1 sends an FHS packet to the slave 1-1 to report the Bluetooth address and the Bluetooth clock of the master 1 as attribute information to the slave 1-1.

In step S35, the slave 1-1 receives the FHS packet from the master 1. With this, the master 1 and the slave 1-1 have mutually exchanged their Bluetooth addresses and Bluetooth clock, which are required to establish synchronization in the Piconet.

In step S36, the slave 1-1 sends an ID packet to the master 1 to report that the FHS packet has been received.

In step S37, the slave 1-1 establishes synchronization with the master 1 according to the Bluetooth address and the Bluetooth clock sent from the master 1. Processing of a slave for establishing synchronization according to information reported by the master will be described later in detail.

When the master 1 receives the report from the slave 1-1 in step S7, the processing proceeds to step S8, and, immediately after the master 1 has transmitted and received the FHS packets and the ID packets to and from the slave 1-1, the master 1 transmits and receives FHS packets and ID packets to and from the slave 1-2. In other words, the processes of step SB to step S11 performed by the master 1 and the processes of step S53 to step S57 performed by the slave 1-2 are the same as the processes of step S4 to step S7 and the processes of step S33 to step S37, described above.

More specifically, the master 1 sends an ID packet to the slave 1-2 in step S8, and in response to this transmission, the slave 1-2 sends an ID packet to report that the ID packet sent by the master 1 has been received. Then, the master 1 sends an FHS packet to the slave 1-2 in step S10 to report its own attribute information.

When the slave 1-2 receives the FHS packet from the master 1 in step S55, the processing proceeds to step S56, and the slave 1-2 sends an ID packet to the master 1. In step S57, the slave 1-2 establishes synchronization with the master 1 according to the Bluetooth address and Bluetooth clock reported by the master 1.

A series of processes from the "inquiry", described above, to the establishment of synchronization is called "paging".

In step S12, the master 1 requests the slave 1-1 to report the Bluetooth device name. A Bluetooth device name is assigned to each Bluetooth device, and the user can change the assignment.

A Bluetooth device name is used, for example, when the user who is operating the master selects the partner of communication. If the partner of communication needs to be selected by its Bluetooth address, the user needs to memorize the 48-bit numerals indicating the addresses of all Bluetooth devices existing in the Piconet.

When the slave 1-1 receives the request from the master 1 in step S38, the processing proceeds to step S39, and the slave 1-1 reports the assigned Bluetooth device name to the master 1.

In step S13, the master 1 receives the Bluetooth device name reported by the slave 1-1.

In step S14, the master 1 also requests the slave 1-2 to report the Bluetooth device name.

When the slave 1-2 receives the request from the master 1 in step S58, the processing proceeds to step S59, and the slave 1-2 reports the assigned Bluetooth device name to the master 1.

When the master 1 receives the report from the slave 1-2 in step S15, the processing proceeds to step S16, and the master 1 displays a screen for selecting a slave to be communicated with, in a display block. On this selection screen, the Bluetooth device names obtained in step S13 and step S15 are displayed. The user can use the selection screen to select a slave to be communicated with.

FIG. 4 is a view showing an example selection screen to be displayed on the Bluetooth device (master) after the establishment of synchronization.

As shown in the figure, a displayed selection window 1 is shown, and a master display block 11 in which information of the master operated by the user is indicated is provided at the left-hand side.

The master display block 11 is formed of a device-name display block 11A and an address display block 11B. The device-name display block 11A shows the Bluetooth device name of the master, and the address display block 11B shows the Bluetooth address of the master.

More specifically, the upper row of the device-name display block 11A indicates the category of the Bluetooth device of the master, and the lower row indicates the Bluetooth device name, which can be changed according to the user's desire. In this example case, the category of the master is set to "Computer" (personal computer), and the device name is set to "Computer for Red".

Almost at the center of the selection window 1, profile selection buttons 12 are shown vertically. The use selects a profile for a slave. A profile specifies the communication method for a slave. In FIG. 4, eight profile selection buttons 12 are shown.

At the right-hand side of the selection window 1, slave display blocks 13 to 19 are shown. Each slave display block has a device-name display block and an address display block in the same way as for the master display block 11.

In the example case shown in FIG. 4, communication are currently being performed between the master and the slave indicated by the slave display block 16. In the slave display block 16, the category of the Bluetooth device is set to "Portable telephone" and the Bluetooth device name is set to "Portable telephone for Red".

FIG. 5 is a view showing another example selection screen to be displayed on the Bluetooth device after the establishment of synchronization.

On a selection window 31, profiles are shown at the left-hand side, and the Bluetooth device names of slaves are shown with white arrows sandwiched between the profiles and the names. In this example case, the master can communicate, for example, with the slave (player for Black) indicated at the first row of the selection window 31 by Bluetooth using a profile for transmission of a music file.

When the Piconet has been established by the processes described above and communication are started, however, the user needs to specify the partner of communication although the Bluetooth devices with which communication can be made are listed as shown in FIG. 4 and FIG. 5.

After the user selects the partner of communication, the user further needs to select a profile according to the device of the partner.

As a system using Bluetooth, for example, a system has been proposed in which the charges for goods purchased at vending machines are paid by the use of portable telephones in which a Bluetooth module is built. It is expected that the partner of communication needs to be selected, as described above, even though its level of complication differs.

Therefore, compared with cases in which bills are actually used for payment, a purchase procedure for vending machines may become more troublesome.

DISCLOSURE OF INVENTION

The present invention has been made in consideration of the above situations. An object of the present invention is to allow a terminal serving as the partner of communication to be specified, and communication to be started more easily and quickly in communication using Bluetooth.

An information processing apparatus of a communication system according to the present invention is characterized by including first acquisition processing means for acquiring the identification information of a communication terminal located close by using a first wireless communication block for transferring electric power and for transmitting and receiving data by a loop antenna for the communication terminal, second acquisition processing means for acquiring the attribute information of each of a plurality of communication terminals, which include the communication terminal, from the plurality of communication terminals by using a second wireless communication block for transmitting and receiving data, specifying processing means for specifying the partner of communication by using the identification information acquired by the first acquisition processing means and the attribute information acquired by the second acquisition processing means, and first synchronization establishment processing means for establishing synchronization for wireless communication performed by using the communication terminal specified by the specifying processing means and the second wireless communication block. The communication terminal is characterized by including first providing processing means for providing the information processing apparatus with the identification information of the communication terminal by using a third wireless communication block for transmitting and receiving data by using at least part of induced electric power obtained through a loop antenna, second providing processing means for providing the attribute information of the communication terminal by using a fourth wireless communication block for transmitting and receiving data, in response to a request sent from the information processing apparatus through the second wireless communication block, and second synchronization establishment processing means for establishing synchronization by transmitting and receiving a predetermined signal through the fourth wireless communication block, in response to a request sent from the information processing apparatus when synchronization is established for wireless communication performed by the second wireless communication block.

An information processing method for an information processing apparatus, constituting a communication method according to the present invention is characterized by including a first acquisition processing step of acquiring the identification information of a communication terminal located close by using a first wireless communication block for transferring electric power and for transmitting and receiving data by a loop antenna for the communication terminal, a second acquisition processing step of acquiring the attribute information of each of a plurality of communication terminals, which include the communication terminal, from the plurality of communication terminals by using a second wireless communication block for transmitting and receiving data, a specifying processing step of specifying the partner of communication by using the identification information acquired in the first acquisition processing step and the attribute information acquired in the second acquisition processing step, and a first synchronization establishment processing step of establishing synchronization for wireless communication performed by using the communication terminal specified in the specifying processing step and the second wireless communication block. An information processing method for the communication terminal is characterized by including a first providing processing step of providing the information processing apparatus with the identification information of the communication terminal by using a third wireless communication block for transmitting and receiving data by using at least part of induced electric power obtained through a loop antenna, a second providing processing step of providing the attribute information of the communication terminal by using a fourth wireless communication block for transmitting and receiving data, in response to a request sent from the information processing apparatus through the second wireless communication block, and a second synchronization establishment processing step of establishing synchronization by transmitting and receiving a predetermined signal through the fourth communication block, in response to a request sent from the information processing apparatus when synchronization is established for wireless communication performed by the second wireless communication block.

A first information processing apparatus according to the present invention is characterized by including first acquisition processing means for acquiring identification information from a communication terminal by using a first wireless communication block for transmitting and receiving predetermined data, second acquisition processing means for acquiring the attribute information of each of a plurality of communication terminals, which include the communication terminal, from the plurality of communication terminals by using a second wireless communication block for transmitting and receiving desired data, specifying processing means for specifying the partner of communication by using the identification information acquired by the first acquisition processing means and the attribute information acquired by the second acquisition processing means, and synchronization establishment processing means for establishing synchronization for wireless communication performed by using the communication terminal specified by the specifying processing means and the second wireless communication block.

The wireless communicating distance by the first wireless communication block may be shorter than the wireless communicating distance by the second wireless communication block.

The first acquisition processing means may acquire the identification information of a communication terminal located close by using the first wireless communication block for transferring electric power and for transmitting and receiving data by a loop antenna for the communication terminal.

The attribute information may include address information which can identify each of the plurality of communication terminals and clock information managed by the communication terminal.

The information processing apparatus may further include activation processing means for activating the second wireless communication block in response to the acquisition of the identification information by the first acquisition processing means.

The information processing apparatus may be configured such that the identification information includes at least the Bluetooth address of the communication terminal, the second acquisition processing means acquires a plurality of FHS packets returned respectively by the plurality of communication terminals in response to IQ packets sent by using the second wireless communication block, and the synchronization establishment processing means sends an ID packet to the communication terminal specified by the specifying processing means, by using the second wireless communication block, and further sends an FHS packet of the information processing apparatus when the communication terminal responds to the transmission of the ID packet.

An information processing method for the first information processing apparatus, according to the preset invention is characterized by including a first acquisition processing step of acquiring identification information from a communication terminal by using a first wireless communication block for transmitting and receiving predetermined data, a second acquisition processing step of acquiring the attribute information of each of a plurality of communication terminals, which include the communication terminal, from the plurality of communication terminals by using a second wireless communication block for transmitting and receiving desired data, a specifying processing step of specifying the partner of communication by using the identification information acquired in the first acquisition processing step and the attribute information acquired by the second acquisition processing step, and a synchronization establishment processing step of establishing synchronization for wireless communication performed by using the communication terminal specified in the specifying processing step and the second wireless communication block.

The wireless communicating distance by the first wireless communication block may be shorter than the wireless communicating distance by the second wireless communication block.

In the first acquisition processing step, the identification information of a communication terminal located close may be acquired by using the first wireless communication block for transferring electric power and for transmitting and receiving data by a loop antenna for the communication terminal.

The attribute information may include address information which can identify each of the plurality of communication terminals and clock information managed by the communication terminal.

The information processing method may be configured such that, in the second acquisition processing step, a plurality of FHS packets returned respectively by the plurality of communication terminals in response to IQ packets sent by using the second wireless communication block are received, and, in the synchronization establishment processing step, an ID packet is sent to the communication terminal specified in the specifying processing step, by using the second wireless communication block, and an FHS packet of the information processing apparatus is further sent when the communication terminal responds to the transmission of the ID packet.

A communication terminal according to the present invention is characterized by including first providing processing means for providing its own identification information by using a first wireless communication block for transmitting and receiving predetermined data, in response to a predetermined request sent from an information processing apparatus, second providing processing means for providing its own attribute information by using a second wireless communication block for transmitting and receiving data, in response to a predetermined request sent from the information processing apparatus, and synchronization establishment processing means for establishing synchronization by transmitting and receiving a predetermined signal through the second wireless communication block, in response to a request sent from the information processing apparatus when synchronization is established for wireless communication performed by the second wireless communication block.

The wireless communicating distance by the first wireless communication block may be shorter than the wireless communicating distance by the second wireless communication block.

The first providing processing means may provide the identification information of the communication terminal by using the first wireless communication block for transmitting and receiving data by using at least part of induced electric power obtained through a loop antenna, in response to a predetermined request sent from the information processing apparatus.

The identification information may include at least address information which can identify the communication terminal.

The attribute information may include the address information and clock information managed by the communication terminal.

The communication terminal may further includes activation processing means for activating the second wireless communication block in response to the provision of the identification information by the first providing processing means.

The communication terminal may be configured such that the identification information includes at least Bluetooth address information, the second providing processing means sends an FHS packet in response to an IQ packet received by using the second wireless communication block, and the synchronization establishment processing means returns, in response to an ID packet received by using the second wireless communication block, the ID packet, and returns the ID packet again when an FHS packet is further received.

A communication method for a communication terminal, according to the present invention is characterized by including a first providing processing step of providing its own identification information by using a first wireless communication block for transmitting and receiving predetermined data, in response to a predetermined request sent from an information processing apparatus, a second providing processing step of providing its own attribute information by using a second wireless communication block for transmitting and receiving data, in response to a predetermined request sent from the information processing apparatus, and a synchronization establishment processing step of establishing synchronization by transmitting and receiving a predetermined signal through the second wireless communication block, in response to a request sent from the information processing apparatus when synchronization is established for wireless communication performed by the second wireless communication block.

In the first providing processing step, its own identification information may be provided by using the first wireless communication block for transmitting and receiving data by using at least part of induced electric power obtained through a loop antenna, in response to a predetermined request sent from the information processing apparatus.

The identification information may include at least address information which identifies its own terminal.

The attribute information may include the address information and clock information managed by its own terminal.

The communication method may further include an activation processing step of activating the second wireless communication block in response to the provision of the identification information in the first providing processing step.

The communication method may be configured such that the identification information includes at least Bluetooth address information; in the second providing processing step, an FHS packet is sent in response to an IQ packet received by using the second wireless communication block; and, in the synchronization establishment processing step, in response to an ID packet received by using the second wireless communication block, the ID packet is returned, and the ID packet is returned again when an FHS packet is further received.

A first extension apparatus according to the present invention is characterized by including a connection terminal electrically connected to an information processing apparatus, for transmitting and receiving data, first acquisition processing means for acquiring identification information from a communication terminal by using a first wireless communication block for transmitting and receiving predetermined data, second acquisition processing means for acquiring the attribute information of each of a plurality of communication terminals from the plurality of communication terminals by using a second wireless communication block for transmitting and receiving desired data, specifying processing means for specifying the partner of communication by using the identification information acquired by the first acquisition processing means and the attribute information acquired from the plurality of communication terminals, and synchronization establishment processing means for establishing synchronization for wireless communication performed by using the communication terminal specified by the specifying processing means and the second wireless communication block.

A second extension apparatus according to the present invention is characterized by including a connection terminal electrically connected to the communication terminal, for transmitting and receiving data, first providing processing means for providing its own identification information by using a first wireless communication block for transmitting and receiving predetermined data, in response to a request sent from an information processing apparatus, second providing processing means for providing its own attribute information by using a second wireless communication block for transmitting and receiving data, in response to a request sent from the information processing apparatus, and synchronization establishment processing means for establishing synchronization by transmitting and receiving a predetermined signal through the second wireless communication block, in response to a request sent from the information processing apparatus when synchronization is established for wireless communication performed by the second wireless communication block.

A first program according to the present invention is characterized by making an information processing apparatus execute a first acquisition processing step of acquiring identification information from a communication terminal by using a first wireless communication block for transmitting and receiving predetermined data, a second acquisition processing step of acquiring the attribute information of each of a plurality of communication terminals, which include the communication terminal, from the plurality of communication terminals by using a second wireless communication block for transmitting and receiving desired data, a specifying processing step of specifying the partner of communication by using the identification information acquired in the first acquisition processing step and the attribute information acquired in the second acquisition processing step, and a synchronization establishment processing step of establishing synchronization for wireless communication performed by using the communication terminal specified in the specifying processing step and the second wireless communication block.

A second program according to the present invention is characterized by making a communication terminal execute a first providing place step of providing its own identification information by using a first wireless communication block for transmitting and receiving predetermined data, in response to a predetermined request sent from an information processing apparatus, a second providing processing step of providing its own attribute information by using a second wireless communication block for transmitting and receiving data, in response to a predetermined request sent from the information processing apparatus, and a synchronization establishment processing step of establishing synchronization by transmitting and receiving a predetermined signal through the second wireless communication block, in response to a request sent from the information processing apparatus when synchronization is established for wireless communication performed by the second wireless communication block.

A second information processing apparatus according to the present invention is characterized by including first acquisition processing means for acquiring identification information from a communication terminal by using a first wireless communication block for transmitting and receiving predetermined data, storage processing means for storing, as history information, information related to a plurality of communication terminals with which communication were performed by using a second wireless communication block for transmitting and receiving desired data, specifying processing means for specifying the partner of communication by using the identification information acquired by the first acquisition processing means and the history information, and synchronization establishment processing means for establishing synchronization for wireless communication performed by using the communication terminal specified by the specifying processing means and the second wireless communication block.

The information processing apparatus may be configured such that the history information includes at least Bluetooth address information, and the synchronization establishment processing means sends an ID packet generated according to the Bluetooth address information to the communication terminal specified by the specifying processing means, and, when a response to the ID packet is made by the communication terminal, further sends its own FHS packet.

In a communication system and a communication method according to the present invention, the identification information of a communication terminal located close is acquired by using a first wireless communication block for transferring electric power and for transmitting and receiving data by a loop antenna for the communication terminal, the attribute information of each of a plurality of communication terminals, which include the communication terminal, is acquired from the plurality of communication terminals by using a second wireless communication block for transmitting and receiving data, and the partner of communication is specified by using the identification information and the attribute information. Then, synchronization is established for wireless communication performed by using the specified communication terminal and the second wireless communication block. The identification information of the communication terminal is provided for an information processing apparatus by using a third wireless communication block for transmitting and receiving data by using at least part of induced electric power obtained through a loop antenna, the attribute information of the communication terminal is provided by using a fourth wireless communication block for transmitting and receiving data, in response to a request sent from the information processing apparatus through the second wireless communication block, and synchronization is established by transmitting and receiving a predetermined signal through the fourth communication block, in response to a request sent from the information processing apparatus when synchronization is established for wireless communication performed by the second wireless communication block.

In a first information processing apparatus, an information processing method, and a program according to the present invention, identification information is acquired from a communication terminal by using a first wireless communication block for transmitting and receiving predetermined data, the attribute information of each of a plurality of communication terminals, which include the communication terminal, is acquired from the plurality of communication terminals by using a second wireless communication block for transmitting and receiving desired data, and the partner of communication is specified by using the acquired identification information and the acquired attribute information. Synchronization is also established for wireless communication performed by using the specified communication terminal and the second wireless communication block.

In a communication terminal, a communication method, and a program according to the present invention, its own identification information is provided by using a first wireless communication block for transmitting and receiving predetermined data, in response to a predetermined request sent from an information processing apparatus, and its own attribute information is provided by using a second wireless communication block for transmitting and receiving data, in response to a predetermined request sent from the information processing apparatus. Synchronization is also established by transmitting and receiving a predetermined signal through the second wireless communication block, in response to a request sent from the information processing apparatus when synchronization is established for wireless communication performed by the second wireless communication block.

In a first extension apparatus according to the present invention, identification information is acquired from a communication terminal by using a first wireless communication block electrically connected to an information processing apparatus, for transmitting and receiving predetermined data, and the attribute information of each of a plurality of communication terminals is acquired from the plurality of communication terminals by using a second wireless communication block for transmitting and receiving desired data. The partner of communication is specified by using the acquired identification information and the attribute information acquired from the plurality of communication terminals, and synchronization is established for wireless communication performed by using the specified communication terminal and the second wireless communication block.

In a second extension apparatus according to the present invention, its own identification information is provided by using a connection terminal electrically connected to a communication terminal, for transmitting and receiving data, and a first wireless communication block for transmitting and receiving predetermined data, in response to a request sent from an information processing apparatus, and its own attribute information is provided by using a second wireless communication block for transmitting and receiving data, in response to a request sent from the information processing apparatus. Then, synchronization is established by transmitting and receiving a predetermined signal through the second wireless communication block, in response to a request sent from the information processing apparatus when synchronization is established for wireless communication performed by the second wireless communication block.

In a second information processing apparatus according to the present invention, identification information is acquired from a communication terminal by using a first wireless communication block for transmitting and receiving predetermined data, information related to a plurality of communication terminals with which communication were performed by using a second wireless communication block for transmitting and receiving desired data is stored as history information, and the partner of communication is specified by using the acquired identification information and history information. Synchronization is also established for wireless communication performed by using the specified communication terminal and the second wireless communication block.

BRIEF DESCRIPTION OF THE DRAWINGS

FIG. 18 is a view showing example specifications of the non-contact IC card shown in FIG. 17.

FIG. 23 is a flowchart following that shown in FIG. 21, describing the other processes of the communication system shown in FIG. 6.

BEST MODE FOR CARRYING OUT THE INVENTION

Figure 6:
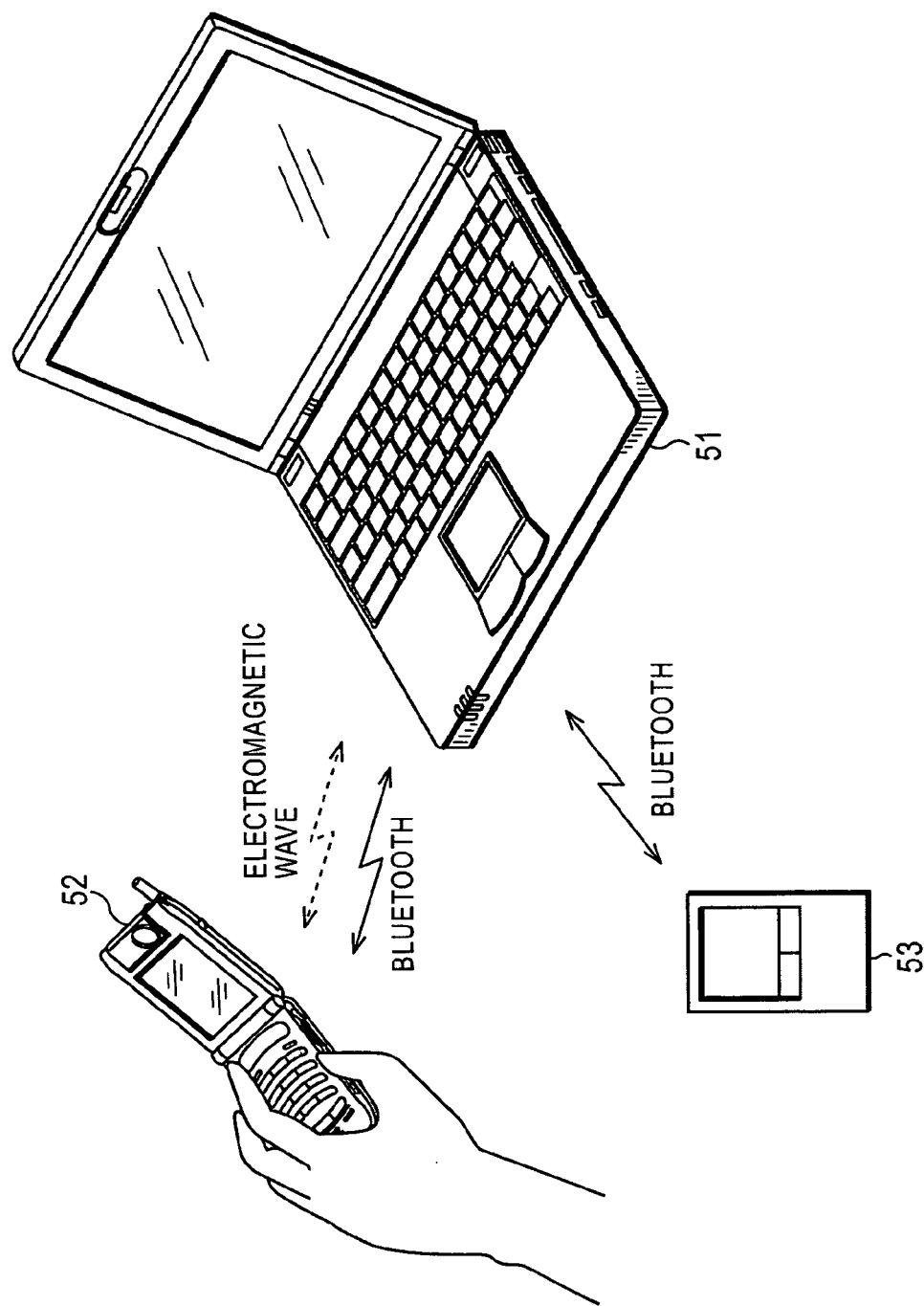
FIG. 6 is a view showing an example structure of a communication system to which the present invention is applied.

FIG. 6 is a view showing an example structure of a communication system to which the present invention is applied.

In the communication system shown in FIG. 6, a personal computer 51, a portable telephone 52, and a PDA (personal digital assistant) 53 each have a Bluetooth module therein, and can transmit and receive various pieces of information by short-distance wireless communication conforming to Bluetooth.

The portable telephone 52 also has a non-contact IC card (IC tag) 246 (see FIG. 16) therein. The personal computer 51 is provided with a non-contact-IC-card reader/writer 105 (see FIG. 11) for reading and writing various pieces of information to and from the non-contact IC card 246. Therefore, communication can be performed between the personal computer 51 and the portable telephone 52 not only by Bluetooth communication but also through electromagnetic waves emitted from the non-contact-IC-card reader/writer 105.

In the communication system to which the present invention is applied, when the personal computer 51 serves as the mater of a Piconet, for example, the personal computer 51 specifies the portable telephone 52 as a slave for performing communication by Bluetooth, according to information obtained from the portable telephone 52 through electromagnetic waves, and performs processing (the above-described inquiry processing) for establishing synchronization in the Piconet.

The processing will be described later in detail by referring to a flowchart. When the user brings the portable telephone 52 closer to the personal computer 51 and the portable telephone 52 receives electromagnetic waves emitted by the non-contact-IC-card reader/writer 105 of the personal computer 51, the non-contact IC card 246 built in the portable telephone 52 sends identification information (hereinafter called a card ID) already specified, to the personal computer 51.

The card ID is the same information, for example, as the Bluetooth address (information thereof) specified for the portable telephone 52. When the personal computer 51 obtains the Bluetooth addresses of the portable telephone 52 and the PDA 53 by the above-described inquiry, the personal computer 51 refers to the Bluetooth address already reported to identify the portable telephone 52 corresponding thereto, and specifies as the partner of communication.

Therefore, in FIG. 6, both of the portable telephone 52 and the PDA 53 respond to the inquiry of the personal computer 51, but paging performed thereafter is performed only between the personal computer 51 and the portable telephone 52.

With these processes, the user can start Bluetooth communication just by bringing the portable telephone 52 closer to the personal computer 51 as shown in the figure without selecting the partner of communication on the selection screen described above.

When the user sends predetermined data from the PDA 53 to the personal computer 51 by Bluetooth, for example, the user needs to select the personal computer 51 as the partner of communication on the above-described screen. When the user sends data from the portable telephone 52, the user can send predetermined data to the personal computer 51 without performing such a troublesome process.

The structure of the communication system shown in FIG. 6 will be described next.

Figure 7:
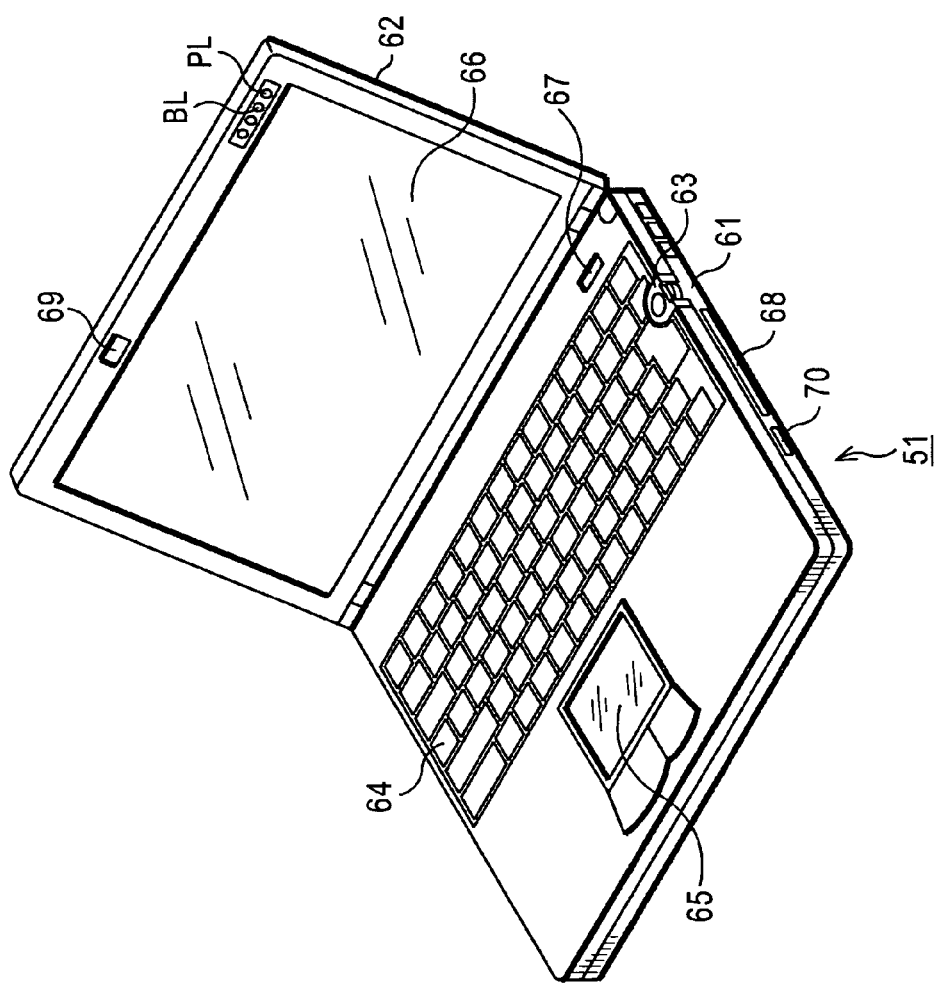
FIG. 7 is a view showing an example appearance of a personal computer shown in FIG. 6.
Figure 8:
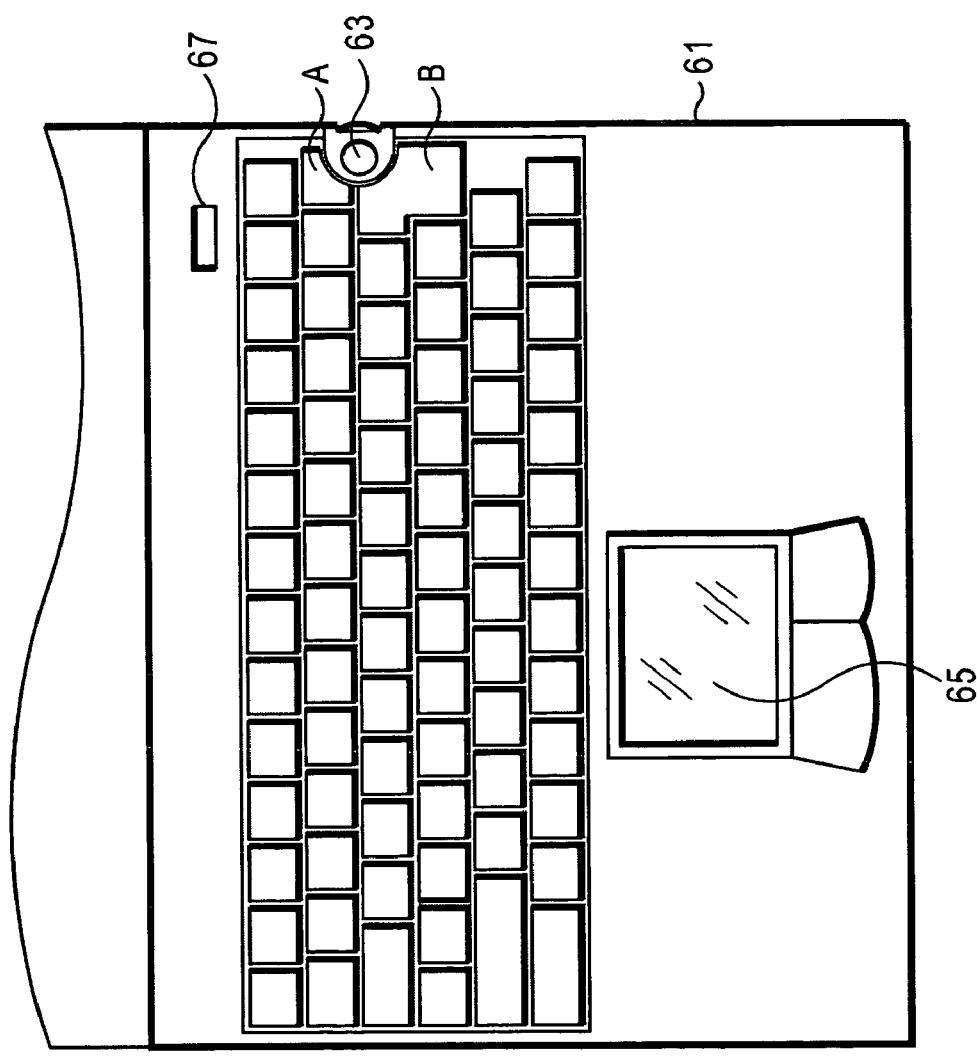
FIG. 8 is a view showing another example appearance of the personal computer shown in FIG. 6.
Figure 9:
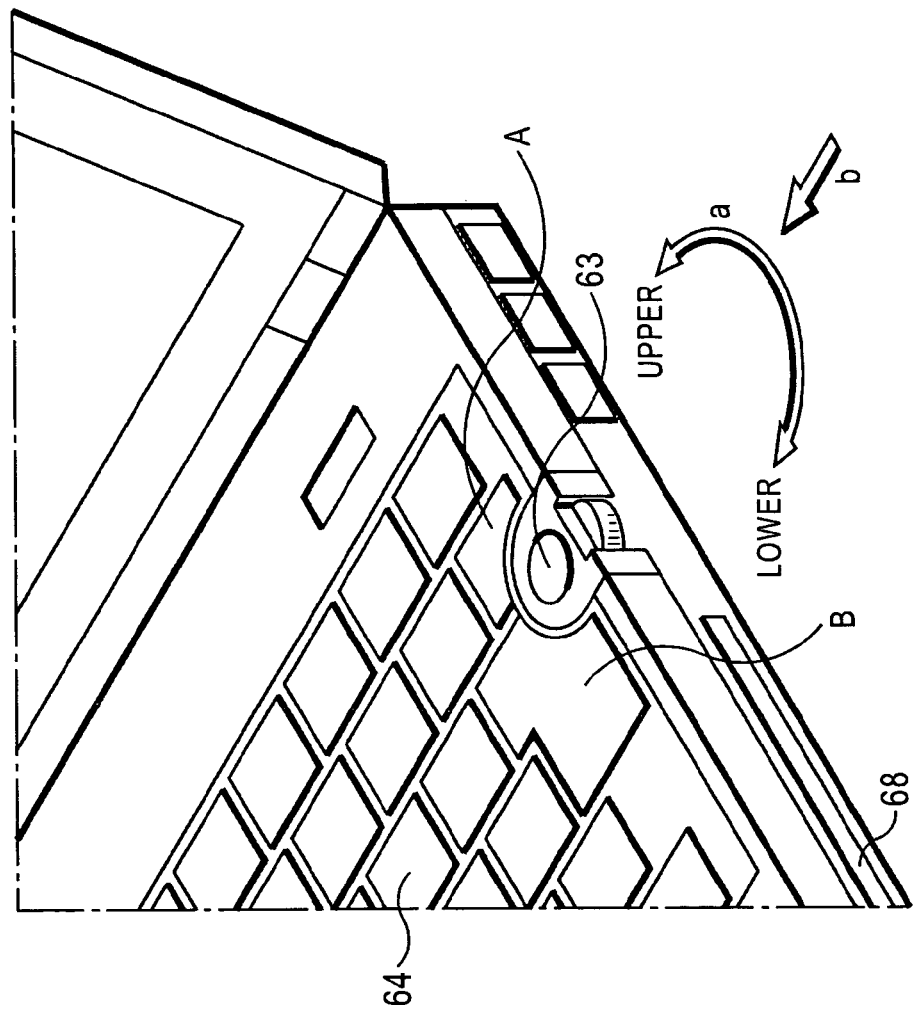
FIG. 9 is a view showing still another example appearance of the personal computer shown in FIG. 6.
Figure 10:
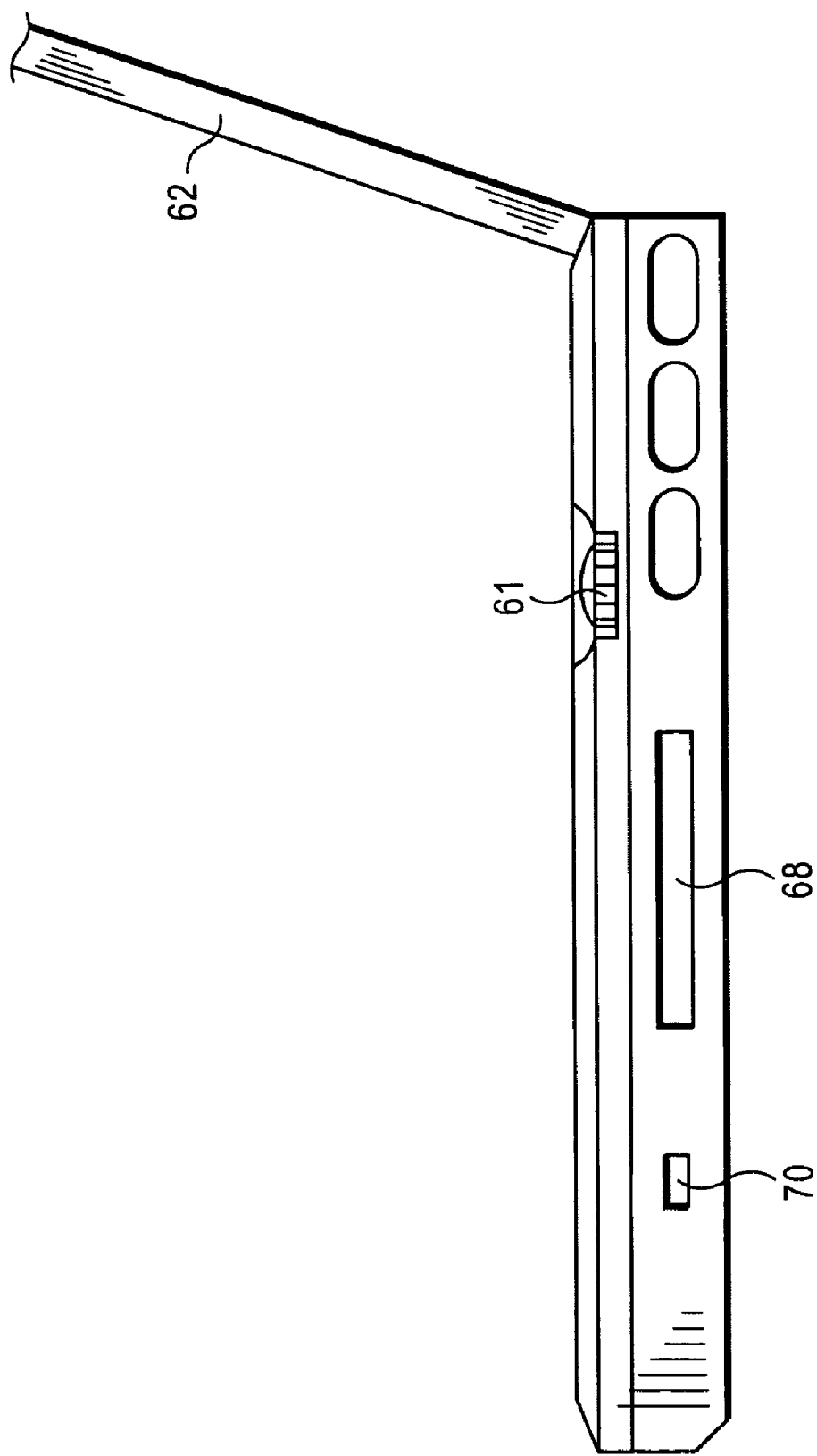
FIG. 10 is a view showing a side face of the personal computer shown in FIG. 6.

FIG. 7 to FIG. 10 show appearances of the personal computer 51 shown in FIG. 6. This notebook-type personal computer 51 is basically formed of a body 61 and a display block 62 which can be opened and closed against the body 61. FIG. 7 is a perspective appearance view showing a state in which the display block 62 is opened against the body 61. FIG. 8 is a plan of the body 61. FIG. 9 is an enlarged view of a portion around a jog dial 63, described later, provided for the body 61. FIG. 10 is a side view of the body 61, viewed from the jog dial 63 side.

The body 61 is provided at its upper surface with a keyboard 64 operated when various characters and symbols are input, a touch sensitive pad 65 serving as a pointing device operated when a pointer (mouse cursor) is moved, and a power switch 67, and is also provided at a side face with the jog dial 63, a slot 68, an IEEE-1394 port 70, and others. Instead of the touch sensitive pad 65, a stick-type pointing device, for example, can be provided.

At the front surface of the display block 62, an LCD (liquid-crystal display) 66 for displaying images is provided. At an upper right portion of the display block 62, a power lamp PL, a battery lamp BL, and other LED lamps such as a message lamp ML, if necessary, are provided. The power lamp PL, the battery lamp BL, the message lamp ML, and others can be provided at a lower portion of the display block 62.

The jog dial 63 is incorporated between keys of the keyboard 64 in the body 61 so as to have almost the same height as the keys. The jog dial 63 is used for executing predetermined processes when rotated in directions indicated by an arrow "a" in FIG. 9, and for executing a process when pressed in a direction indicated by an arrow "b". The jog dial 63 may be located at the left-hand side of the body 61. Alternatively, the jog dial 63 may be located at the left-hand side or the right-hand side of the display block 62 provided with the LCD 66, or may be located between the "G" key and the "H" key of the keyboard 64 in the vertical direction. The jog dial 63 may also be located at a center portion of the front part so as to be able to be operated by a thumb while the touch sensitive pad 65 is operated by a forefinger. Alternatively, the jog dial 63 may be located in the horizontal direction along the upper edge or the lower edge of the touch sensitive pad 65, or may be located in the vertical direction between the right button and the left button of the touch sensitive pad 65. Further, the jog dial 63 may be located at a predetermined angle in a tilted direction where it is easier to operate the jog dial 63 by fingers without limiting the direction to the vertical direction or the horizontal direction. Furthermore, the jog dial 63 may be located at a side of a mouse serving as a pointing device, where the jog dial 63 can be operated by a thumb.

Figure 11:
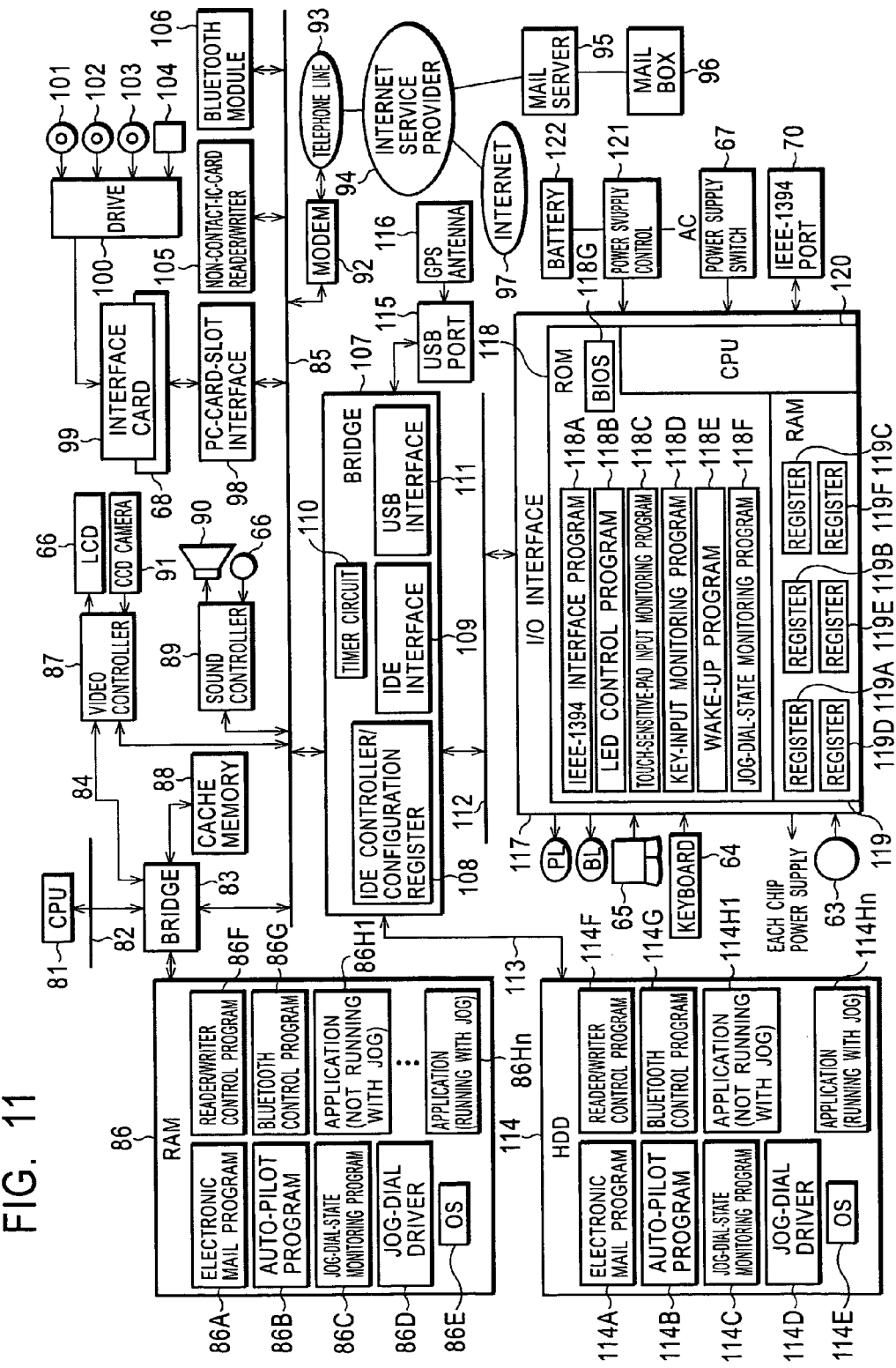
FIG. 11 is a block diagram showing an example structure of the personal computer shown in FIG. 6.

FIG. 11 is a block diagram showing the electric structure of the personal computer 51.

A CPU (central processing unit) 81 is, for example, formed of a Pentium (registered trademark) processor manufactured by Intel Corporation or others, and is connected to a host bus 82. The host bus 82 is further connected to a bridge 83, and the bridge 83 is also connected to an AGP (accelerated graphics port) 84 and to a PCI bus 85. The bridge 83 is, for example, formed of 400BX manufactured by Intel Corporation, and controls devices around the CPU 81 and a RAM 86 (random access memory). Further, the bridge 83 is connected to a video controller 87 through the AGP 84. The bridge 83 and a bridge 107 form a so-called chip set.

The bridge 83 is also connected to the RAM 86 and to a cache memory 88. The cache memory 88 caches data used by the CPU 81. Although not shown in the figure, a primary cache memory is built in the CPU 81.

The RAM 86 is, for example, formed of a DRAM (dynamic random access memory), and stores a program executed by the CPU 81 and data required for the performance of the CPU 81. More specifically, when the RAM 86 has been activated, an electronic mail program 86A, an auto-pilot program 86B, a jog-dial-state monitoring program 86C, a jog-dial driver 86D, an operating program (OS) 86E, a reader/writer control program 86F, a Bluetooth control program 86G, and other application programs 86H1 to 86Hn are transferred from an HDD 114 to the RAM 86, and stored in the RAM 86.

The electronic mail program 84A sends and receives correspondence via a modem 92 from a communication line such as a telephone line 93 through a network. The electronic mail program 84A has a receiving-mail acquisition function as a special function. The receiving-mail acquisition function determines whether mail transmitted to the user has been stored in a mail box 96 in a mail server 95 provided for an Internet service provider 94, and, when mail transmitted to the user has been stored, acquires the mail.

The auto-pilot program 86B sequentially activates a plurality of processes (or programs) specified in advance in the order specified in advance and performs the processes.

The jog-dial-state monitoring program 86C receives from the application programs 86H1 to 86Hn whether they can be operated with the jog dial. When an application program can be operated with the jog dial, the jog-dial-state monitoring program 86C performs a process to display operations which can be executed by operating the jog dial 63 to the user by the use of the user interface function of the application program. The jog-dial-state monitoring program 86C is usually waiting for an event for the jog dial 63, and has a list for receiving reports from the application programs. A jog-dial driver 86D executes various functions correspondingly to operations on the jog dial 63.

The OS (operating system) 86E controls the basic operations of the computer. Typical operating systems include Windows (registered trademark) 95 and Windows (registered trademark) 98 of Microsoft, Inc., and MAC OS (registered trademark) of Apple Computer, Inc.

The reader/writer control program 86F controls a non-contact-IC-card reader/writer 105 (hereinafter called a reader/writer 105, if necessary) to detect a terminal having a non-contact IC card therein and located close to the personal computer 51, and transmits and receives various pieces of information to and from the terminal with electromagnetic waves.

The Bluetooth control program 86G controls a Bluetooth module 106 to detect a Bluetooth device existing in a vicinity, to establish synchronization in order to communicate with the Bluetooth device, and to perform other processes.

The video controller 87 is connected to the PCI bus 85, is further connected to the bridge 83 through the AGP 84, and controls the display of the LCD 66 according to data sent through the PCI bus 85 or the AGP 84.

The PCI bus 85 is connected to a sound controller 89, and it is connected to a speaker 90 and a microphone 66. The sound controller 89 receives an audio input at the microphone 66, and sends an audio signal to the speaker 90.

The PCI bus 85 is also connected to the modem 92 and to a PC-card-slot interface 98.

The modem 92 can be connected to the Internet 97 or to the mail server 95 through the telephone line 93 and the Internet service provider 94.

To add an optional function, an interface card 99 is mounted to the slot 68 connected to the PC-card-slot interface 98, which allows data to be sent and received to and from an external apparatus. For example, the interface card 99 can be connected to a drive 100, and can send and receive data to and from a magnetic disk 101, an optical disk 102, an magneto-optical disk 103, a semiconductor memory 104, and others inserted into the drive 100.

The drive 100, which sends and receives data to and from the magnetic disk 101, the optical disk 102, the magneto-optical disk 103, and the semiconductor memory 105 can also be connected through a USB port 115.

The PCI bus 85 is further connected to the bridge 107. The bridge 107 is, for example, formed of PIIX4E manufactured by Intel Corporation, and controls various input-and-output operations. More specifically, the bridge 107 is formed of an IDE (integrated drive electronics) controller/configuration register 108, an IDE interface 109, a timer circuit 110, and a USB (universal serial bus) interface 111, and controls a device connected to an IDE bus 113, a device connected to a USB port 115, or a device connected through an ISA/EIO (industry standard architecture/extended input output) bus 112 and the I/O interface 117.

When a GPS (global positioning system) antenna 116 is mounted to the USB port 115, for example, the USB interface 111 sends position data and time data sent from the GPS antenna 116, to the CPU 81 through the PCI bus 85, the bridge 83, and the host bus 82.

The IDE controller/configuration register 108 is formed of two IDE controllers, so-called primary IDE and secondary IDE controllers, a configuration register, and others.

The primary IDE controller is connected to a connector (not shown) through the IDE bus 113, and the connector is connected to the HDD 114. The secondary IDE controller can be connected to an external apparatus through another IDE bus (not shown).

The HDD 114 stores an electronic mail program 114A, an auto-pilot program 114B, a jog-dial-state monitoring program 114C, a jog-dial driver 114D, an OS (operating program) 114E, a reader/writer control program 114F, a Bluetooth control program 114G, and other application programs 114H1 to 114Hn, and data used in these programs. The programs 114A to 114Hn stored in the HDD 114 is sequentially transferred to the RAM 86 and stored therein during activation (booting-up) processing.

The ISA/EIO bus 112 is further connected to the I/O interface 117. The I/O interface 117, a ROM 118, a RAM 119, and a CPU 120 are mutually connected.

The ROM 118 stores, for example, an IEEE-1394 interface program 118A, a LED control program 118B, a touch-sensitive-pad-input monitoring program 118C, a key-input monitoring program 118D, a wake-up program 118E, and a jog-dial-state monitoring program 118F in advance.

The IEEE-1394 interface program 118A inputs and outputs through an IEEE-1394 input-and-output port 70 data conforming to IEEE 1394. The LED control program 118B controls the turning on of the power lamp PL, the battery lamp BL, and other LED lamps such as the message lamp ML, if necessary. The touch-sensitive-pad-input monitoring program 118C monitors an input made by the user with the use of the touch sensitive pad 65. The key-input monitoring program 118D monitors an input made by the user with the use of the keyboard 64 or other key switches. The wake-up program 118E determines according to the current-time data sent from the timer circuit 110 of the bridge 108 whether the time specified in advance has been reached. When the specified time has been reached, the wake-up program 118E manages each chip power supply in order to activate a predetermined process (or program). The jog-dial-state monitoring program 118F always monitors the rotation of the rotation-type encoder block of the jog dial 63 or the pressing of the jog dial 63.

A BIOS (basic input/output system) 118G is further written in the ROM 118. The BIOS means a basic input and output system, and is a software program which controls data input and output between the OS and the application programs, and peripheral units (such as the display, the keyboard, and the HDD).

The RAM 119 has a LED-control register, a touch-sensitive-panel input-status register, a key input status register, a time setting register, an I/O register for monitoring a jog-dial state, an IEEE-1394 interface register, and others as registers 119A to 119F. When the jog dial 63 is pressed, the LED-control register controls the turning on of the message lamp ML, which displays the instantaneous rising state of electronic mail. When the jog dial 63 is pressed, the key-input status register stores an operation key flag. The time setting register can set any time.

The I/O interface 117 is also connected to the jog dial 63, the keyboard 64, the touch sensitive pad 65, the IEEE-1394 input-and-output port 70 through connectors not shown. When the user performs an operation by using the jog dial 63, the keyboard 64, or the touch sensitive panel 65, the I/O interface 117 receives a signal corresponding to the operation from the jog dial 63, the keyboard 64, or the touch sensitive panel 65, and outputs the signal to the ISA/EIO bus 112. Further, the I/O interface 117 sends and receives data to and from the outside through the IEEE-1394 input-and-output port 70. The I/O interface 117 is also connected to the power lamp PL, the battery lamp BL, the message lamp ML, a power-supply control circuit 121, and other lamps formed of LEDs.

The power-supply control circuit 121 is connected to a built-in battery 122 or to AC power, supplies necessary power to each block, and performs the control of the charging of the built-in battery 122 and a secondary battery for a peripheral apparatus. The CPU 120 monitors through the I/O interface 117 a power switch 67 operated to turn on or off the power.

Even when the power is off, the CPU 120 can always execute the IEEE-1394 interface program 118A to the BIOS 118G by the use of an internal power supply. More specifically, even when any windows are not opened on the LCD 66 of the display block 62, the IEEE-1394 interface program 118A to the BIOS 118G are always operating. Therefore, even when the power switch is turned off and the OS 86E is not activated by the CPU 81, the CPU 120 is always executing the jog-dial-state monitoring program 118E to have a programmable-power-key (PPK) function without providing a special key for the personal computer 51. When the personal computer 51 is in a power save state or in a power off state, for example, the user can activate desired software or a desired script file just by pressing the jog dial 63.

Figure 12:
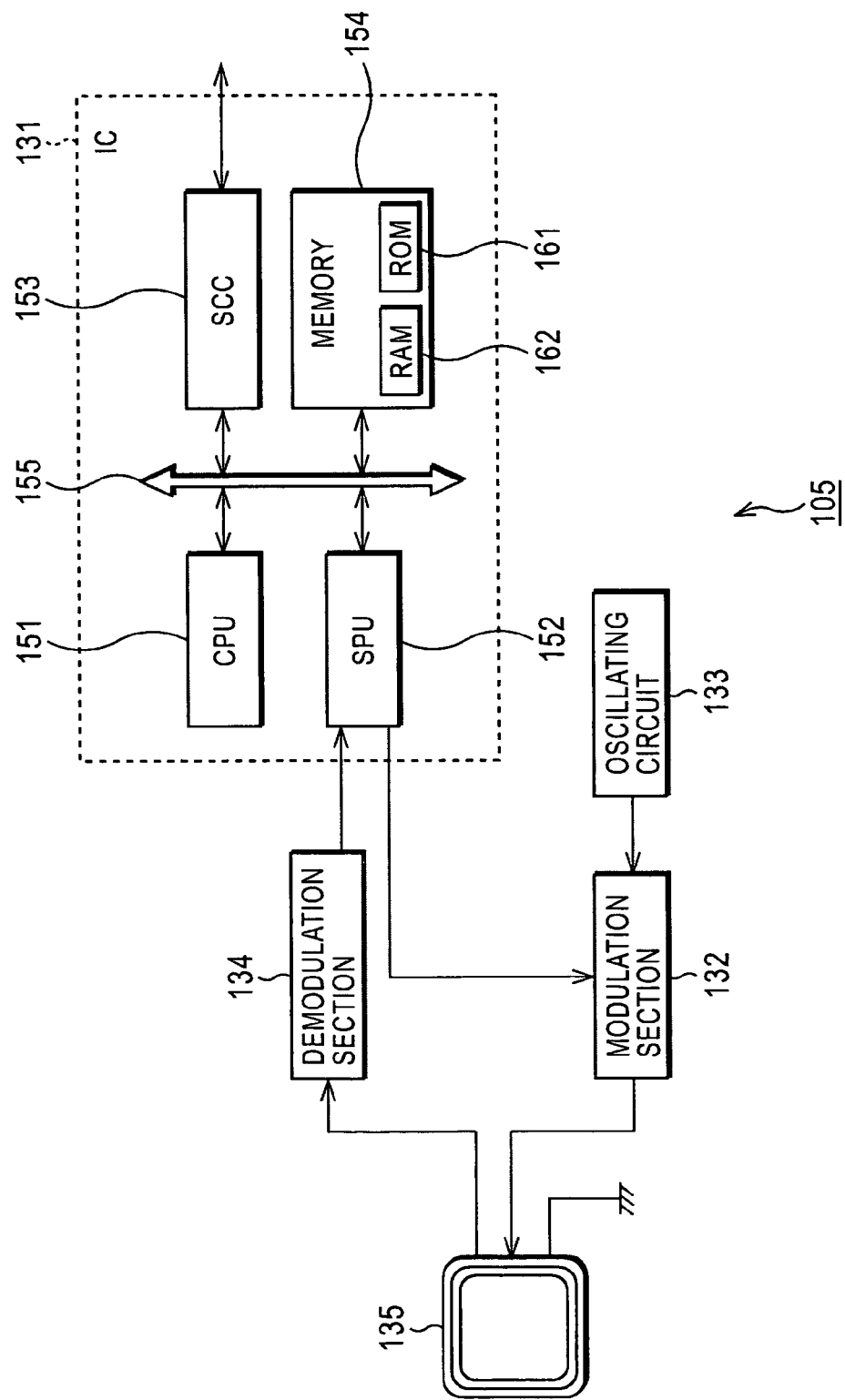
FIG. 12 is a block diagram showing an example structure of a non-contact-IC-card reader/writer shown in FIG. 11.

FIG. 12 is a block diagram showing an example detailed structure of the non-contact-IC-card reader/writer 105 shown in FIG. 11.

An IC 131 is formed of a CPU 151, a SPU (signal processing unit) 152, a SCC (serial communication controller) 153, and a memory 154. The memory 154 is formed of a ROM 161 and a RAM 161. The CPU 151 to the memory 154 are mutually connected through a bus 155.

The CPU 151 develops in the RAM 162 a control program stored in the ROM 161 to execute various processes according to response data sent from the non-contact IC card 246 and a control signal sent from the CPU 81 shown in FIG. 11. For example, the CPU 151 generates a command to be sent to the non-contact IC card 246, outputs the command to the SPU 152 through the bus 155, and applies an authentication process to data sent from the non-contact IC card 246.

When the portable telephone 52 is located close to the CPU 151 and the card ID is reported by a process performed by each block, described later, the CPU 151 reports the card ID to the Bluetooth module 106 and performs other processes under the control of the CPU 81.

When response data sent from the non-contact IC card 246 is sent from a demodulation block 134 to the SPU 152, the SPU 152 applies, for example, BPSK (binary phase shift keying) modulation (decoding of Manchester code) to the data and sends obtained data to the CPU 151. When a command to be sent to the non-contact IC card 246 is sent through the bus 155 to the SPU 152, the SPU 152 applies BPSK modulation (encoding to form Manchester code) to the command and outputs obtained data to a modulation block 132.

The SCC 153 sends data sent from the CPU 81, to the CPU 151 through the bus 155, and outputs data sent from the CPU 151 through the bus 155, to the CPU 81.

The modulation block 132 applies ASK (amplitude shift keying) modulation to a carrier wave having a predetermined frequency (for example, 13.56 MHz) sent from an oscillating circuit (OSC) 133, according to data sent from the SPU 152, and outputs a generated modulated wave from an antenna 135 as an electromagnetic wave. The demodulation block 134 demodulates a modulated wave (ASK-modulated wave) obtained through the antenna 135, and outputs demodulated data to the SPU 152.

The antenna 135 emits a predetermined electromagnetic wave, and determines according to a change in the load thereof whether the non-contact IC card 246 (portable telephone 52) is located close. When it is determined that the non-contact IC card 246 is located close, the antenna 135 sends and receives various types of data to and from the non-contact IC card 246.

Figure 13:
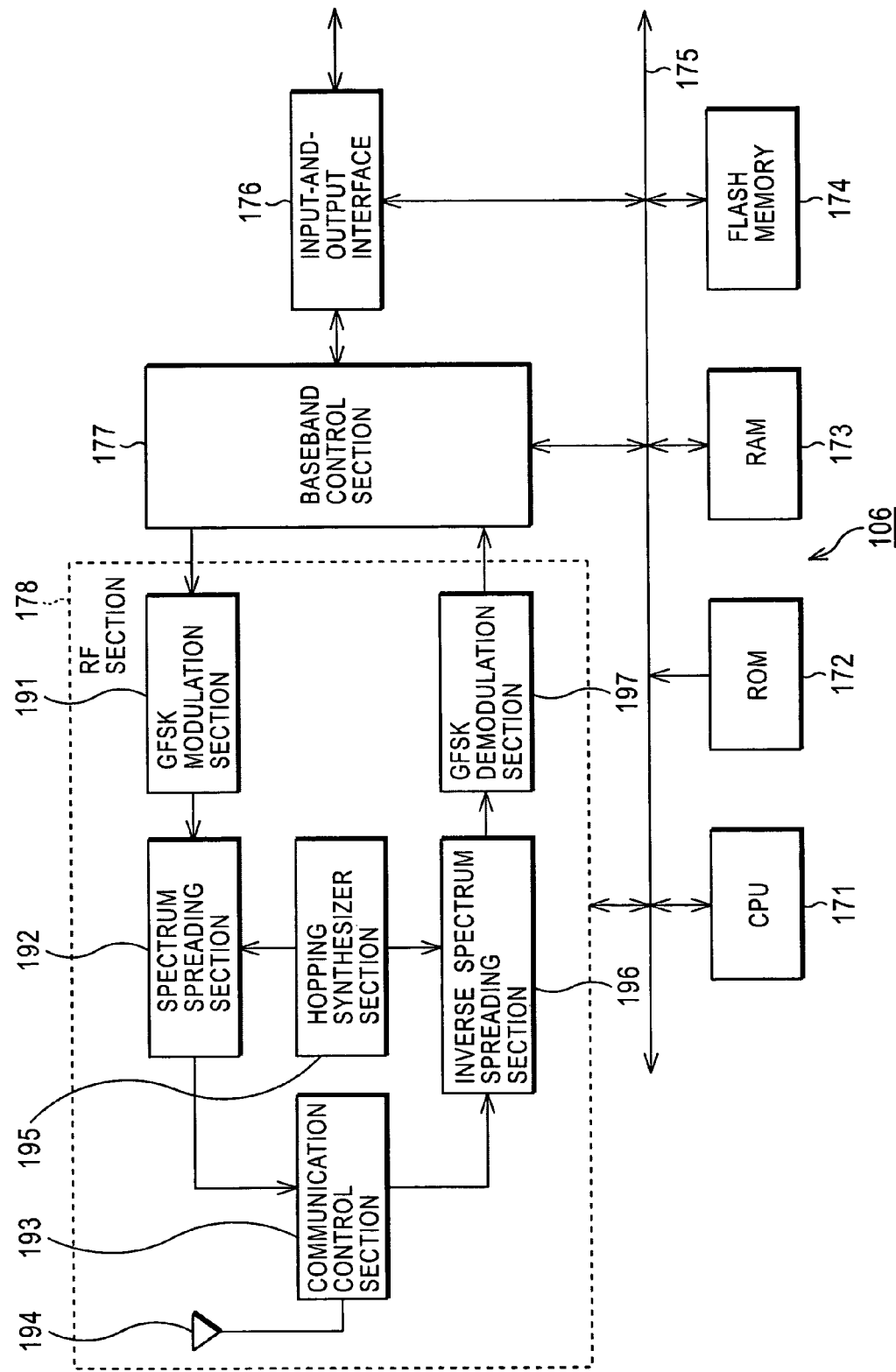
FIG. 13 is a block diagram showing an example structure of a Bluetooth module shown in FIG. 11.

FIG. 13 is a block diagram showing an example detailed structure of the Bluetooth module 106 shown in FIG. 11.

A CPU 171 develops in a RAM 173 a control program stored in a ROM 172 to control the operation of the entire Bluetooth module 106. The CPU 171 to the RAM 173 are mutually connected through a but 175. A flash memory 174 is also connected to the bus 175.

The flash memory 174 is specified, for example, for each Bluetooth device, and stores a Bluetooth device name thereof, which can be changed according to the user's desire, and the Bluetooth address unique to each Bluetooth device.

Since the Bluetooth address is a 48-bit identifier and is unique to each Bluetooth device, it is used in various processes related to the management of Bluetooth devices.

As described above, to establish synchronization in a Piconet, for example, it is necessary for all slaves to obtain information related to the frequency hopping pattern of the master. The frequency hopping pattern is calculated by the slaves according to the Bluetooth address of the master.

More specifically, the Bluetooth address is divided into lower-order 24 bits of LAP (low address part), the next higher-order 8 bits of UAP (upper address part), and the remaining 16 bits of NAP (non-significant address part). To calculate the frequency hopping pattern, 28 bits formed of the entire LAP, 24 bits, and lower-order four bits of the UAP are used.

Each slave can calculate the frequency hopping pattern according to the Bluetooth clock reported from the master and the above-described 28 bits of the Bluetooth address of the master obtained during paging for establishing synchronization in the Piconet.

The frequency hopping pattern includes an inquiry frequency hopping pattern used during an inquiry, a paging frequency hopping pattern used during paging, and a channel frequency hopping pattern used in communication between a slave and the master after synchronization is established in the Piconet. When these three frequency hopping patterns do not need to be individually recognized, they are hereinafter collectively called a frequency hopping pattern.

Back to FIG. 13, the flash memory 174 stores a link key used to authenticate the Bluetooth device serving as the other part of communication and used to encrypt data to be transmitted, after synchronization is established in the Piconet, and sends it to the CPU 171, if necessary.

An input-and-output interface 176 manages the input and output of data sent from the CPU 81 shown in FIG. 11 and data sent from a baseband control block 177, under the control of the CPU 171.

The baseband control block 177 sends data sent from the input-and-output interface 176 to a GFSK (Gaussian frequency shift keying) modulation block 191 in order to send the data to the portable telephone 52, and outputs data sent from a GFSK demodulation block 197 to the bus 175 or to the input-and-output interface 176.

The GFSK modulation block 191 limits a high-frequency component of data sent from the baseband control block 177, by a filter, performs frequency modulation as first modulation, and outputs obtained data to a spectrum spreading block 192.

The spectrum spreading block 192 switches the carrier frequency according to the frequency hopping pattern calculated as described above and reported from a hopping synthesizer block 195, applies spectrum spreading to received data, and outputs an obtained signal to a communication control block 193. In Bluetooth, the spectrum spreading block 192 hops the frequency at an interval of 625 µs to send data.

The communication control block 193 uses the 2.4 GHz band to send a signal to which spectrum spreading has been applied, from an antenna 194. The communication control block 193 outputs a signal received by the antenna 194 to an inverse spectrum spreading block 196.

The inverse spectrum spreading block 196 hops the receiving frequency according to the frequency hopping pattern reported from the hopping synthesizer block 195 to, for example, obtain a signal sent from the portable telephone 52. The inverse spectrum spreading block 196 also applies inverse spectrum spreading to the obtained signal to reproduce the original signal of the portable telephone 52, and outputs the signal to the GFSK demodulation block 197. The GFSK demodulation block 197 applies GFSK demodulation to a signal sent from the inverse spectrum spreading block 196, and outputs obtained data to the baseband control block 177.

An example structure of the portable telephone 52 will be described next.

Figure 14:
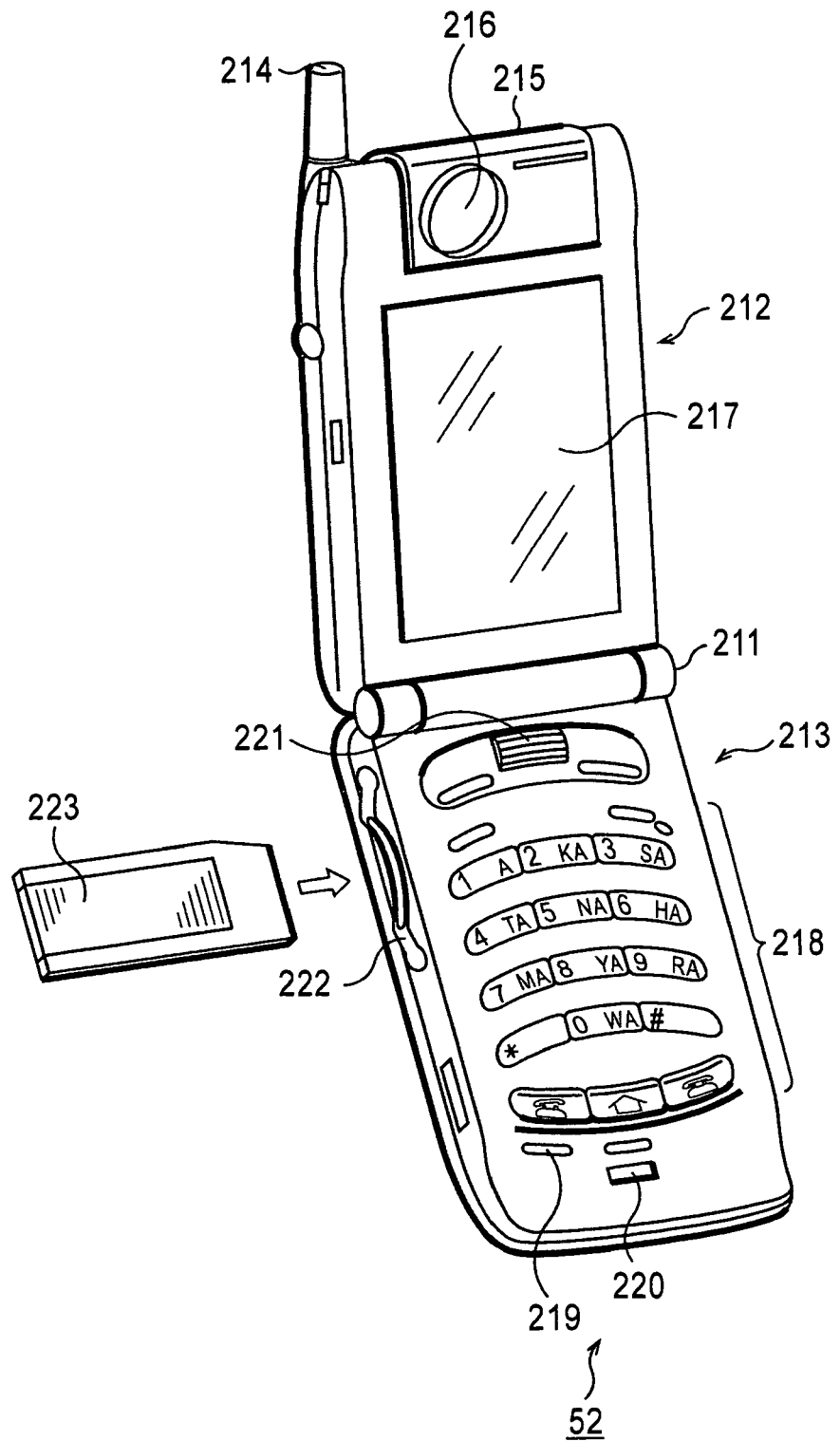
FIG. 14 is a view showing an example appearance of a portable telephone shown in FIG. 6.

FIG. 14 shows an example appearance structure of the portable telephone shown in FIG. 6.

As shown in FIG. 14, the portable telephone 52 is formed of a display block 212 and a body 213, and is foldable at a center hinge block 211.

The display block 212 has a transmission and receiving antenna 214 which can be extended and retracted. The portable telephone 52 sends and receives radio waves to and from a base station, which is a fixed wireless terminal, through the antenna 214.

The display block 212 also has a camera block 215 which can swivel at an angle range of almost 180 degrees, at an upper center block. The portable telephone 52 takes pictures of a desired object by a CCD (charge coupled device) camera 216 of the camera block 215.

Figure 15:
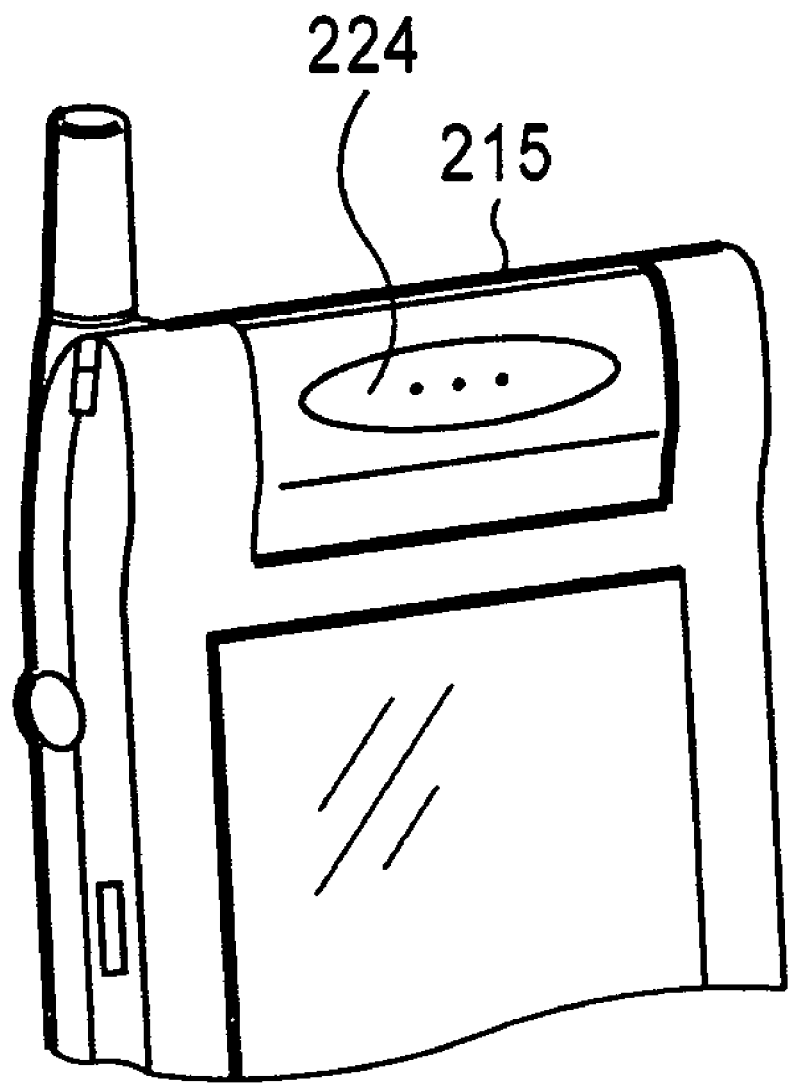
FIG. 15 is a view showing another example appearance of the portable telephone shown in FIG. 6.

When the user swivels the camera block 215 at an angle of almost 180 degrees, the display block 212 has a speaker 224 provided at the center of the rear surface side of the camera block 215, at the front side, as shown in FIG. 15. With this, the portable telephone 52 is switched to a usual telephone call state.

The display block 212 is also provided at the center with a liquid-crystal display 217. The liquid-crystal display 217 displays a radio-wave receiving state, the remaining amount of battery, the names and telephone numbers of destinations input into a telephone directory, a transmission history, the contents of electronic mail, simplified home pages, images taken by the CCD camera 216 of the camera block 215, and others.

The body 213 is provided at the surface with operation keys 218, such as numeral keys "0" to "9", a call key, a redial key, an end-of-call and power key, a clear key, and an electronic mail key. Various instructions corresponding to the operations of the operation keys 218 are input to the portable telephone 52.

At a lower part of the operation keys 218, the body 213 is also provided with a memo button 219 and a microphone 220. When the memo button 219 is operated, the portable telephone 52 records the sound of the destination during a call. The portable telephone 52 collects the sound of the user during a call by the microphone 220.

At an upper part of the operation keys 218, the body 213 is provided with a jog dial 221 which can be swiveled, with its surface slightly protruding from the surface of the body 213. The portable telephone 52 executes various operations, such as a scroll operation for the telephone directory or electronic mail, a page roll operation for a simplified home page, and an image drive operation, according to a swivel operation of the jog dial 221.

For example, the body 213 selects a desired telephone number from a plurality of telephone numbers listed in the telephone directory displayed on the liquid-crystal display 217, according to a swivel operation of the jog dial 221 performed by the user, fixes the selected telephone number when the jog dial 221 is pressed toward the inside direction of the body 213, and makes a telephone call with the telephone number.

A battery pack is mounted to the body 213 at its rear surface side. When the end-of-call and power key is turned on, the battery pack supplies electric power to each circuit block to make it ready for operation.

The body 213 is provided with a memory stick slot 222 for mounting a detachable memory stick (registered trademark), at an upper part of the left-hand side. When the memo button 219 is pressed, the portable telephone 52 records the sound of the destination during a call in a mounted memory stick 223. The portable telephone 52 also records electronic mail, simplified home pages, and images taken by the CCD camera 216 in the mounted memory stick 223, according to user's operations.

The memory stick 223 is a flash memory card developed by the Sony Corporation, who is the applicant of the present invention. The memory stick 223 has a flash memory device, which is an EEPROM (electrically erasable and programmable read only memory), a non-volatile memory electrically rewritable and erasable, in a compact and thin plastic case 21.5 mm long, 50 mm wide, and 2.8 mm deep. Various types of data, such as images, sound, and music, can be written into and read from the memory stick 223 through its 10-pin terminal.

Therefore, since the memory stick 223 can be mounted to the portable telephone 52, the portable telephone 52 can share data with other electronic units through the memory stick 223.

When a module (chip) for adding a predetermined function is incorporated into the memory stick 223, and the memory stick 223 is mounted to the memory stick slot 222, the functions of the portable telephone 52 are further extended.

For example, when the memory stick 223 in which a Bluetooth module and a non-contact IC card are incorporated is mounted to the portable telephone 52, as described later, even if those modules are not built in the portable telephone 52, the functions of the portable telephone 52 are extended to allow Bluetooth communication with the personal computer 51 and communication with the use of the non-contact IC card.

Figure 16:
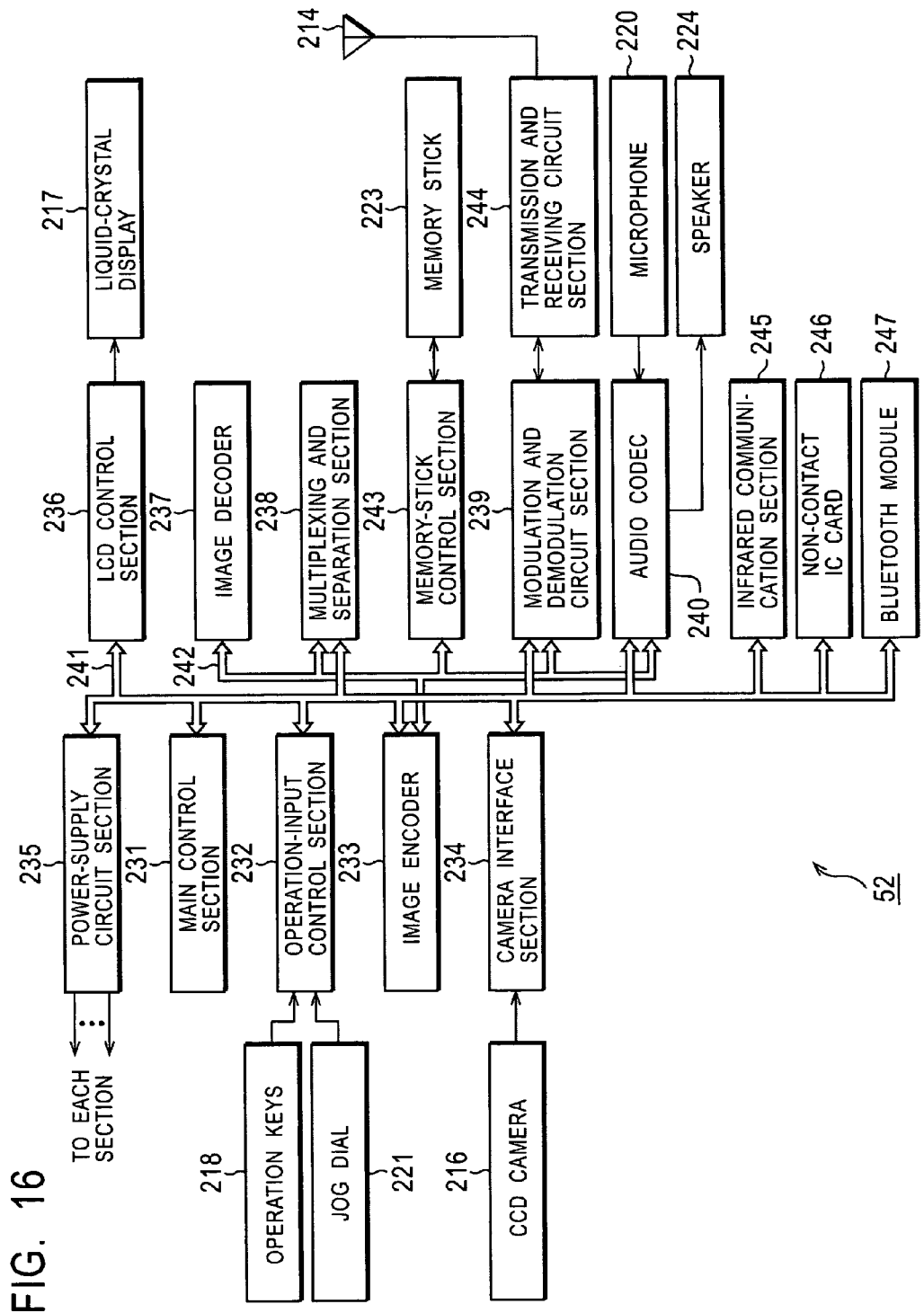
FIG. 16 is a block diagram showing an example structure of the portable telephone shown in FIG. 6.

FIG. 16 shows an example inside structure of the portable telephone 52.

To a main control block 231 for controlling each block of the display block 212 and the body 213 synthetically, a power-supply circuit block 235, an operation-input control block 232, an image encoder 233, a camera interface (I/F) block 234, an LCD control block 236, a multiplexing and separation block 238, a modulation and demodulation circuit block 239, an audio codec 240, an infrared communication block 245, the non-contact IC card 246, and a Bluetooth module 247 are mutually connected through a main bus 241, and an image encoder 233, an image decoder 237, the multiplexing and separation block 238, a memory stick control block 243, the modulation and demodulation circuit block 239, and the audio codec 240 are mutually connected through a synchronization bus 242.

When the end-of-call and power key is turned on by a user's operation, the power-supply circuit block 235 supplies electric power to each block from the battery pack to make the portable telephone 52 ready for operation. When the non-contact IC card 246 instructs to activate the Bluetooth module 247, the power-supply circuit block 235 supplies electric power to the Bluetooth module 247 to activate it, as described later.

When the power of the Bluetooth module 247 is off, the power is turned on according to an instruction of the non-contact IC card 246 at timing, for example, when the portable telephone is located close to the personal computer 51 and the non-contact IC card receives electromagnetic waves emitted from the non-contact-IC-card reader/writer 105.

In the portable telephone 52, under the control of the main control block 231 formed of a CPU, a ROM, a RAM, and others, an audio signal collected by the microphone 220 is converted to digital audio data by the audio codec 240 during telephone-call mode. The modulation and demodulation circuit block 239 applies spectrum spreading processing to the digital audio data, and the transmission and receiving block 244 applies digital-to-analog conversion processing and frequency conversion processing, and transmits through the antenna 214 in the portable telephone 52.

During the telephone-call mode in the portable telephone 52, a signal received by the antenna 214 is amplified, frequency conversion processing and analog-to-digital conversion processing are applied to the amplified signal, the modulation and demodulation circuit block 239 applies inverse spectrum spreading processing, and the audio codec 240 converts to an analog audio signal. The portable telephone 52 outputs the sound corresponding to the analog audio signal from the speaker 224.

When electronic mail is to be sent from the portable telephone 52 during data communication mode, text data input by operations of the operation keys 218 and the jog dial 221 is sent to the main control block 231 through the operation-input control block 232.

Under the control of the main control block 231, the modulation and demodulation circuit block 239 applies spectrum spreading processing to the text data, the transmitting and receiving circuit block 244 applies digital-to-analog conversion processing and frequency conversion processing, and the obtained signal is sent to the base station through the antenna 214.

When electronic mail is received by the portable telephone 52 during data communication mode, the modulation and demodulation circuit block 239 applies the inverse spectrum spreading processing to a signal received from the base station through the antenna 214 to recover the original text data, and it is displayed as electronic mail on the liquid-crystal display 217 through the LCD control block 236.

Then, the portable telephone 52 can record the electronic mail received according to the user's operation in the memory stick through the memory-stick control block 243.

When image data is to be sent from the portable telephone 52 during the data communication mode, image data captured by the CCD camera 216 is sent to the image encoder 233 through the camera interface block 234.

When image data captured by the CCD camera 216 is not sent, the portable telephone 52 can display the image data through the camera interface block 234 and the LCD control block 236 directly on the liquid-crystal display 217.

The image encoder 233 applies compression encoding to the image data sent from the CCD camera 216 by a predetermined encoding method, such as MPEG (Moving Picture Experts Group) 2 or MPEG 4 to convert to encoded image data, and sends it to the multiplexing and separation block 238.

At the same time, the portable telephone 52 sends sound collected by the microphone 220 during image capturing performed by the CCD camera 216, to the multiplexing and separation block 238 as digital audio data through the audio codec 240.

The multiplexing and separation block 238 multiplexes the encoded image data sent from the image encoder 233 and the audio data sent from the audio codec 240 by a predetermined method, the modulation and demodulation circuit block 239 applies the spectrum spreading processing to the multiplexed data obtained as a result, the transmission and receiving circuit block 244 applies the digital-to-analog conversion processing and the frequency conversion processing, and then the data is sent through the antenna 214.

When the portable telephone 52 receives the data of a moving-picture file linked to a simplified home page during data communication mode, for example, the modulation and demodulation circuit block 239 applies the inverse spectrum spreading processing to a signal received from the base station through the antenna 214, and the multiplexed data obtained as a result is sent to the multiplexing and separation block 238.

The multiplexing and separation block 238 separates the multiplexed data into encoded image data and audio data, sends the encoded image data to the image decoder 237 through the synchronization bus 242, and sends the audio data to the audio codec 240 through the synchronization bus 242.

The image decoder 237 decodes the encoded image data by the decoding method corresponding to the predetermined encoding method, such as MPEG2 or MPEG4, to generate reproduced moving-picture data, and sends it to the liquid-crystal display 217 through the LCD control block 236. With this, the portable telephone 52 displays moving-picture data included, for example, in a moving-picture file linked to a simplified home page.

At the same time, the audio codec 240 converts the audio data into an analog audio signal, and sends it to the speaker 242. With this, the portable telephone 52 reproduces audio data included, for example, in a moving-picture file linked to a simplified home page.

In the same way as for electronic mail, the portable telephone 52 can record data linked to a received simplified home page into the memory stick 223 through the memory-stick control block 243 by a user's operation.

When the non-contact IC card 246 is located close to the personal computer 51 and receives electromagnetic waves emitted from the reader/writer 105, the non-contact IC card 246 sends various pieces of information to the reader/writer 105.

Figure 17:
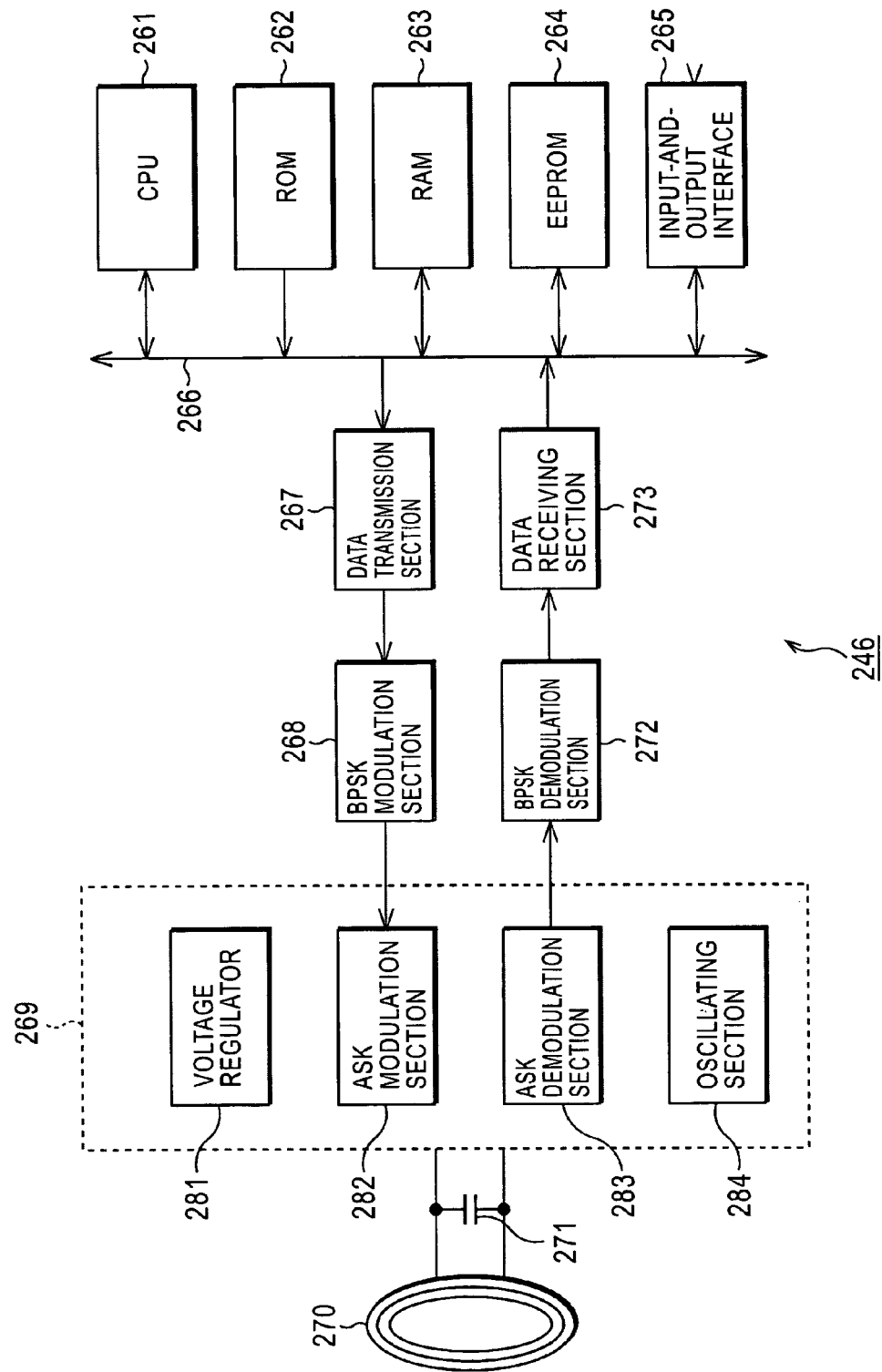
FIG. 17 is a block diagram showing an example structure of a non-contact IC card shown in FIG. 16.

FIG. 17 is a block diagram showing an example detailed structure of the non-contact IC card 246.

The non-contact IC card 246 is formed, for example, of an antenna (loop antenna) 270 and a capacitor 271 both shown in the figure, and an IC which incorporates the other structure in one chip, and performs half duplex communication of various pieces of data with the reader/writer 105 by using electromagnetic induction. The non-contact IC card 246 does not necessarily have a card shape. The IC card is a name used for convenience of description, and means that it has the function described above or described later. As a unit which basically provides the same function as the non-contact IC card 246, Felica (registered trademark), for example, has been available.

A CPU 261 develops in a RAM 263 a control program stored in a ROM 262 to control the operation of the entire non-contact IC card 246. When the antenna 270 receives electromagnetic waves emitted from the reader/writer 105, for example, the CPU 261 reports the card ID thereof serving as identification information assigned to the non-contact IC card 246, to the reader/writer 105.

The ID card can be changed in a desired way. For example, the ID car is the same as the Bluetooth device name assigned to the Bluetooth module 247 (portable telephone 52) or includes the Bluetooth device name.

In an interface block 269, the envelope of a modulated wave (ASK modulated wave) received through the antenna 270 is detected to demodulate the wave by an ASK demodulation block 283, and data obtained by the demodulation is output to a BPSK demodulation block 272. An LC circuit formed of the antenna 270 and the capacitor 271 generates resonance by an electromagnetic wave having a predetermined frequency emitted from the reader/writer 105.

In the interface block 269, an AC magnetic field excited at the antenna 270 is rectified by the ASK demodulation block 283, stabilized by a voltage regulator 281, and supplied to each block as DC power. The electric power of the electromagnetic wave emitted from the reader/writer 105 is adjusted, as described later, so as to generate a magnetic field sufficient for the electric power required by the non-contact IC card 246.

In the interface block 269, an oscillating circuit 284 generates a signal having the same frequency as the clock frequency of data, and outputs the signal to a PLL block not shown.

When data such as the card ID is sent to the reader/writer 105, for example, a predetermined switching device, for example, is turned on/off according to data sent from a BPSK modulation block 268, and, only when the switching device is on, a predetermined load is connected in parallel to the antenna 270 to change the load of the antenna 270 in the interface block 269.

An ASK modulation block 282 applies ASK modulation to the modulated wave sent from the reader/writer 105 and received by the antenna 270, by the use of the change of the load of the antenna 270, and sends the modulation component to the reader/writer 105 through the antenna 270 (to change the terminal voltage of the antenna 135 of the reader/writer 105) (load switching method).

When data demodulated by the ASK demodulation block 283 is BPSK modulated, the BPSK demodulation block 272 demodulates the data (decoding of Manchester code) according to a clock signal sent from the PLL block not shown, and outputs the demodulated data to a data receiving block 273. The data receiving block 273 outputs the received data, if necessary, to the CPU 261 and others.

The BPSK modulation block 268 applies BPSK modulation (encoding to form Manchester code) to data sent from a data transmission block 267, and outputs the modulated data to the ASK modulation block 282.

The non-contact IC card 246 not only reports the card ID to the personal computer 51, but also performs various processes, such as authentication processing with the reader/writer 105 and encryption processing for data to be transmitted.

FIG. 18 is a view showing example specifications of the non-contact IC card 246.

As described above, communication between the reader/writer 105 and the non-contact IC card 246 are performed at half duplex, and the communication rate is, for example, 211.87 kbps.

Also as shown in the figure, the center frequency of frequency bands used for electric power transfer from the reader/writer 105 to the non-contact IC card 246, data transfer from the reader/writer 105 to the non-contact IC card 246, and data transfer from the non-contact IC card 246 to the reader/writer 105 is, for example, 13.56 MHz.

The power of radio waves output from the reader/writer 105 for electric power transfer is, for example, 350 mW, and the communication length is, for example, about 10 cm although it depends on communication environments such as antenna characteristics.

As described above, ASK modulation is applied to data which has been encoded to be Manchester code and the modulated data is transferred from the reader/writer 105 to the non-contact IC card 246. The modulation factor (the maximum amplitude of a data signal/the maximum amplitude of the carrier wave) is, for example, about 0.1. Data transfer from the non-contact IC card 246 to the reader/writer 105 is performed, as described above, by converting output data to a transmission signal by the load switching method (the switching device is turned on/off according to the output data to change the load of the antenna 135).

Back to FIG. 16, the Bluetooth module 247 forms a Piconet together, for example, with the Bluetooth module 106 of the personal computer 51, and transmits and receives various pieces of data under the control of the main control block 231.

Since the Bluetooth module 247 has the same structure as that shown in FIG. 13, a detailed description thereof is omitted. In the following description, the CPU of the Bluetooth module 106 is called, for example, a CPU 171A, and the CPU of the Bluetooth module 247 is called a CPU 171B. The other components are also called in the same way.

In the above description, the portable telephone 52 includes the non-contact IC card 246 and the Bluetooth module 247. For example, the structure may be made such that the non-contact IC card 246 and the Bluetooth module 247 are incorporated into the memory stick 223, the memory stick 223 is mounted to the portable telephone 52, and the non-contact IC card 246 and the Bluetooth module 247 are controlled by the memory-stick control block 243.

Figure 19:
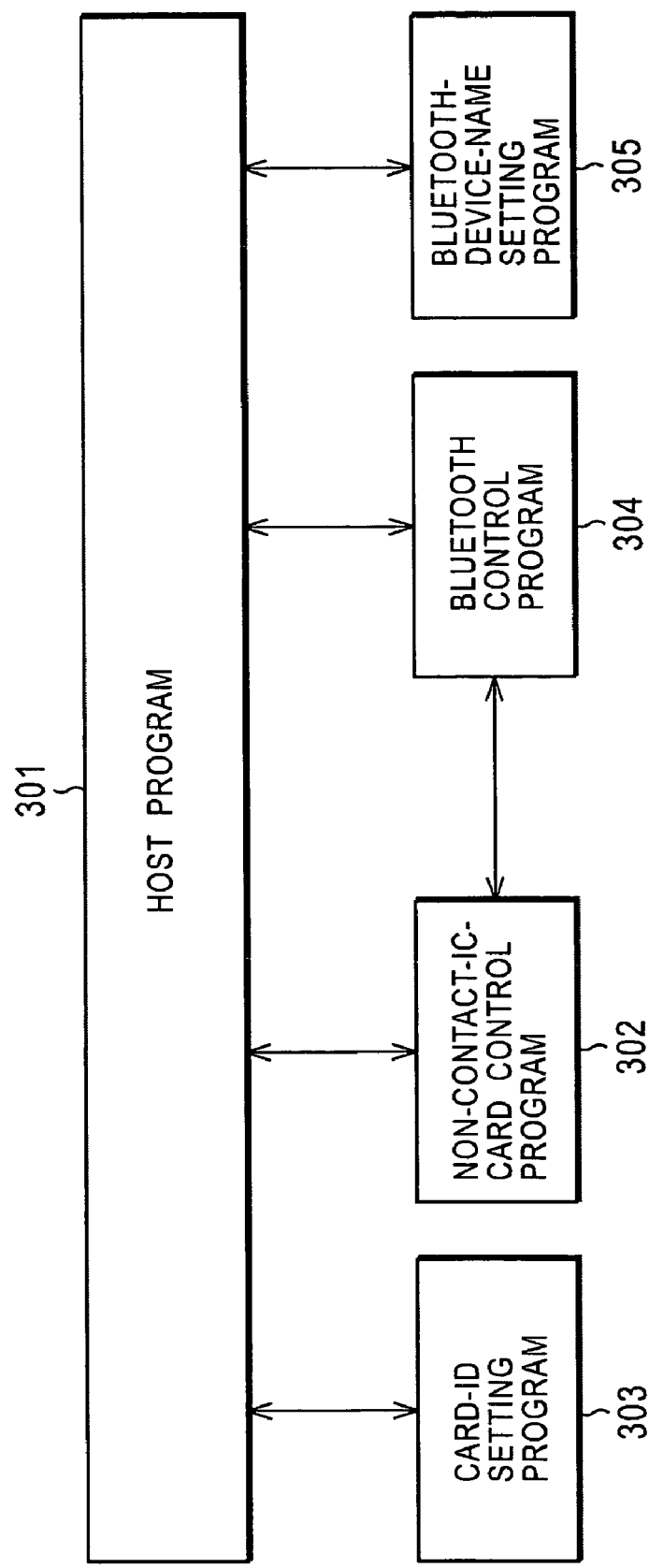
FIG. 19 is a block diagram showing an example function structure of the portable telephone shown in FIG. 6.

FIG. 19 is a view showing example functional blocks of the portable telephone 52.

A host program 301 provides basic functions for the portable telephone 52, such as a telephone call function and an electronic-mail transmission and receiving function. A non-contact-IC-card control program 302 controls the operation of the non-contact IC card 246, and also performs various processes in cooperation with a card-ID setting program 303, a Bluetooth control program 304, and others.

When the portable telephone 52 is located close to the personal computer 51, for example, the non-contact-IC-card control program 302 sends the card ID corresponding to the Bluetooth address to the reader/writer 105, and activates the Bluetooth module 247 (Bluetooth control program 304) in response to receiving electromagnetic waves from the reader/writer 105.

The card-ID setting program 303 manages the card ID stored in the EEPROM 264, and rewrites it, if necessary, according to an instruction from the user. The card-ID setting program 303 also rewrites and sets the card ID so as to include the Bluetooth address assigned to the Bluetooth module 247.

The Bluetooth control program 304 controls the operation of the Bluetooth module 247 to implement communication with other Bluetooth devices. A Bluetooth-device-name setting program 305 manages the Bluetooth device name specified in a flash memory 174B (the flash memory of the Bluetooth module 247).

The operation of the communication system shown in FIG. 6 will be described next.

A series of processes in which the personal computer 51 specifies the partner of communication and establishes synchronization only with that Bluetooth device in the Piconet will be described first by referring to flowcharts shown in FIG. 20 and FIG. 21.

It is assumed in the following processes that the personal computer 51 serves as the master and the other Bluetooth devices (the portable telephone 52 and the PDA 53) serve as slaves. In the following description of the flowcharts, communication mean Bluetooth communication performed after synchronization is established in the Piconet and the partner of communication is specified.

In step S121, the reader/writer control program 86F emits electromagnetic waves in order to detect a terminal (portable telephone 52) in which the non-contact IC card is built. The reader/writer control program 86F controls the reader/writer 105 by a predetermined control command to emit electromagnetic waves at a predetermined interval from the antenna 135.

When the portable telephone 52 is located close to the personal computer 51 and the electromagnetic waves are received in step S131, the non-contact-IC-card control program 302 proceeds to step S132. The card ID corresponding to the Bluetooth address assigned to the Bluetooth module 247 is read from the EEPROM 264 and reported to the reader/writer 105.

In step S122, the Bluetooth address sent from the non-contact IC card 246 is received. The reader/writer control program 86F proceeds to step S123, and the Bluetooth address is reported to the Bluetooth control program 86G.

In step S101, the Bluetooth control program 86G obtains the Bluetooth address assigned to the portable telephone 52 (Bluetooth module 247).

Figure 1:
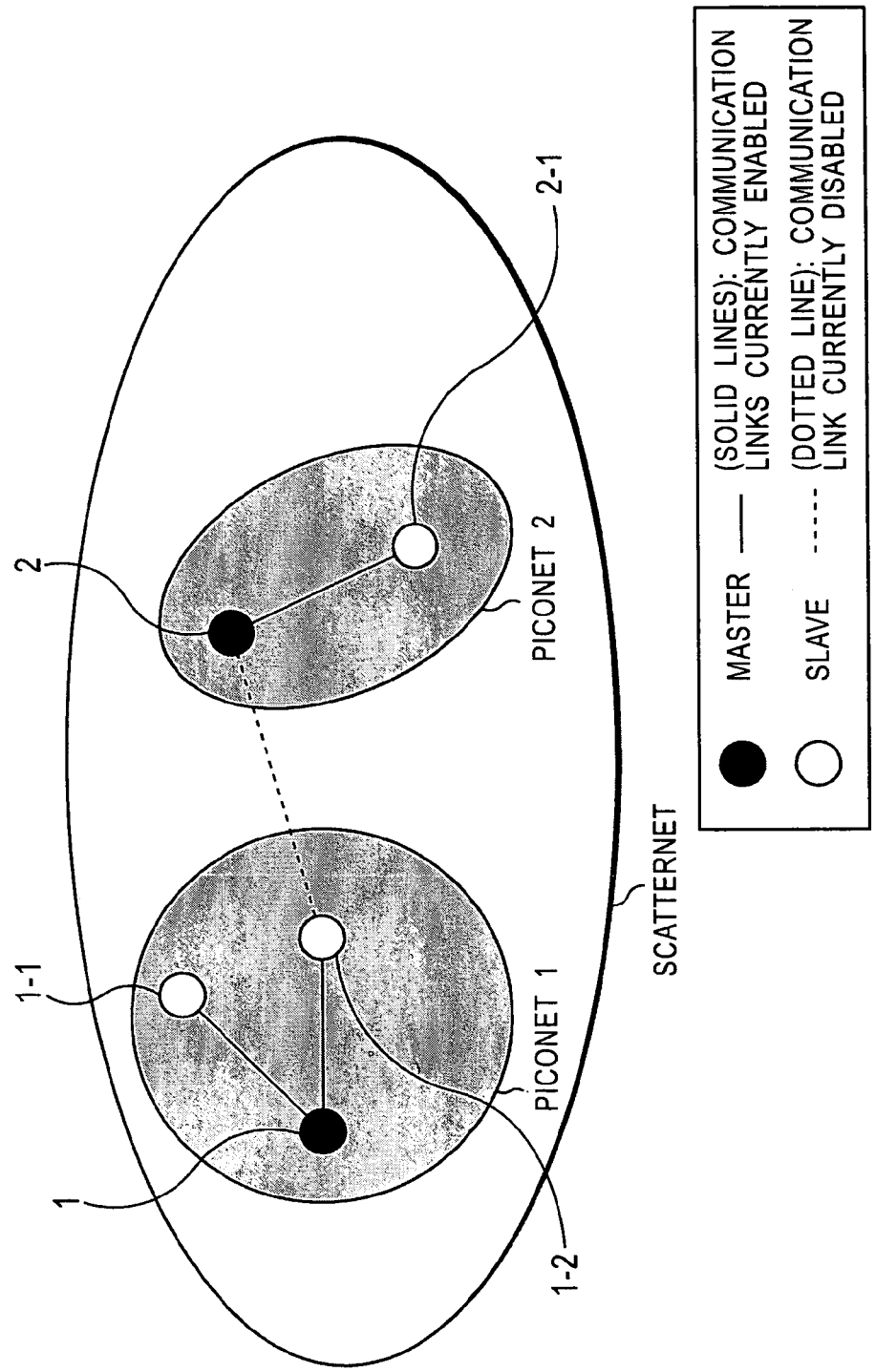
FIG. 1 is a view showing the concept of Piconets and a Scatternet.
Figure 2:
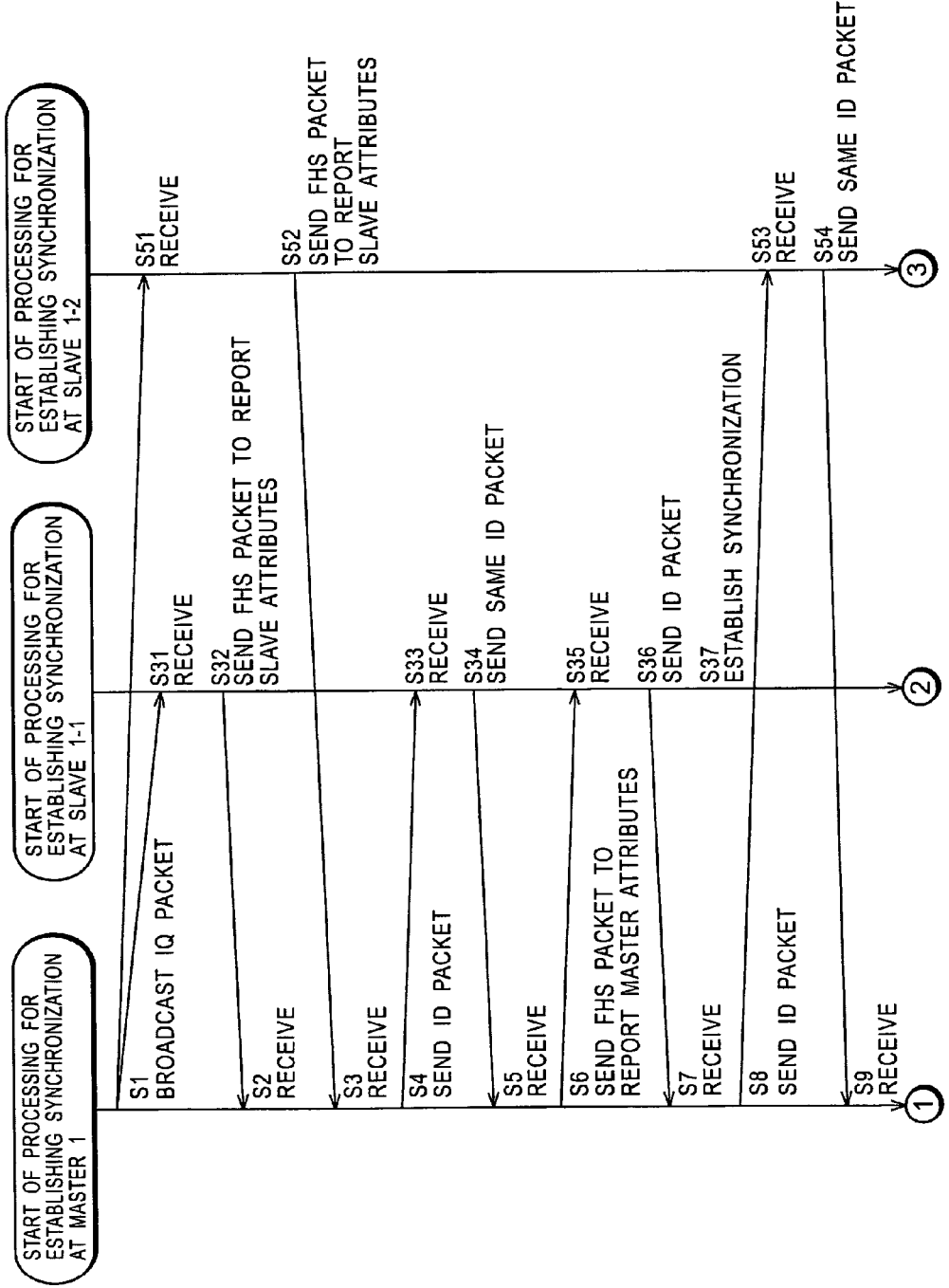
FIG. 2 is a flowchart describing conventional processes for establishing synchronization in a Piconet.
Figure 3:
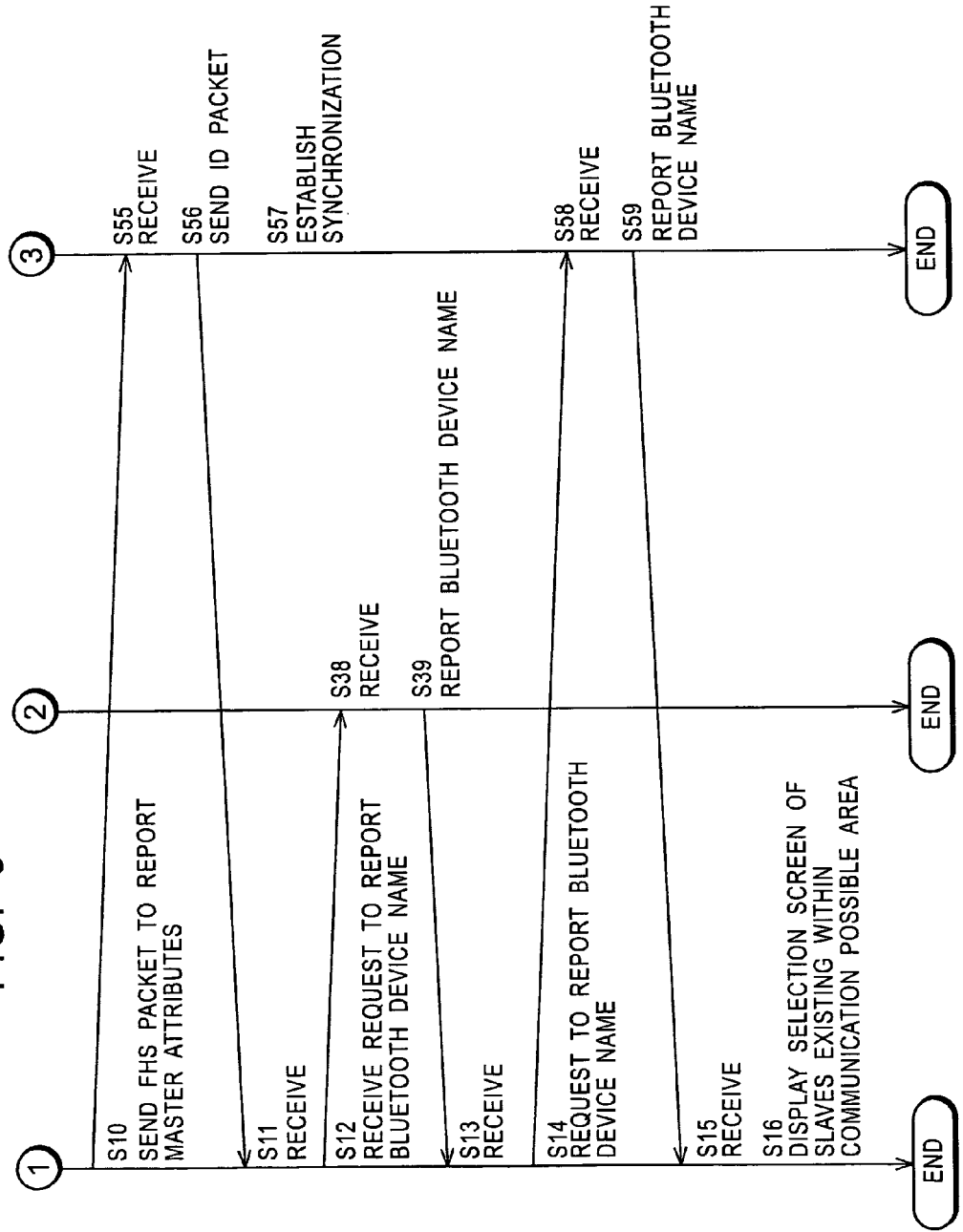
FIG. 3 is a flowchart following that shown in FIG. 2, describing the conventional processes for establishing synchronization in a Piconet.
Figure 4:
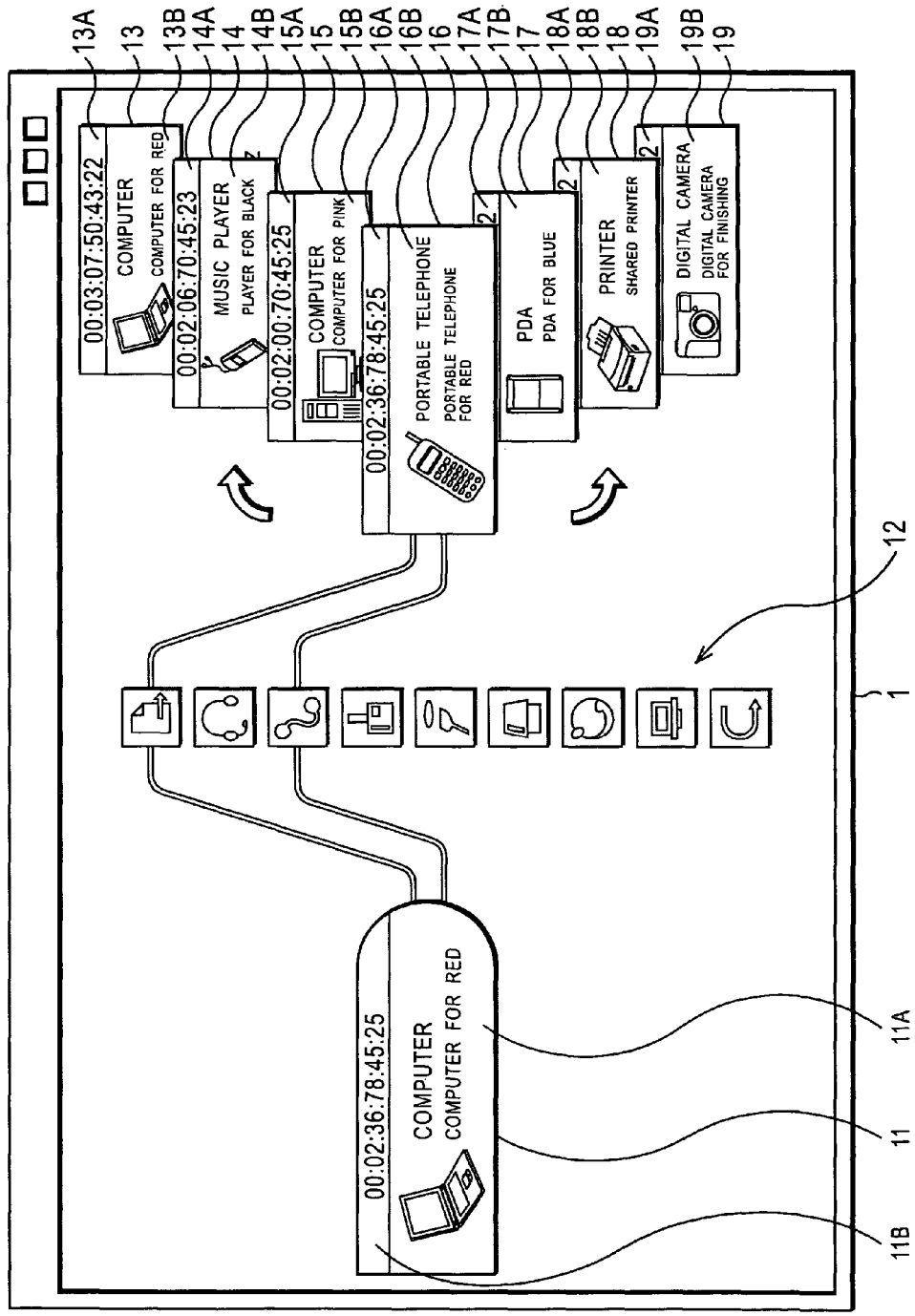
FIG. 4 is a view showing an example display on a screen for selecting a communication terminal.
Figure 5:
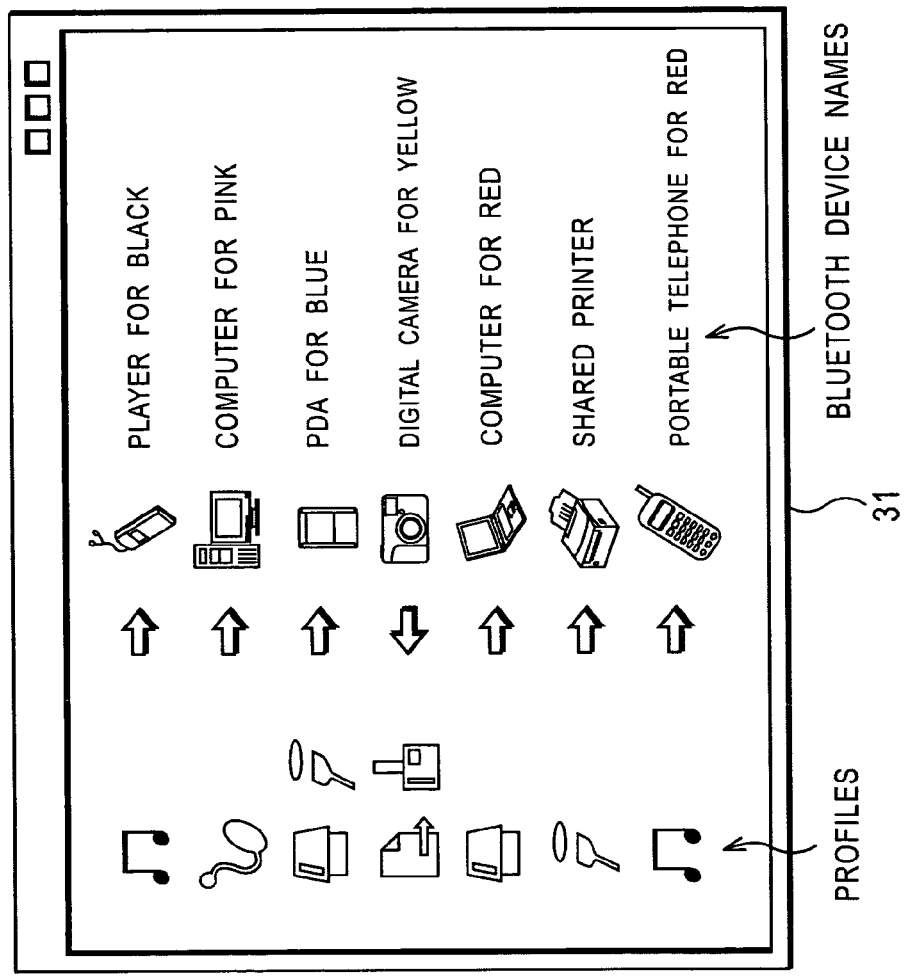
FIG. 5 is a view showing another example display on the screen for selecting a communication terminal.

Processes executed in step S102 to step S109 by the Bluetooth control program 86G, processes executed in step S141 and subsequent steps by the Bluetooth control program 304, and processes executed in step S161 and subsequent steps by the Bluetooth control program of the PDA 53 are the same as the inquiry and paging described by referring to FIG. 2 and FIG. 3.

In step S102, the Bluetooth control program 86G controls the Bluetooth module 106 to broadcast an IQ packet.

More specifically, the Bluetooth control program 86G uses 24 bits (9E8B33) of the LAP and four bits (all 0) of the UAP both specified in advance and the entire Bluetooth clock of 28 bits to generate an inquiry frequency hopping pattern.

The Bluetooth control program 86G also uses one address block of the LAP ranging from 9E8B00 to 9E8B3F specified in advance to generate IAC (inquiry access code), and broadcasts the IQ packet formed of the access code, by the calculated inquiry hopping pattern.

A packet transmitted and received by Bluetooth is formed of 68-bit or 72-bit basic access code indicating the destination of the transmission packet, a 54-bit packet header which includes a parameter for managing a communication link, and a payload of 0 bits to 2745 bits (variable length) serving as user data.

The IQ packet broadcasted from the antenna 194 by the process of each block of the Bluetooth module 106 is received by the Bluetooth control program 304 of the portable telephone 52 in step S141, and is received by the Bluetooth control program of the PDA 53 in step S161.

In step S142, the Bluetooth control program 304 sends an FHS packet for reporting slave attributes, to the personal computer 51 to respond the inquiry. In the FHS packet, the payload includes information related to the Bluetooth address and the Bluetooth clock of the Bluetooth module 247.

The Bluetooth control program 86G receives the FHS packet in step S103 to obtain the attribute information of the portable telephone 52.

In step S162, an FHS packet indicating the attributes of the PDA 53 is sent in the same way. The Bluetooth control program 86G receives the FHS packet in step S104.

With the above-described inquiry processes, the Bluetooth control program 86G has obtained the attribute information of all slaves existing in a vicinity.

In step S105, the Bluetooth control program 86G searches the attribute information of the obtained FHS packets, identifies a slave having the Bluetooth address obtained through electromagnetic waves, and specifies it as the partner of communication. More specifically, since the reader/writer control program 86F reports the Bluetooth address of the portable telephone 52 in advance, the Bluetooth control program 86G specifies the portable telephone 52, which has sent the FHS packet that includes the Bluetooth address, as the partner of communication.

Then, the Bluetooth control program 86G performs paging (process for establishing synchronization in the Piconet) only for the portable telephone 52, specified as the partner of communication. In other words, subsequent processes are not performed between the Bluetooth control program 86G and the Bluetooth control program of the PDA 53.

In step S106, the Bluetooth control program 86G generates an ID packet according to the information described in the FHS packet obtained from the portable telephone 52, and sends the packet to the portable telephone.

More specifically, the Bluetooth control program 86G uses the 24 bits of the LAP and the lower-order four bits of the UAP of the Bluetooth address assigned to the Bluetooth module 247 and the 28 bits of the Bluetooth clock, all included in the FHS packet, to generate a paging frequency hopping pattern.

The Bluetooth control program 86G also uses the LAP of the Bluetooth module 247 to generate DAC (device access code), and sends an ID packet formed of the DAC to the portable telephone 52 by using the calculated paging frequency hopping pattern.

When the ID packet is received in step S143, the Bluetooth control program 304 proceeds to step S144, and sends the same ID packet to the personal computer 51 to report that the ID packet has been successfully received.

When the ID packet sent from the portable telephone 52 is received in step S107, the Bluetooth control program 86G proceeds to step S108, and sends an FHS packet for reporting its own attributes, to the portable telephone 52.

In step S145, the Bluetooth control program 304 receives the FHS packet sent from the personal computer 51 to obtain the attribute information of the master. The Bluetooth control program 304 proceeds to step S146, and sends an ID packet to the personal computer 51 to report that the FHS packet has been received.

Then, the Bluetooth control program 304 proceeds to step S147, and establishes synchronization with the personal computer 51 in the Piconet.

More specifically, the Bluetooth control program 304 uses the 24 bits of the LAP and the lower-order four bits of the UAP of the Bluetooth address assigned to the personal computer 51 (Bluetooth module 106) and the Bluetooth clock of 27 bits to generate a channel frequency hopping pattern to establish synchronization in the frequency domain.

The Bluetooth control program 304 also adds an offset (difference) to the Bluetooth clock managed by the program, according to the Bluetooth clock reported by the personal computer 51 to establish synchronization in the time domain.

In step S109, the Bluetooth control program 86G receives the ID packet sent from the portable telephone 52.

After synchronization is established with the portable telephone 52 in the Piconet, the Bluetooth control program 86G proceeds to step S110, and starts Bluetooth communication.

For example, the Bluetooth control program 86G requests the portable telephone 52 to report profiles (services) which the portable telephone 52 can provide. In Bluetooth, all protocol specifications and a user interface are specified for each unit for which it is expected to have the Bluetooth technology, and a profile is specified for each protocol to be used. In the profile, the function of each layer of Bluetooth and coordination with the layer are specified for each application.

The Bluetooth control program 86G selects a predetermined profile from the profiles reported by the portable telephone 52, and performs communication according to the profile.

Mutual authentication may be required before the profiles which can be provided are obtained, or before a profile is selected and communication are performed. Authentication is performed by using link keys specified in the data bases of the personal computer 51 and the portable telephone 52.

For example, when the personal computer 51 and the portable telephone 52 perform communication for the first time, the user is asked to input a PIN (personal identification number) code to specify a link key. According to the input PIN code and a generated random number, the link key is specified. The specified link key is input into the respective data base in association with the Bluetooth address of the partner of the communication.

As link keys, according to usage, "an initialization key", "a single-body key", "a combination key", and "a master key" are specified. As described above, the link key specified according to the PIN code and the random number when communication are performed for the first time is an initialization key. In authentication performed with the use of an initialization key, the initialization key, the Bluetooth address of a terminal which has requested authentication, and a 128-bit random number generated by a terminal which determines authentication are used.

As described above, by communication at the reader/writer 105, the personal computer 51 can obtain the Bluetooth address of the slave with which synchronization needs to be established in the Piconet, from the non-contact IC card 246. Therefore, as shown in FIG. 6, even when the PDA 53 is located close to the personal computer 51, Bluetooth communication are started only between the personal computer 51 and the portable telephone 52 without selecting a terminal.

With this, for example, to perform Bluetooth communication with the personal computer 51, the user of the portable telephone 52 can start the communication just by bringing the portable telephone 52 close to the personal computer 51. To transfer data from the personal computer 51 to the portable telephone 52, the user can also start communication in the same way just by bringing the portable telephone 52 close to the personal computer 51.

In the above description, it is assumed that the Bluetooth modules of the personal computer 51, the portable telephone 52, and the PDA 53 has already been activated. When the Bluetooth modules has not been activated, they may be activated, for example, when electromagnetic waves are received, and then synchronization is established in the Piconet.

A series of processes in which the communication system establishes synchronization in a Piconet when Bluetooth modules are not activated will be described next by referring to flowcharts shown in FIG. 22 and FIG. 23.

Figure 20:
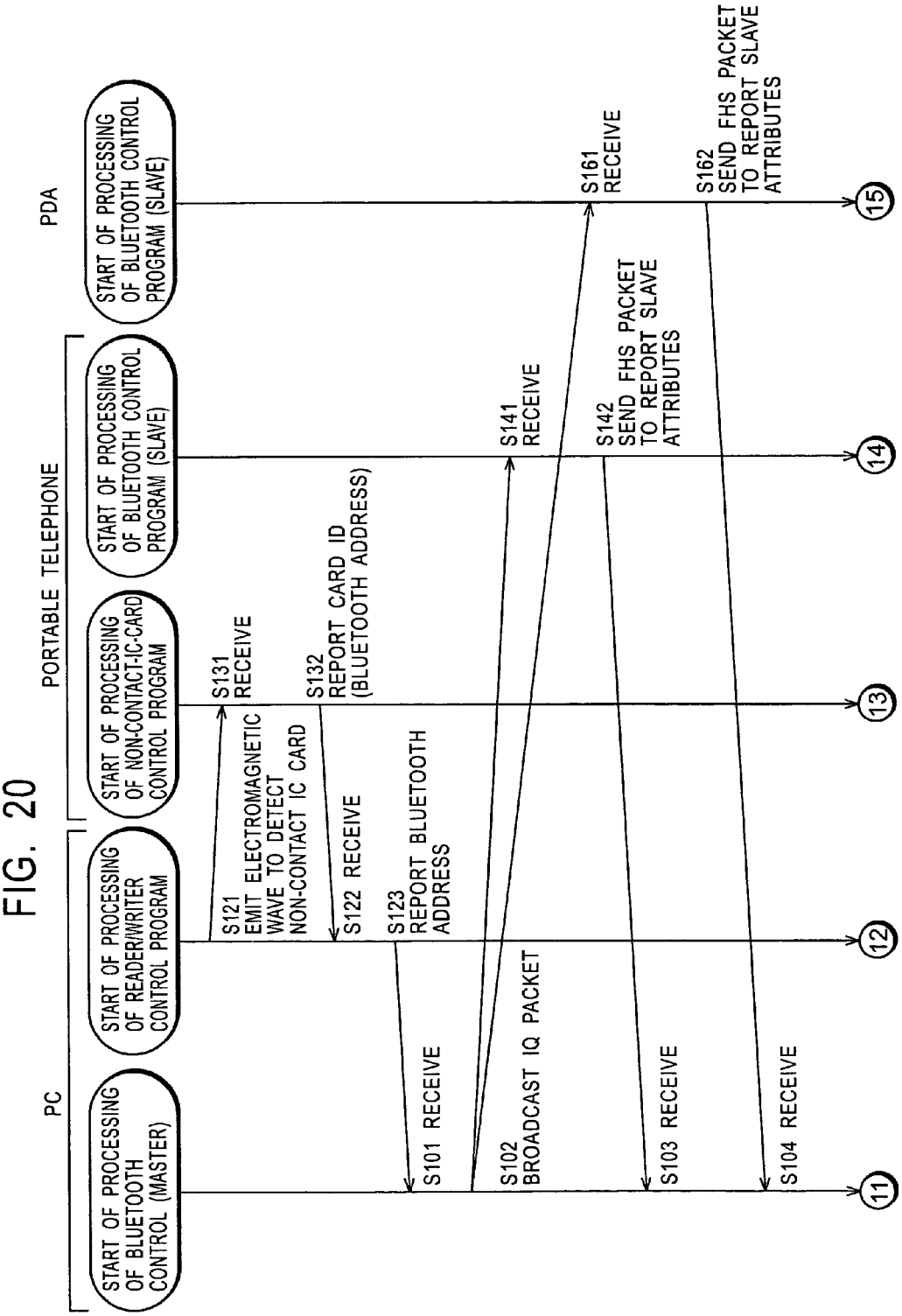
FIG. 20 is a flowchart describing processes of the communication system shown in FIG. 6.
Figure 21:
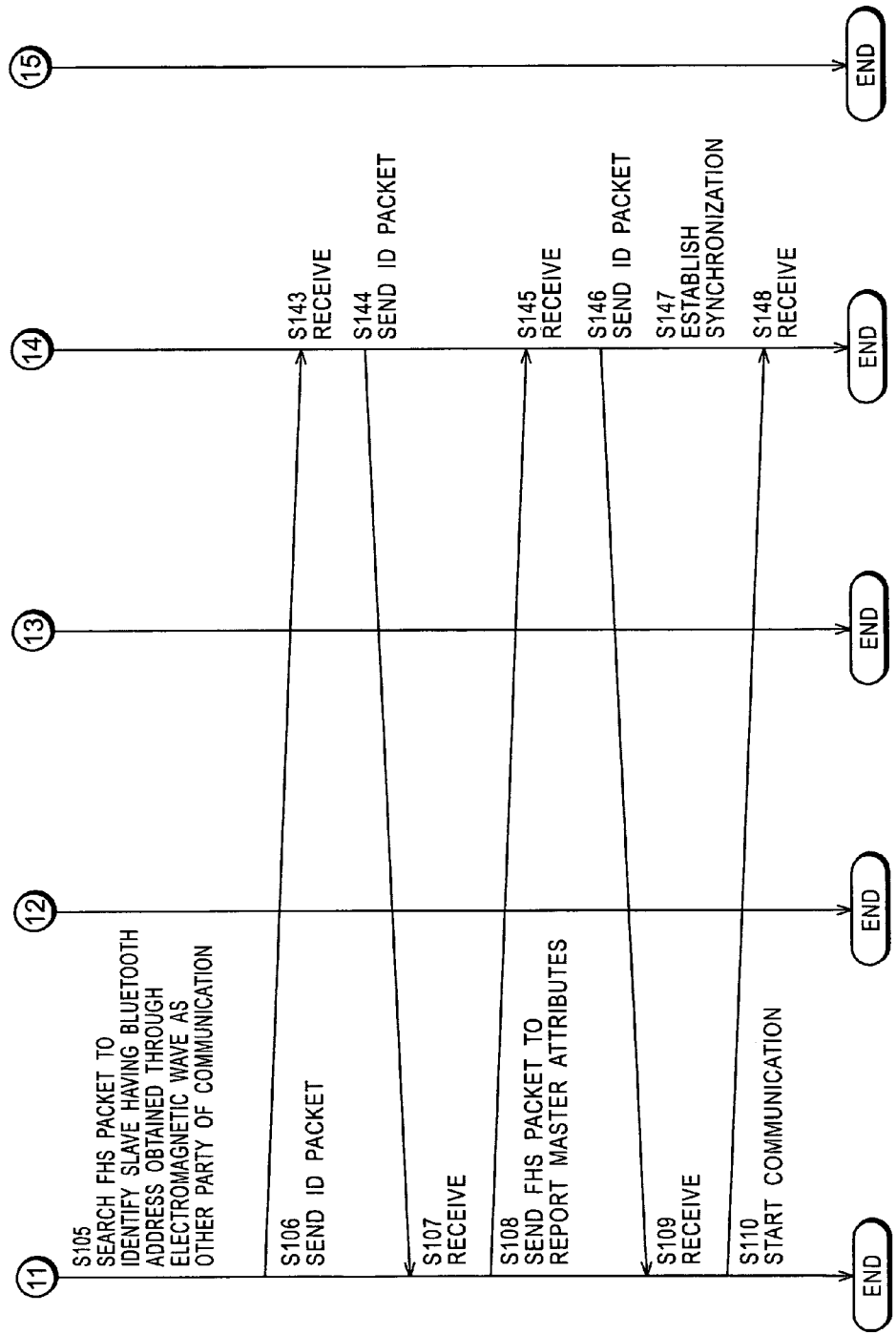
FIG. 21 is a flowchart following that shown in FIG. 20, describing the processes of the communication system shown in FIG. 6.
Figure 22:
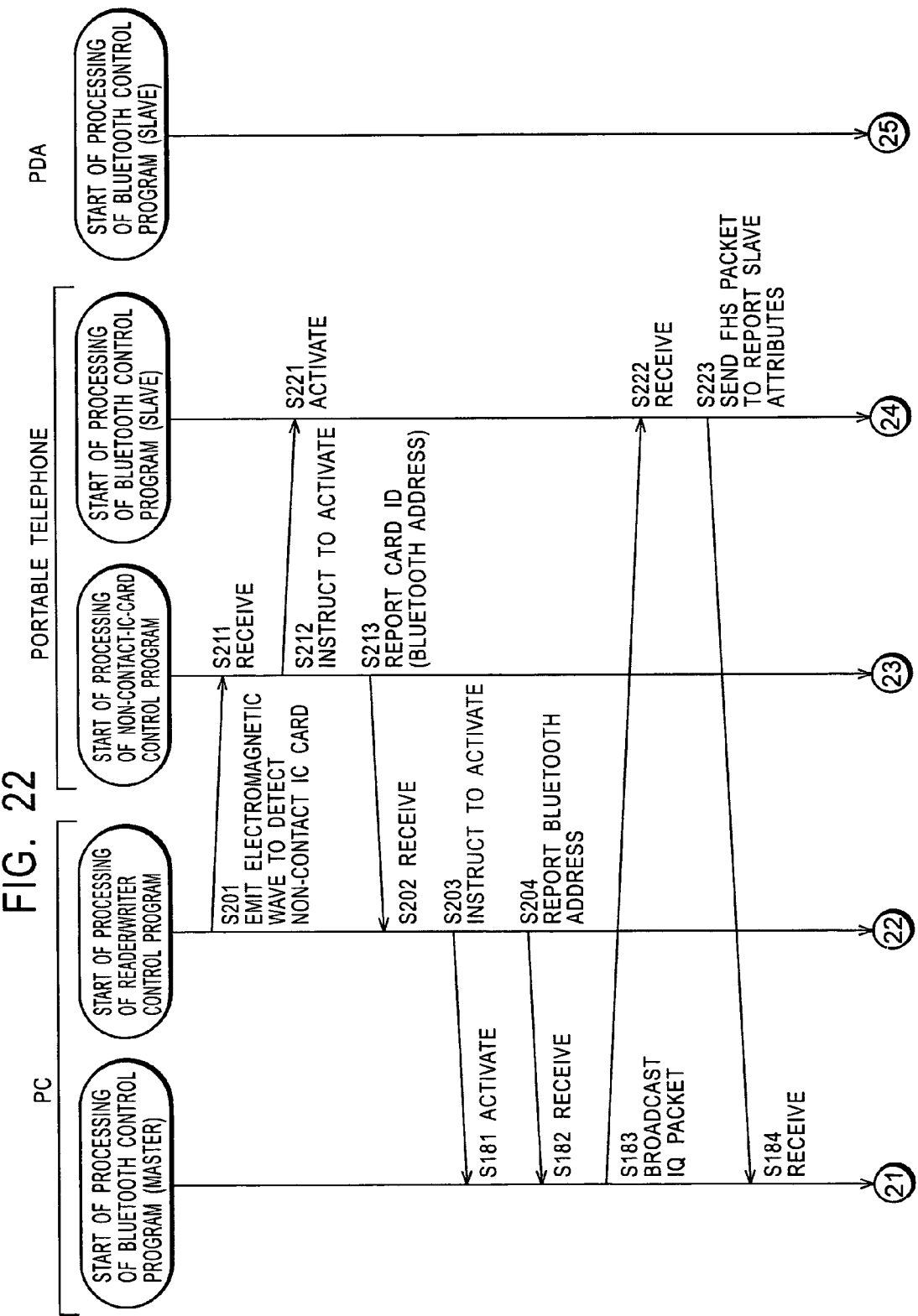
FIG. 22 is a flowchart describing other processes of the communication system shown in FIG. 6.

The processes shown in FIG. 22 and FIG. 23 are basically the same as the synchronization establishment processes described by referring to FIG. 20 and FIG. 21. The processes shown in FIG. 22 and FIG. 23 differ in that the Bluetooth module 247 of the portable telephone 52 is activated in response to receiving electromagnetic waves emitted from the reader/writer 105, and the Bluetooth module 106 of the personal computer 51 is activated in response to the state in which the reader/writer 105 receives the card ID sent from the non-contact IC card 246.

In step 201, the reader/writer control program 86F emits electromagnetic waves to detect a terminal in which a non-contact IC card is built.

When the electromagnetic waves are received in step S211, the non-contact-IC-card control program 302 proceeds to step S212, and instructs the Bluetooth control program 304 (Bluetooth module 246) to perform activation.

For example, the non-contact-IC-card control program 302 reports to the host program 301 that the electromagnetic waves have been received. In response to this report, the host program 301 activates the Bluetooth control program 304, and controls the power-supply circuit block 235 to supply electric power to the Bluetooth module 247.

The Bluetooth control program 304 is activated in step S221, and is, for example, (in an inquiry scan state) waiting for an inquiry made by the master (personal computer 51).

After the non-contact-IC-card control program 302 activates the Bluetooth control program 304, the non-contact-IC-card control program 302 proceeds to step S213, and reports the card ID corresponding to the Bluetooth address to the reader/writer 105.

When the card ID is received in step S202, the reader/writer control program 86F proceeds to step S203, activates the Bluetooth control program 86G, and supplies electric power to the Bluetooth module 106.

The Bluetooth control program 86G is activated in step S181, proceeds to step S182, and receives the Bluetooth address (card ID) which the reader/writer control program 86F has obtained from the portable telephone 52.

The reader/writer control program 86F activates the Bluetooth control program 86G in step S203, proceeds to step S204, and reports the card ID obtained from the portable telephone 52 to the Bluetooth control program 86G.

In subsequent processes (processes in step S183 to step S189, and processes in step S222 to step S227), the Bluetooth control program 86G performs an inquiry and paging, described by referring to FIG. 20 and FIG. 21, for the Bluetooth module 246.

More specifically, the Bluetooth control program 86G specifies the portable telephone 52 as a slave with which synchronization should be established in the Piconet according to the Bluetooth address reported by the reader/writer 105, and establishes synchronization only with the portable telephone 52 in the Piconet.

Since the PDA 53 does not receive electromagnetic waves from the reader/writer 105, it is not activated. Therefore, it is easier to specify the partner of communication.

As described above, since the Bluetooth module 246 is activated in response to receiving electromagnetic waves, the user of the portable telephone 52 can activate the Bluetooth control program 304 just by bringing the portable telephone 52 close to the personal computer 51 without, for example, performing an operation for activating the Bluetooth control program 304. In the same way as that described above, since the partner of communication is specified according to the card ID reported from the non-contact IC card 246, Bluetooth communication with the personal computer 51 can be performed without performing any operations.

In the above description, the Bluetooth module 247 of the portable telephone 52 is activated in response to receiving electromagnetic waves emitted from the reader/writer 105, and the Bluetooth module 106 of the personal computer 51 is activated in response to receiving the card ID sent from the portable telephone 52. They may be activated at various timing.

For example, the Bluetooth control program 304 of the portable telephone 52 may be activated at timing (timing immediately after step S213) when the card ID is reported to the personal computer 51.

It is also possible that the power to the portable telephone 52 is turned on according to electromotive force generated in response to receiving electromagnetic waves in a state in which the power to the portable telephone 52 is off, and then, the Bluetooth control program 304 is activated.

In the above description, the non-contact IC card 246 and the Bluetooth module 247 are both built in the portable telephone 52. For example, the memory stick 223 in which these modules are incorporated may be mounted to the memory stick slot 222 to execute the above-described processes.

Figure 24A:
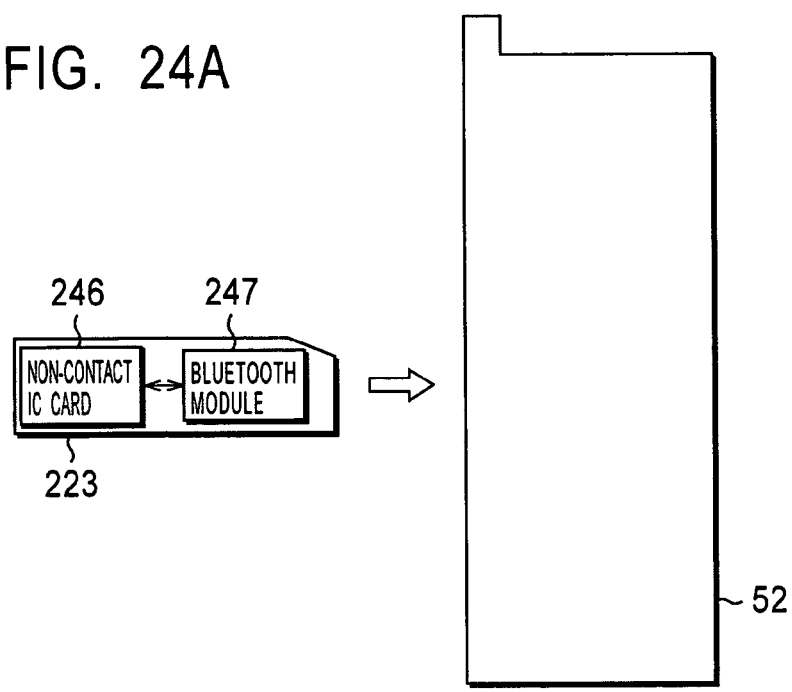
FIG. 24A is a view showing another example structure of the portable telephone shown in FIG. 6, in a sketch manner.

FIG. 24A is a view showing in a sketch manner that the memory stick 223 in which the non-contact IC card 246 and the Bluetooth module 247 are incorporated is mounted to the portable telephone 52 to extend its functions.

Even when the non-contact IC card 246 or the Bluetooth module 247 is not built in the portable telephone 52, for example, the functions of the portable telephone 52 can be extended by mounting the memory stick 223 to the portable telephone 52, and the processes for establishing synchronization in the Piconet, described above, can be executed.

A control program for controlling a newly added function is read from the memory stick 223 and installed into the portable telephone 52. The control program may be, for example, installed from a recording medium, such as the magnetic disk 101 to the semiconductor memory 104 shown in FIG. 11, through a USB cable.

Figure 24B:
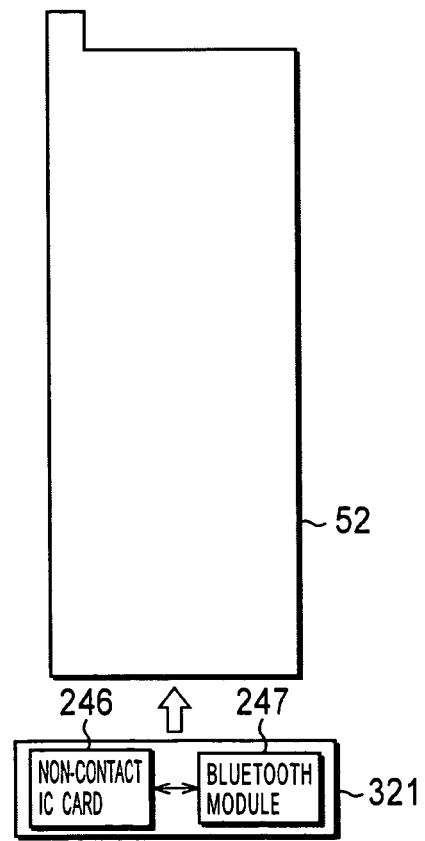
FIG. 24B is a view showing another example structure of the portable telephone shown in FIG. 6, in a sketch manner.

Instead of the memory stick 223, an externally connected unit 321 in which the non-contact IC card 246 and the Bluetooth module 247 are incorporated may be used to extend the functions of the portable telephone 52, as shown in FIG. 24B. The externally connected unit 321 is connected, for example, to a USB connector provided at a predetermined position of the portable telephone 52, or to the connector of a charging cable.

Figure 25A:
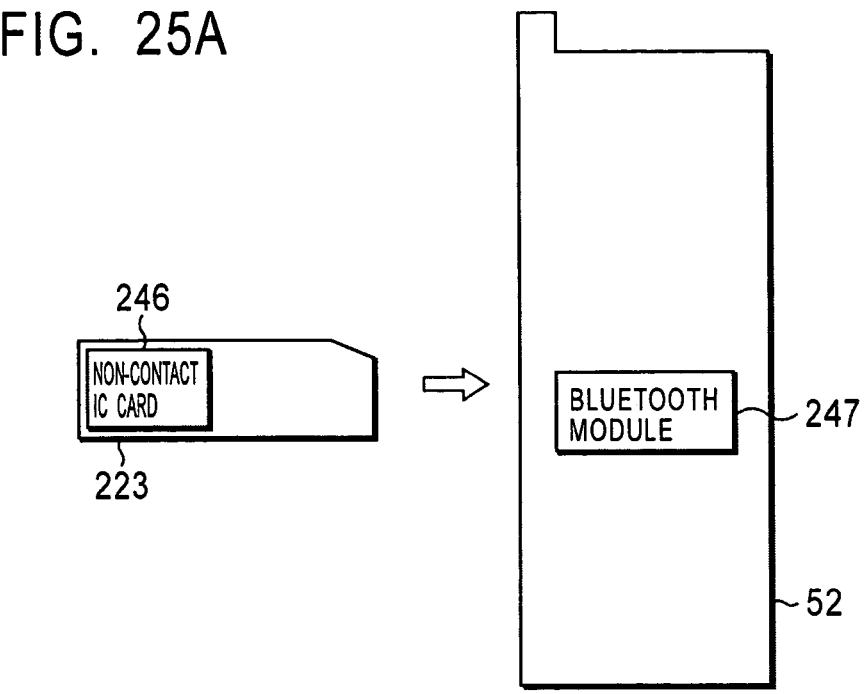
FIG. 25A is a view showing still another example structure of the portable telephone shown in FIG. 6, in a sketch manner.

FIG. 25A is a view showing in a sketch manner that the Bluetooth module 247 is built in the portable telephone 52 and the memory stick 223 is used to add the function of the non-contact IC card 246 to the portable telephone 52.

When the memory stick 223 is mounted to the portable telephone 52, and the card ID assigned to the non-contact IC card 246 is set so as to include the Bluetooth address assigned to the Bluetooth module 247, the processes for establishing synchronization in the Piconet, described above, can be executed. A process for rewriting the card ID will be described later by referring to a flowchart.

Figure 25B:
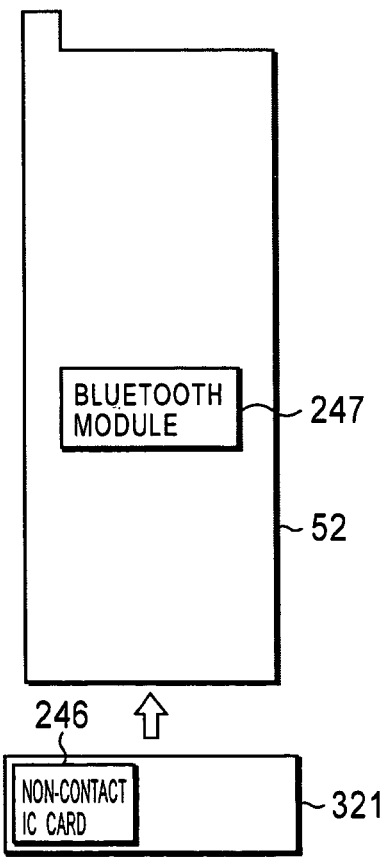
FIG. 25B is a view showing still another example structure of the portable telephone shown in FIG. 6, in a sketch manner.

As shown in FIG. 25B, only the function of the non-contact IC card 246 can be added by mounting the externally connected unit 321 to the portable telephone 52.

Figure 26A:
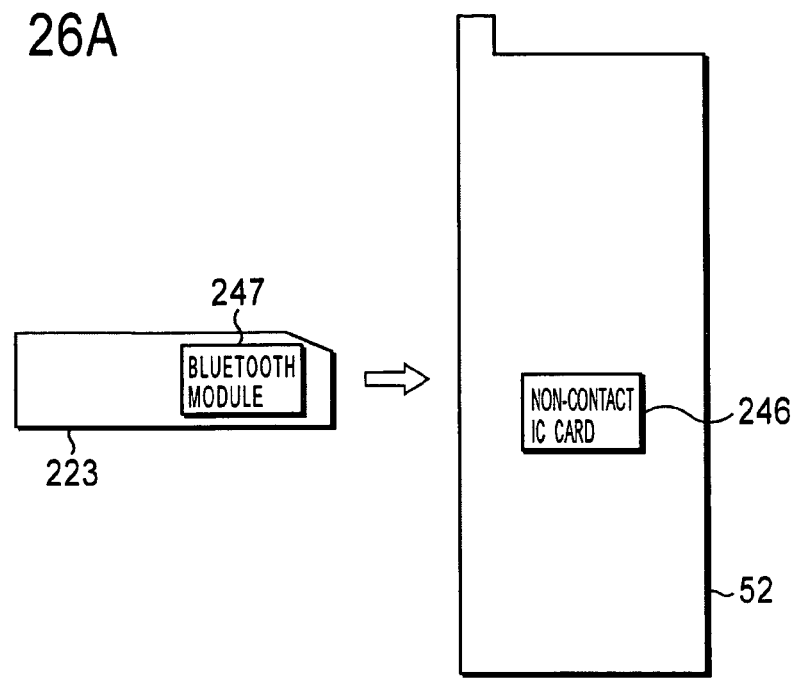
FIG. 26A is a view showing an example structure of the portable telephone shown in FIG. 6, in a sketch manner.
Figure 26B:
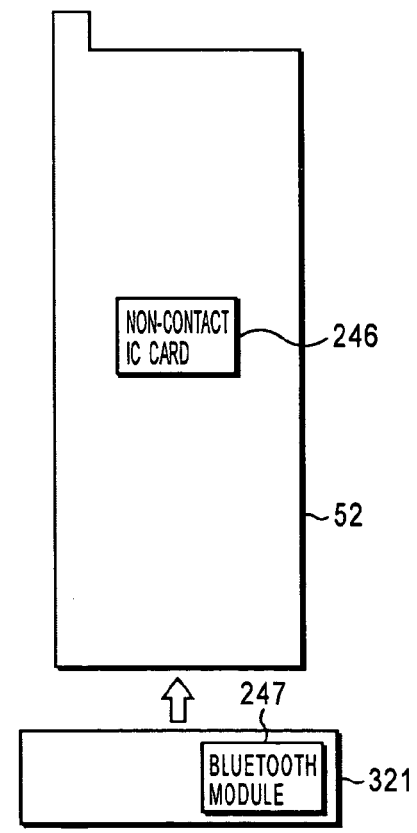
FIG. 26B is a view showing an example structure of the portable telephone shown in FIG. 6, in a sketch manner.

In contrast to FIG. 25A, FIG. 26A is a view showing in a sketch manner that the non-contact IC card 246 is built in the portable telephone 52 and the memory stick 223 is used to add the function of the Bluetooth module 247 to the portable telephone 52. FIG. 26B is a view showing in a sketch manner that the externally connected unit 321 is used to add the function of the Bluetooth module 247 to the portable telephone 52.

In the following description, when there is no need to distinguish the memory stick 223 and the externally connected unit 321 which add the function of the non-contact IC card 246, the function of the Bluetooth module 247, or both functions, they are collectively called a function extension unit.

A process for rewriting the card ID as required in the portable telephone 52 will be described next by referring to flowcharts.

A process for rewriting the card ID according to a Bluetooth address in the portable telephone 52 will be described first by referring to a flowchart shown in FIG. 27.

In step S251, the host program 301 inquires of the card-ID setting program 303 about the card ID. When the inquiry is received in step S271, the card-ID setting program 303 proceeds to step S272, reads the card ID specified in the EEPROM 264, and reports it to the host program 301.

When the card ID is received in step S252, the host program 301 proceeds to step S253, and inquires of the Bluetooth control program 304 about the Bluetooth address.

When the inquiry is received in step S281, the Bluetooth control program 304 proceeds to step S282, reads the Bluetooth address stored in the flash memory 174B, and reports it to the host program 301.

In step 254, the host program 301 obtains the Bluetooth address reported by the Bluetooth control program 304, and compares it with the card ID already reported. In step S255, the host program 301 determines whether the obtained card ID includes at least the Bluetooth address (information related to the Bluetooth address).

When the host program 301 determines in step S255 that the card ID is the same as the Bluetooth address, or the card ID includes the Bluetooth address, the host program 301 terminates the processing. When the host program 301 determines in step S255 that the card ID does not include the Bluetooth address, the host program 301 proceeds to step S256, and reports the obtained Bluetooth address to the card ID setting program 303.

When the Bluetooth address is received in step S273, the card-ID setting program 303 proceeds to step S274, and sets the card ID to the Bluetooth address. In other words, the card-ID setting program 304 rewrites the card ID specified in the EEPROM 264 to the Bluetooth address.

With this, the card ID includes the Bluetooth address. As described above, bringing the portable telephone 52 close to the personal computer 51 serving as the master allows the personal computer 51 to identify the slave with which synchronization should be established in the Piconet.

Including processes described below, the process for rewriting the card ID may be performed at a predetermined interval. Since the non-contact IC card 246 is used in various cases, such as for passing through train gates and the payment of the prices for purchased goods, other than Bluetooth communication, the user may change the card ID as required. Therefore, when the card ID is rewritten at a predetermined interval, the user does not need to re-specify the card ID every time the user wants to start Bluetooth communication.

The card ID may be rewritten at timing when electromagnetic waves sent from the reader/writer 105 are received. With this, the master, which has the reader/writer, can identify the partner of communication more securely.

Figure 28:
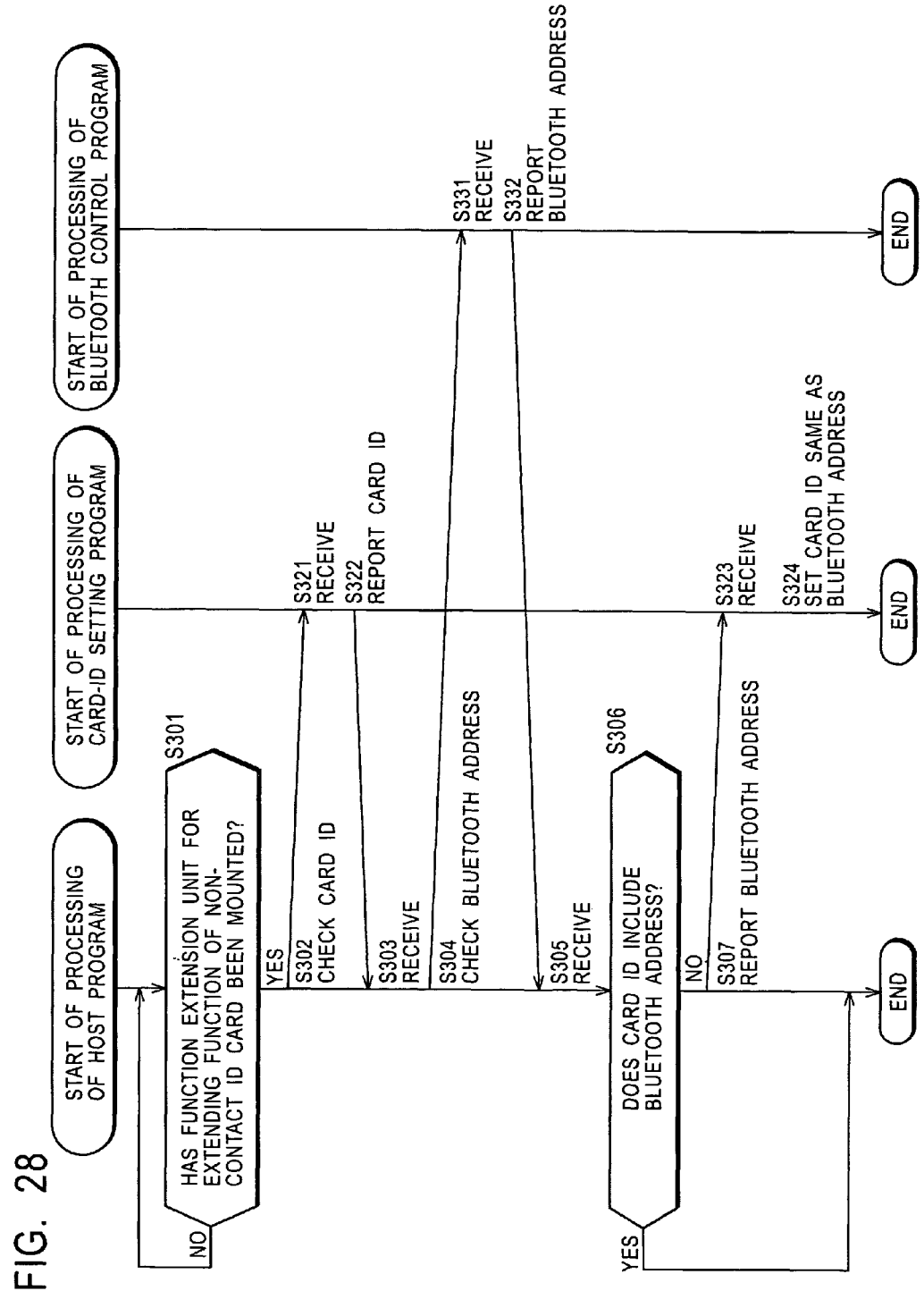
FIG. 28 is a flowchart describing other processes of the portable telephone shown in FIG. 6.

A process performed in the portable telephone 52 when a function extension unit for adding the function of the non-contact IC card 246 is mounted will be described next by referring to a flowchart shown in FIG. 28.

In step S301, the host program 301 determines whether a function extension unit for adding the function of the non-contact IC card 246 has been mounted. The host program 301 is waiting until it determines that the unit has been mounted. When the host program 301 determines in step S301 that, for example, the memory stick 223 shown in FIG. 25A or the externally connected unit 321 shown in FIG. 25B has been mounted at a predetermined position, the host program 301 proceeds to step S302.

Figure 27:
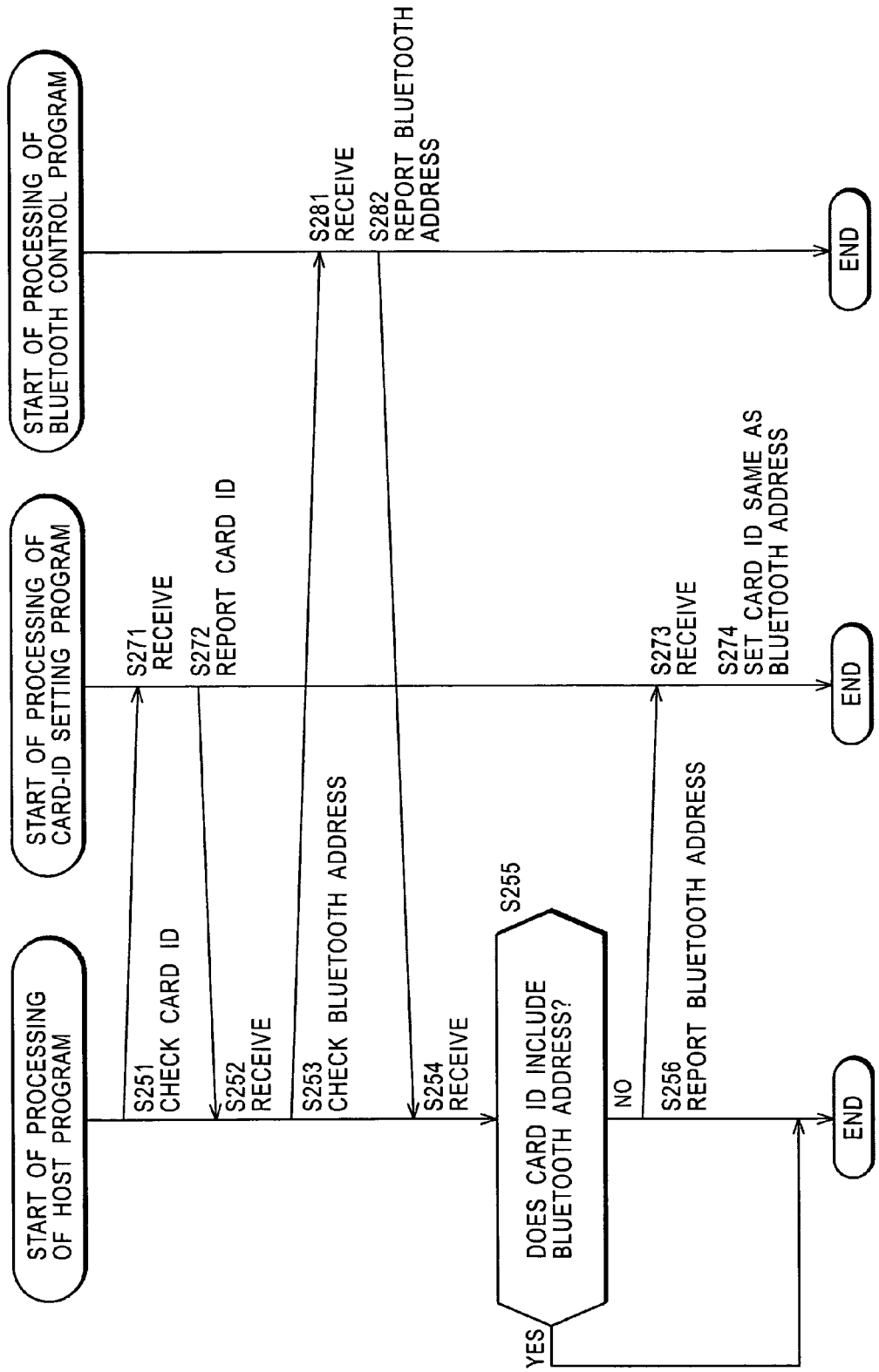
FIG. 27 is a flowchart describing processes of the portable telephone shown in FIG. 6.

Subsequent processes are the same as those described by referring to FIG. 27. More specifically, the host program 301 obtains the card ID and the Bluetooth address, and determines in step S306 whether the card ID includes at least the Bluetooth address.

When the host program 301 determines in step S306 that the card ID includes the Bluetooth address, the host program 301 terminates the processing. When the host program 301 determines that the card ID does not include the Bluetooth address, the host program 301 proceeds to step S307, and reports the Bluetooth address to the card-ID setting program 303.

The card-ID setting program 303 rewrites, for example, the specified card ID to the received Bluetooth address.

With this, for example, just when the user purchases the memory stick 223 for adding the function of the non-contact IC card 246 and mounts the memory stick 223 to the portable telephone 52, the card ID of the non-contact IC card 246 can be rewritten as required.

Therefore, the user can use the portable telephone 52 to which the function has been added, to execute the above-described processes for establishing synchronization in the Piconet and to start Bluetooth communication without selecting the partner of communication.

Figure 29:
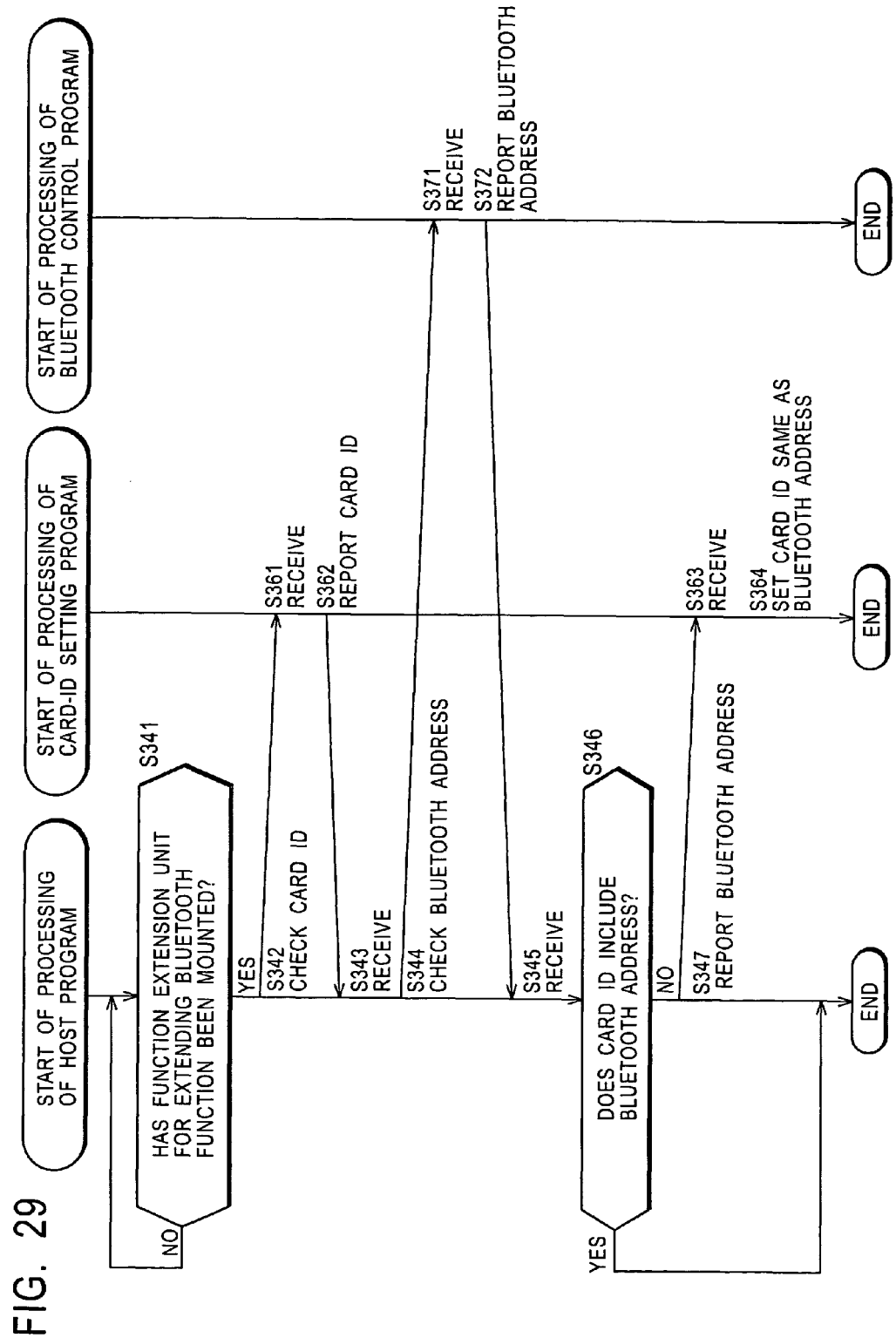
FIG. 29 is a flowchart describing still other processes of the portable telephone shown in FIG. 6.

A process performed in the portable telephone 52 when a function extension unit for adding the function of the Bluetooth module 247 is mounted will be described next by referring to a flowchart shown in FIG. 29.

In step S341, the host program 301 determines whether a function extension unit for adding the function of the Bluetooth module 247 has been mounted. The host program 301 is waiting until it determines that the unit has been mounted. When the host program 301 determines in step S341 that, for example, the memory stick 223 shown in FIG. 26A or the externally connected unit 321 shown in FIG. 26B has been mounted at a predetermined position, the host program 301 proceeds to step S342.

Subsequent processes are the same as those described by referring to FIG. 27. More specifically, the host program 301 obtains the card ID and the Bluetooth address, and determines in step S346 whether the card ID includes at least the Bluetooth address.

When the host program 301 determines in step S346 that the card ID includes the Bluetooth address, the host program 301 terminates the processing. When the host program 301 determines that the card ID does not include the Bluetooth address, the host program 301 proceeds to step S347, and reports the Bluetooth address to the card-ID setting program 303.

The card-ID setting program 303 rewrites, for example, the specified card ID to the received Bluetooth address.

With the above-described processes, for example, just when the user purchases the memory stick 223 for adding the function of the Bluetooth module 247 and mounts the memory stick 223 to the portable telephone 52, the card ID can be rewritten as required. In addition, the user can use the portable telephone 52 to execute the above-described processes for establishing synchronization in the Piconet.

In the above description, the memory for storing the card ID and the memory for storing the Bluetooth address are provided. One physical memory shared by the non-contact IC card 246 and the Bluetooth module 247 may store those pieces of information. The shared memory may be incorporated into the memory stick 223 or may be built in the portable telephone 52.

In the above description, the personal computer 51 serves as the master, and the portable telephone 52 serves as a slave. It is of course allowed if both devices perform the opposite roles. When a reader/writer is also provided for the portable telephone 52, it is also possible that the portable telephone 52 detects the personal computer 51, and establishes synchronization in the Piconet according to the card ID reported from the non-contact IC card of the personal computer 51.

The communication system in which the Bluetooth address is obtained by communication between the non-contact IC card and the reader/writer, and synchronization is established in the Piconet according to the Bluetooth address can also be applied to various pairs of units, in addition to the pair of the personal computer 51 and the portable telephone 52, described above.

For example, a communication system such as that described above can be formed between a portable terminal, such as the portable telephone 52 or the PDA 53, and an apparatus, such as a TV receiver, a car navigation apparatus, a vending machine, or an ATM (automatic teller machine). In this case, the portable terminal, such as the portable telephone 52 or the PDA 53, needs to have at least a Bluetooth module and a non-contact IC card, and the apparatus, such as a TV receiver, a car navigation apparatus, a vending machine, or an ATM, needs to have at least a Bluetooth module, and a reader/writer for a non-contact IC card.

The present invention can also be applied to processing for establishing synchronization in a Piconet formed of a pair of portable telephones, a pair of PDAs, a pair of a PDA and a digital camera, or a pair of a PDA and a digital video camera if one of the pair has a reader/writer.

The present invention is not limited to a connection between units. It is also possible that electromagnetic-induction communication blocks (a reader/writer and a non-contact IC card) and Bluetooth modules are provided, for example, for moving objects, such as automobiles, trains, ships, airplanes, inside buildings, or all over a city, and they are connected to networks, such as the Internet, LANs (local area networks), or WANs (wide area networks) through the Bluetooth modules to form a so-called ubiquitous society (ubiquitous network society or ubiquitous computing society).

Figure 30:
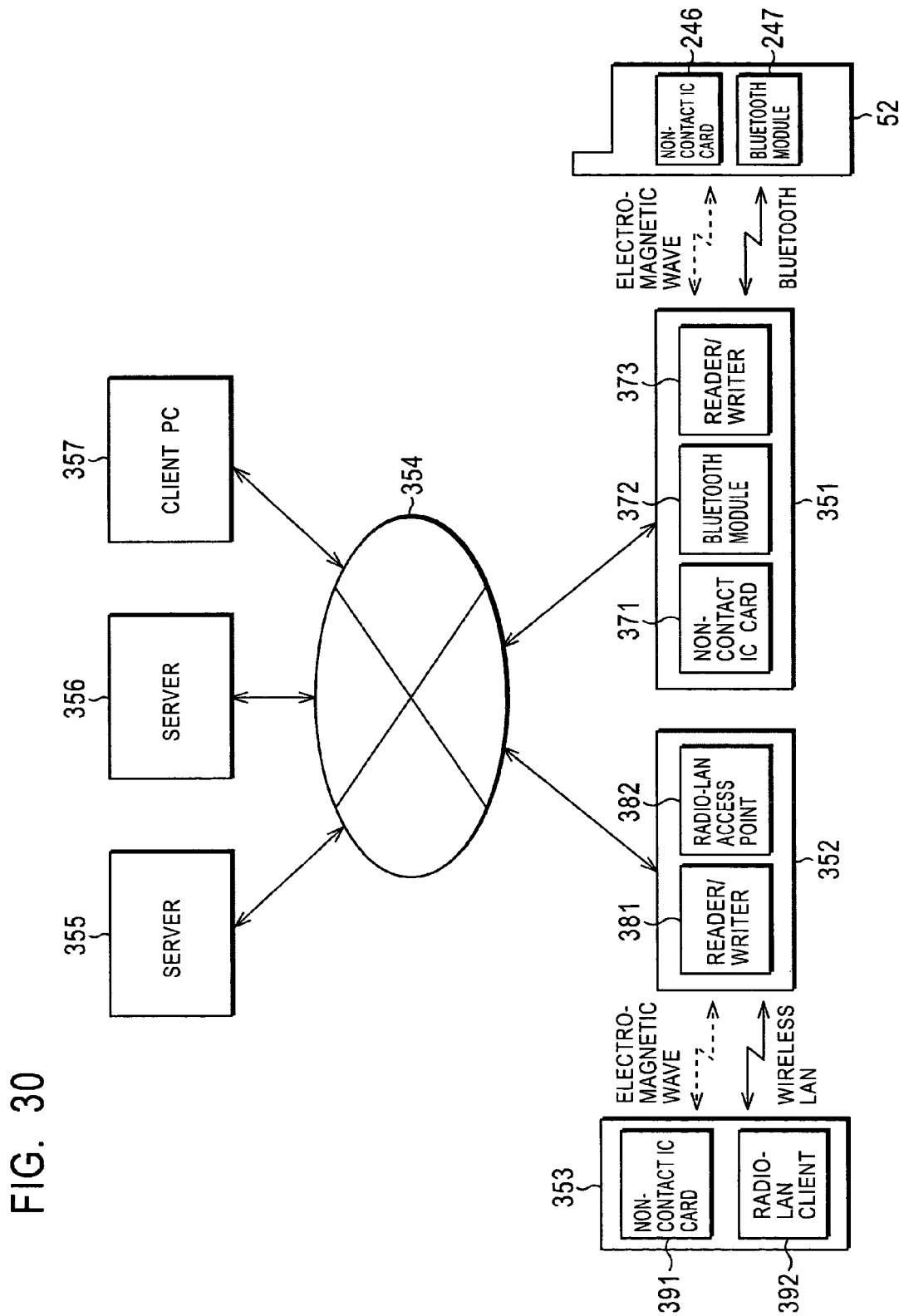
FIG. 30 is a view showing the concept of a ubiquitous society to which the present invention is applied.

FIG. 30 is a view showing the concept of a ubiquitous society formed by a communication system to which the present invention is applied.

In the figure, the Internet 354 is connected to access points 351 and 352, servers 355 and 356, and a client PC 357, and various pieces of information can be transmitted and received among them.

The access point 351 is provided with a non-contact IC card 371, a Bluetooth module 372, and a reader/writer 373. When the user of the portable telephone 52 just brings the portable telephone 52 close to the access point 351, the above-described processing for specifying the partner of communication is performed, and then, the user can access the Internet 354 through Bluetooth.

The access point 352 is provided with a reader/writer 381 and a wireless LAN access point 382. Therefore, when the user of a PDA 353 in which a non-contact IC card 391 and a wireless LAN client 392 are built just brings the PDA 353 close to the access point 352, the above-described processing for specifying the partner of communication is performed, and then, the user can access the Internet 354 through a wireless LAN.

For example, the user of the portable telephone 52 can easily and at any time obtain desired contents from the server 355, participate in a community developed in the server 356, or operate the client PC 357 located at a remote place just by bringing the portable telephone 52 close to any of the access points 351 installed all over the city.

When a unique address similar to a Bluetooth address is assigned to each device, the present invention can be applied to communication made by a wireless LAN (IEEE (Institute of Electrical and Electronics Engineers) 802.11b) performed between the access point 352 and the PDA 353 shown in FIG. 33, in addition to communication made by Bluetooth.

Specifically, when IPv6 (Internet protocol version 6) having 128 bits, for example, specified for the PDA 353 is reported to the reader/writer 381 of the access point 352, the user of the PDA 353 can access the Internet 354 through the wireless LAN just by bringing the PDA 353 close to the access point 352.

The present invention can also be applied to communication performed, for example, by IrDA, HomeRF (SWAP), and Wireless1394, in addition to communication performed by Bluetooth.

Instead of the above-described communication method in which electric-power transfer and data transfer are performed by using a loop antenna such as that of a non-contact IC card, any communication methods may be used in which an output is suppressed and a communication distance is made in advance shorter than those of the Bluetooth communication method and others.

As described above, in Bluetooth communication, when synchronization is established, and the partner of communication with which synchronization has been established is a terminal which performs communication for the first time, it is usually required to input the same PIN code to both units. In a case in which the present invention is applied, and the partner of communication is specified, for example, according to identification information provided by communication which use electromagnetic induction or others to make Bluetooth communication ready, however, an PIN-code input may be made unnecessary in advance. In this case, a predetermined PIN code is shared by both terminals, for example, by communication which use electromagnetic induction.

In a case in which the partner of communication is specified, for example, according to identification information provided by communication which use electromagnetic induction or others to make Bluetooth communication ready, settings may be made in advance such that communication are performed according to a predetermined profile. In this case, profiles which can be provided by itself are shared by both terminals by communication which use electromagnetic induction, and a predetermined profile is selected from the profiles.

Instead of the memory stick 223, described above, any devices having shapes which can be inserted into the predetermined slot may be used. For example, devices conforming to an SD-card (registered trademark) standard and devices conforming to a CF-card (registered trademark) standard may be used instead of the memory stick 223.

In the above-described cases, the reader/writer 105 and the non-contact IC card 246 are individually configured. A device having the functions of both of these devices may be respectively provided for the personal computer 51 and the portable telephone 52. In addition, the device having the functions of both may be stored, for example, in the memory stick 223, described above, to extend the functions of the personal computer 51 and the portable telephone 52.

A unit having a reader/writer (such as the personal computer 51, described above) may store information related to units which performed Bluetooth communication in the past, as history information. With this, when the Bluetooth address or others of a unit located close is reported by communication which use electromagnetic induction, the unit located close can be identified by referring to the history information.

For example, the Bluetooth address or Bluetooth device name of a unit, or the category of the unit, described by referring to FIG. 2, or profiles which can be provided by the unit is stored as the history information.

The above-described series of processes can be implemented not only by hardware but also by software.

When the series of processes is achieved by software, a program constituting the software is installed from networks or recording media into a computer in which special hardware is incorporated, or into a unit which can execute various functions by installing various programs, such as a general-purpose personal computer.

The recording media include not only package media storing the program and distributed separately from the apparatus to provide the program for the users, such as the magnetic disk 101 (including a floppy disk), the optical disk 102 (including a CD-ROM (compact disk read only memory) and a DVD (digital versatile disk)), the magneto-optical disk 103 (including an MD (registered trademark (Mini-disk)), and the semiconductor memory 104, as shown in FIG. 11, but also units which are incorporated in advance in the apparatus and provided for the users, such as the HDD 114 and the ROM 119 which have recorded the program.

In the present specification, steps describing the program recorded in a recording medium include not only processing executed in a time-sequential manner in the described order, but also processing which is not necessarily executed in a time-sequential manner but is processed in parallel or separately.

In the present specification, a system refers to the entire apparatus formed of a plurality of apparatuses.

INDUSTRIAL APPLICABILITY

As described above, according to a communication system and a communication method of the present invention, the identification information of a communication terminal located close is acquired by using a first wireless communication block for transferring electric power and for transmitting and receiving data by a loop antenna for the communication terminal, the attribute information of each of a plurality of communication terminals, which include the communication terminal, is acquired from the plurality of communication terminals by using a second wireless communication block for transmitting and receiving data, and the partner of communication is specified by using the identification information and the attribute information. Then, synchronization is established for wireless communication performed by using the specified communication terminal and the second wireless communication block. The identification information of the communication terminal is provided for an information processing apparatus by using a third wireless communication block for transmitting and receiving data by using at least part of induced electric power obtained through a loop antenna, the attribute information of the communication terminal is provided by using a fourth wireless communication block for transmitting and receiving data, in response to a request sent from the information processing apparatus through the second wireless communication block, and synchronization is established by transmitting and receiving a predetermined signal through the fourth communication block, in response to a request sent from the information processing apparatus when synchronization is established for wireless communication performed by the second wireless communication block. Therefore, a terminal serving as the partner of communication can be specified, and communication can be started more easily and more quickly.

According to a first information processing apparatus, an information processing method, and a program of the present invention, identification information is acquired from a communication terminal by using a first wireless communication block for transmitting and receiving predetermined data, the attribute information of each of a plurality of communication terminals, which include the communication terminal, is acquired from the plurality of communication terminals by using a second wireless communication block for transmitting and receiving desired data, and the partner of communication is specified by using the acquired identification information and the attribute information. Synchronization is also established for wireless communication performed by using the specified communication terminal and the second wireless communication block. Therefore, a terminal serving as the partner of communication can be specified, and communication can be started more easily and more quickly.

According to a communication terminal, a communication method, and a program of the present invention, its own identification information is provided by using a first wireless communication block for transmitting and receiving predetermined data, in response to a predetermined request sent from an information processing apparatus, and its own attribute information is provided by using a second wireless communication block for transmitting and receiving data, in response to a predetermined request sent from the information processing apparatus. Synchronization is also established by transmitting and receiving a predetermined signal through the second wireless communication block, in response to a request sent from the information processing apparatus when synchronization is established for wireless communication performed by the second wireless communication block. Therefore, communication can be started more easily and more quickly.

According to a first extension apparatus of the present invention, identification information is acquired from a communication terminal by using a first wireless communication block electrically connected to an information processing apparatus, for transmitting and receiving predetermined data, and the attribute information of each of a plurality of communication terminals is acquired from the plurality of communication terminals by using a second wireless communication block for transmitting and receiving desired data. The partner of communication is specified by using the acquired identification information and the attribute information acquired from the plurality of communication terminals, and synchronization is established for wireless communication performed by using the specified communication terminal and the second wireless communication block. Therefore, even when the first and second wireless communication blocks are not provided for the information processing apparatus, the functions thereof can be added by the first extension apparatus, and communication can be started more easily and more quickly.

According to a second extension apparatus of the present invention, its own identification information is provided by using a connection terminal electrically connected to a communication terminal, for transmitting and receiving data, and a first wireless communication block for transmitting and receiving predetermined data, in response to a request sent from an information processing apparatus, and its own attribute information is provided by using a second wireless communication block for transmitting and receiving data, in response to a request sent from the information processing apparatus. Then, synchronization is established by transmitting and receiving a predetermined signal through the second wireless communication block, in response to a request sent from the information processing apparatus when synchronization is established for wireless communication performed by the second wireless communication block. Therefore, even when the first and second wireless communication blocks are not provided for the information processing apparatus, the functions thereof can be added by the second extension apparatus, and communication can be started more easily and more quickly.

According to a second information processing apparatus of the present invention, identification information is acquired from a communication terminal by using a first wireless communication block for transmitting and receiving predetermined data, information related to a plurality of communication terminals with which communication were performed by using a second wireless communication block for transmitting and receiving desired data is stored as history information, and the partner of communication is specified by using the acquired identification information and history information. Synchronization is also established for wireless communication performed by using the specified communication terminal and the second wireless communication block. Therefore, communication performed by using the second wireless communication block can be easily started without which obtaining information related to communication units with which communication were performed in the past.

The invention claimed is:

1. A communication system in a network, comprising an information processing apparatus and a plurality of communication terminals, wherein
the information processing apparatus comprises:
first acquisition processing means for acquiring identification information of one of the communication terminals when the communication terminal comes within a first kind of wireless communication range of the information processing apparatus, the identification information comprising a first Bluetooth address of the communication terminal, wherein communication terminals within the range can communicate by transferring electric power, and wherein the identification information is acquired by using a first wireless communication block for transferring electric power and for transmitting and receiving data by a loop antenna for the communication terminal;
activation processing means for activating a second wireless communication block of the information processing apparatus, by initializing a supply of electric power to the second wireless communication block to switch the second wireless communication block from a state in which the power is turned off to a state in which the power is turned on, in response to the acquisition of the identification information by the first acquisition processing means;
means for broadcasting a request to the communication terminals by the second wireless communication block;
storage processing means for storing, as history information, information for a second kind of wireless communication, by using the second wireless communication block for transmitting and receiving desired data, the history information being stored before the second wireless communication block of the information processing apparatus is activated, and including a second Bluetooth address and a profile for each of the communication terminals;
specifying processing means for comparing the first Bluetooth address from the identification information with the second Bluetooth addresses from the history information to determine that one of the second Bluetooth addresses matches the first Bluetooth address, and for automatically identifying the communication terminal having the matching second Bluetooth address as the partner of communication from the communication terminals; and
first synchronization establishment processing means for establishing synchronization for wireless communication performed by using the communication terminal specified by the specifying processing means and the second wireless communication block, and wherein
the communication terminal comprises:
first providing processing means for providing the information processing apparatus with the identification information of the communication terminal by using a third wireless communication block for transmitting and receiving data by using at least part of induced electric power obtained through a loop antenna;
identification information processing means configured to rewrite the identification information to a form compliant with one of a plurality of protocols, the plurality of protocols being compatible with a plurality of types of information processing apparatus, wherein the rewrite occurs at predetermined interval;
activation processing means for activating a fourth wireless communication block of the communication terminal, by initializing a supply of electric power to the fourth wireless communication block to switch the fourth wireless communication block from the state in which the power is turned off to the state in which the power is turned on, in response to the third wireless communication block; and
second synchronization establishment processing means for establishing synchronization by transmitting and receiving a predetermined signal through the fourth wireless communication block, in response to a request sent from the information processing apparatus when synchronization is established for wireless communication performed by the second wireless communication block.

2. A communication method for a communication system in a network comprising an information processing apparatus and a plurality of communication terminals, wherein
an information processing method for the information processing apparatus comprises:
acquiring identification information of one of the communication terminals when the communication terminal comes within a first kind of wireless communication range of the information processing apparatus, the identification information comprising a first Bluetooth address of the communication terminal, wherein communication terminals within the range communicate by transferring electric power, and wherein the identification information is acquired by using a first wireless communication block for transferring electric power, and for transmitting and receiving data by a loop antenna for the communication terminal;
activating a second wireless communication block of the information processing apparatus, by initializing a supply of electric power to the second wireless communication block to switch the second wireless communication block from a state in which the power is turned off to a state in which the power is turned on, in response to the acquisition of the identification information;
broadcasting a request to the communication terminals by the second wireless communication block;
storing, as history information, information for a second kind of wireless communication, by using the second wireless communication block for transmitting and receiving desired data, the history information being stored before the second wireless communication block of the information processing apparatus is activated, and including a second Bluetooth address and a profile for each of the communication terminals;
comparing the first Bluetooth address from the acquired identification information with the second Bluetooth addresses from the stored history information to determine that one of the second Bluetooth addresses matches the first Bluetooth address, and automatically identifying the communication terminal having the matching second Bluetooth address as the partner of communication from the communication terminals; and establishing synchronization for wireless communication performed by using the identified communication terminal and the second wireless communication block, and wherein an information processing method for the communication terminal comprises:
providing the information processing apparatus with the identification information of the communication terminal by using a third wireless communication block for transmitting and receiving data by using at least part of induced electric power obtained through a loop antenna;
rewriting the identification information to a form compliant with one of a plurality of protocols, the plurality of protocols being compatible with a plurality of types of information processing apparatus, wherein the rewrite occurs at a predetermined interval;
activating a fourth wireless communication block of the communication terminal, by initializing a supply of electric power to the fourth wireless communication block to switch the fourth wireless communication block from the state in which the power is turned off to the state in which the power is turned on, in response to the third wireless communication block; and
establishing synchronization by transmitting and receiving a predetermined signal through the fourth communication block, in response to a request sent from the information processing apparatus when synchronization is established for wireless communication performed by the second wireless communication block.

3. An information processing apparatus, comprising:
first acquisition processing means for acquiring identification information from one of a plurality of communication terminals, when the communication terminal comes within a first kind of wireless communication range of the information processing apparatus, the identification information comprising a first Bluetooth address of the communication terminal, wherein communication terminals within the range can communicate by transferring electric power, and wherein the identification information is acquired by using a first wireless communication block for transmitting and receiving predetermined data, wherein the communication terminals are configured to rewrite the identification information to a form compliant with one of a plurality of protocols, the plurality of protocols being compatible with a plurality of types of information processing apparatus, wherein the rewrite occurs at a predetermined interval;
activation processing means for activating a second wireless communication block of the information processing apparatus, by initializing a supply of electric power to the second wireless communication block to switch the second wireless communication block from a state in which the power is turned off to a state in which the power is turned on, in response to the acquisition of the identification information by the first acquisition processing means and for causing the communication terminal to activate a third wireless communication block of the communication terminal in response to receiving electromagnetic waves from the information processing apparatus;
means for broadcasting a request to the communication terminals by the second wireless communication block;
storage processing means for storing, as history information, information for a second kind of wireless communication by using the second wireless communication block for transmitting and receiving desired data, the history information being stored before the second wireless communication block of the information processing apparatus is activated, and including a second Bluetooth address and a profile for each of the communication terminals;
specifying processing means for comparing the first Bluetooth address from the identification information with the second Bluetooth addresses from the history information to determine that one of the second Bluetooth addresses matches the first Bluetooth address, and for automatically identifying the communication terminal having the matching second Bluetooth address as the partner of communication from the communication terminals; and
synchronization establishment processing means for establishing synchronization for wireless communication performed by using the communication terminal specified by the specifying processing means and the second wireless communication block;
wherein the first wireless communication block communicates with a third wireless communication block of the communication terminal, the second wireless communication block communicates with a fourth wireless communication block of the communication terminal, and the fourth wireless communication block is activated by the third wireless communication block.

4. The information processing apparatus according to claim 3, wherein the first acquisition processing means acquires the identification information of a communication terminal located close by using the first wireless communication block for transferring electric power and for transmitting and receiving data by a loop antenna for the communication terminal.

5. The information processing apparatus according to claim 3, wherein
the synchronization establishment processing means sends an ID packet to the communication terminal specified by the specifying processing means, by using the second wireless communication block, and further sends an FHS packet of the information processing apparatus when the communication terminal responds to the transmission of the ID packet.

6. An information processing method, comprising:
acquiring identification information from one of a plurality of communication terminals, when the communication terminal comes within a first kind of wireless communication range of an information processing apparatus, the identification information comprising a first Bluetooth address of the communication terminal, wherein communication terminals within the range can communicate by transferring electric power, and wherein the identification information is acquired by using a first wireless communication block for transmitting and receiving predetermined data, wherein the communication terminals are configured to rewrite the identification information to a form compliant with one of a plurality of protocols, the plurality of protocols being compatible with a plurality of types of information processing apparatus, wherein the rewrite occurs at a predetermined interval;
activating a second wireless communication block of the information processing apparatus, by initializing a supply of electric power to the second wireless communication block to switch the second wireless communication block from a state in which the power is turned off to a state in which the power is turned on, in response to the acquisition of the identification information and for causing the communication terminal to activate a third wireless communication block of the communication terminal in response to receiving electromagnetic waves from the information processing apparatus;

broadcasting a request to the communication terminals by the second wireless communication block;

storing, as history information, information for a second kind of wireless communication, by using the second wireless communication block for transmitting and receiving desired data, the history information being stored before the second wireless communication block of the information processing apparatus is activated, and including a second Bluetooth address and a profile for each of the communication terminals;

comparing the first Bluetooth address from the acquired identification information with the second Bluetooth addresses from the stored history information to determine that one of the second Bluetooth addresses matches the first Bluetooth address, and automatically identifying the communication terminal having the matching second Bluetooth address as the partner of communication from the communication terminals; and establishing synchronization for wireless communication performed by using the identified communication terminal and the second wireless communication block;

wherein the first wireless communication block communicates with a third wireless communication block of the communication terminal, the second wireless communication block communicates with a fourth wireless communication block of the communication terminal, and the fourth wireless communication block is activated by the third wireless communication block.

7. The information processing method according to claim 6, wherein
the distance at which the first wireless communication block can perform wireless communication is shorter than the distance at which the second wireless communication block can perform wireless communication.

8. The information processing method according to claim 6, wherein the identification information of a communication terminal located close is acquired by using the first wireless communication block for transferring electric power and for transmitting and receiving data by a loop antenna for the communication terminal.

9. The information processing method according to claim 6, wherein
an ID packet is sent to the identified communication terminal, by using the second wireless communication block, and an FHS packet of the information processing apparatus is further sent when the communication terminal responds to the transmission of the ID packet.

10. An extension apparatus capable of being installed in an information processing apparatus, comprising:
a connection terminal electrically connected to the information processing apparatus, for transmitting and receiving data;
first acquisition processing means for acquiring identification information from one of a plurality of communication terminals, when the communication terminal comes within a first kind of wireless communication range of the information processing apparatus, the identification information comprising a first Bluetooth address of the communication terminal, wherein communication terminals within the range can communicate by transferring electric power, and wherein the identification information is acquired by using a first wireless communication block for transmitting and receiving predetermined data, wherein the communication terminals are configured to rewrite the identification information to a form compliant with one of a plurality of protocols, the plurality of protocols being compatible with a plurality of types of information processing apparatus, wherein the rewrite occurs at a predetermined interval;

activation processing means for activating a second wireless communication block of the information processing apparatus, by initializing a supply of electric power to the second wireless communication block to switch the second wireless communication block from a state in which the power is turned off to a state in which the power is turned on, in response to the acquisition of the identification information by the first acquisition processing means and for causing the communication terminal to activate a third wireless communication block of the communication terminal in response to receiving electromagnetic waves from the information processing apparatus;

means for broadcasting a request to the communication terminals by the second wireless communication block;

storage processing means for storing, as history information, information for a second kind of wireless communication, by using the second wireless communication block for transmitting and receiving desired data, the history information being stored before the second wireless communication block of the information processing apparatus is activated, and including a second Bluetooth address and a profile for each of the communication terminals;

specifying processing means for comparing the first Bluetooth address from the identification information with the second Bluetooth address from the history information to determine that one of the second Bluetooth addresses matches the first Bluetooth address, and for automatically identifying the communication terminal having the matching second Bluetooth address as the partner of communication from the communication terminals; and synchronization establishment processing means for establishing synchronization for wireless communication performed by using the communication terminal specified by the specifying processing means and the second wireless communication block;

wherein the first wireless communication block communicates with a third wireless communication block of the communication terminal, the second wireless communication block communicates with a fourth wireless communication block of the communication terminal, and the fourth wireless communication block is activated by the third wireless communication block.

11. A recording medium comprising a program which, when executed by a processor, performs a method, the method comprising:
acquiring identification information from one of a plurality of communication terminals, when the communication terminal comes within a first kind of wireless communication range of an information processing apparatus, the identification information comprising a first Bluetooth address of the communication terminal, wherein communication terminals within the range can communicate by transferring electric power, and wherein the identification information is acquired by using a first wireless communication block for transmitting and receiving predetermined data, wherein the communication terminals are configured to rewrite the identification information to a form compliant with one of a plurality of protocols, the plurality of protocols being compatible with a plurality of types of information processing apparatus, wherein the rewrite occurs at a predetermined interval;

activating a second wireless communication block of the information processing apparatus, by initializing a supply of electric power to the second wireless communication block to switch the second wireless communication block from a state in which the power is turned off to a state in which the power is turned on, in response to the acquisition of the identification information and for causing the communication terminal to activate a third wireless communication block of the communication terminal in response to receiving electromagnetic waves from the information processing apparatus;

broadcasting a request to the communication terminals by the second wireless communication block;

storing, as history information, information for a second kind of wireless communication, by using the second wireless communication block for transmitting and receiving desired data, the history information being stored before the second wireless communication block of the information processing apparatus is activated, and including a second Bluetooth address and a profile for each of the communication terminals;

comparing the first Bluetooth address from the acquired identification information with the second Bluetooth addresses from the stored history information to determine that one of the second Bluetooth addresses matches the first Bluetooth address, and automatically identifying the communication terminal having the matching second Bluetooth address as the partner of communication from the communication terminals; and establishing synchronization for wireless communication performed by using the identified communication terminal and the second wireless communication block;

wherein the first wireless communication block communicates with a third wireless communication block of the communication terminal, the second wireless communication block communicates with a fourth wireless communication block of the communication terminal, and the fourth wireless communication block is activated by the third wireless communication block.

12. The information processing apparatus according to claim 3, wherein
the distance at which the first wireless communication block can perform wireless communication is shorter than the distance at which the second wireless communication block can perform wireless communication.

13. The information processing apparatus according to claim 3, wherein
the synchronization establishment processing means sends an ID packet generated according to the Bluetooth address information to the communication terminal specified by the specifying processing means, and, when a response to the ID packet is made by the communication terminal, further sends its own FHS packet.

14. An information processing apparatus according to claim 3, wherein
the first acquisition processing means operates when it is determined according to a load change of the first wireless communication block that a communication terminal is located close.

15. An information processing method according to claim 6, wherein
the acquiring identification information further comprises determining that a wireless communication terminal is located close according to a load change of the first wireless communication block.

* * * * *